US010346465B2

(12) United States Patent
Gao et al.

(10) Patent No.: US 10,346,465 B2
(45) Date of Patent: Jul. 9, 2019

(54) SYSTEMS, METHODS, AND APPARATUS FOR DIGITAL COMPOSITION AND/OR RETRIEVAL

(71) Applicant: QUALCOMM Incorporated, San Diego, CA (US)

(72) Inventors: Dashan Gao, San Diego, CA (US); Xin Zhong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/576,014

(22) Filed: Dec. 18, 2014

(65) Prior Publication Data

US 2015/0178953 A1 Jun. 25, 2015

Related U.S. Application Data

(60) Provisional application No. 61/919,627, filed on Dec. 20, 2013, provisional application No. 62/036,502, (Continued)

(51) Int. Cl.
*G06T 11/00* (2006.01)
*G06F 16/58* (2019.01)
(Continued)

(52) U.S. Cl.
CPC ........ *G06F 16/5866* (2019.01); *G06F 3/0488* (2013.01); *G06F 3/04842* (2013.01); *G06F 16/35* (2019.01); *G06F 16/56* (2019.01); *G06F 16/7335* (2019.01); *G06F 16/78* (2019.01); *G06F 16/7837* (2019.01); *G06F 16/9535* (2019.01); *G06F 17/2765* (2013.01); *G06K 9/00664* (2013.01); *G06K 9/00671* (2013.01); *G06K 9/00711* (2013.01); *G06K 9/22* (2013.01);
(Continued)

(58) Field of Classification Search
None
See application file for complete search history.

(56) References Cited

U.S. PATENT DOCUMENTS

| 4,933,979 A | 6/1990 | Suzuki et al. |
| 6,512,793 B1 | 1/2003 | Maeda |

(Continued)

FOREIGN PATENT DOCUMENTS

| CN | 101276299 A | 10/2008 |
| CN | 101276410 A | 10/2008 |

(Continued)

OTHER PUBLICATIONS

Kim et al., "Augmenting Aerial Earth Maps with Dynamic Information," IEEE, 2009.*

(Continued)

*Primary Examiner* — Nicholas R Wilson
(74) *Attorney, Agent, or Firm* — Toler Law Group, PC

(57) ABSTRACT

A method includes receiving information that identifies a reference position in a location space. The method also includes receiving data that identifies one among a plurality of candidate geometrical arrangements. The method also includes producing a representation that depicts a plurality of objects which are arranged, relative to the reference position in the location space, according to the identified candidate geometrical arrangement.

30 Claims, 48 Drawing Sheets

Related U.S. Application Data filed on Aug. 12, 2014, provisional application No. 62/063,498, filed on Oct. 14, 2014.

(51) Int. Cl.

| | | |
|---|---|---|
| G06F 16/35 | (2019.01) | |
| G06F 16/56 | (2019.01) | |
| G06F 16/78 | (2019.01) | |
| G06F 16/732 | (2019.01) | |
| G06F 16/783 | (2019.01) | |
| G06F 16/9535 | (2019.01) | |
| G06F 17/27 | (2006.01) | |
| G06K 9/00 | (2006.01) | |
| G06K 9/22 | (2006.01) | |
| G06K 9/32 | (2006.01) | |
| G06F 3/0484 | (2013.01) | |
| G06F 3/0488 | (2013.01) | |
| G06T 11/60 | (2006.01) | |
| G06T 7/20 | (2017.01) | |
| G06T 7/70 | (2017.01) | |

(52) U.S. Cl.
CPC ............ G06K 9/3241 (2013.01); G06T 7/20 (2013.01); G06T 7/70 (2017.01); G06T 11/00 (2013.01); G06T 11/60 (2013.01); *G06T 2207/10004* (2013.01); *G06T 2207/10016* (2013.01); *G06T 2207/20076* (2013.01)

(56) References Cited

U.S. PATENT DOCUMENTS

| | | |
|---|---|---|
| 6,542,621 B1 | 4/2003 | Brill et al. |
| 6,665,613 B2 | 12/2003 | Duvall |
| 6,691,126 B1 | 2/2004 | Syeda-Mahmood |
| 6,724,915 B1 | 4/2004 | Toklu et al. |
| 7,495,699 B2 | 2/2009 | Nayar et al. |
| 7,512,250 B2 | 3/2009 | Lim et al. |
| 7,881,862 B2 | 2/2011 | Pei et al. |
| 7,973,678 B2 | 7/2011 | Petricoin, Jr. et al. |
| 8,024,768 B2 | 9/2011 | Berger et al. |
| 8,230,367 B2 | 7/2012 | Bell et al. |
| 8,320,644 B2 | 11/2012 | Singer et al. |
| 8,345,749 B2 | 1/2013 | Quast et al. |
| 8,378,813 B2 | 2/2013 | Bannard |
| 8,437,500 B1* | 5/2013 | Bosworth ............ G06F 17/3079 382/100 |
| 8,559,671 B2 | 10/2013 | Milanfar et al. |
| 8,605,945 B2 | 12/2013 | El-Maleh et al. |
| 8,620,026 B2 | 12/2013 | Datta et al. |
| 8,731,813 B2 | 5/2014 | Sheha et al. |
| 8,773,499 B2 | 7/2014 | Watson et al. |
| 8,854,453 B2 | 10/2014 | Chen et al. |
| 8,896,686 B2 | 11/2014 | Chen et al. |
| 8,942,468 B1 | 1/2015 | Toshev et al. |
| 8,965,050 B2 | 2/2015 | Yoshimitsu et al. |
| 9,258,550 B1 | 2/2016 | Sieracki et al. |
| 2002/0018523 A1 | 2/2002 | Jayant et al. |
| 2003/0215135 A1 | 11/2003 | Caron et al. |
| 2004/0113933 A1 | 6/2004 | Guler |
| 2004/0203671 A1 | 10/2004 | Fukushima |
| 2004/0221237 A1 | 11/2004 | Foote et al. |
| 2004/0258152 A1 | 12/2004 | Herz |
| 2005/0053260 A1 | 3/2005 | Worthington et al. |
| 2005/0193120 A1* | 9/2005 | Taylor .................... H04L 41/22 709/227 |
| 2005/0220361 A1 | 10/2005 | Yamasaki |
| 2006/0062478 A1 | 3/2006 | Cetin et al. |
| 2006/0064384 A1 | 3/2006 | Mehrotra et al. |
| 2006/0177114 A1 | 8/2006 | Tongdee et al. |
| 2006/0200305 A1 | 9/2006 | Sheha et al. |
| 2006/0251382 A1 | 11/2006 | Vronay et al. |
| 2007/0033170 A1 | 2/2007 | Sull et al. |
| 2007/0126868 A1 | 6/2007 | Kiyohara et al. |
| 2007/0146372 A1 | 6/2007 | Gee et al. |
| 2007/0242856 A1 | 10/2007 | Suzuki et al. |
| 2007/0248244 A1 | 10/2007 | Sato et al. |
| 2007/0268369 A1 | 11/2007 | Amano et al. |
| 2007/0274563 A1 | 11/2007 | Jung et al. |
| 2007/0296817 A1 | 12/2007 | Ebrahimi et al. |
| 2008/0031325 A1 | 2/2008 | Qi |
| 2008/0046406 A1 | 2/2008 | Seide et al. |
| 2008/0125964 A1 | 5/2008 | Carani et al. |
| 2008/0125965 A1 | 5/2008 | Carani et al. |
| 2008/0129844 A1 | 6/2008 | Cusack et al. |
| 2009/0002489 A1 | 1/2009 | Yang et al. |
| 2009/0080698 A1 | 3/2009 | Mihara et al. |
| 2009/0080702 A1 | 3/2009 | Ma et al. |
| 2009/0141940 A1 | 6/2009 | Zhao et al. |
| 2009/0141941 A1 | 6/2009 | Wagg |
| 2009/0144772 A1 | 6/2009 | Fink et al. |
| 2009/0195540 A1 | 8/2009 | Ueno |
| 2009/0208106 A1 | 8/2009 | Dunlop et al. |
| 2009/0219387 A1 | 9/2009 | Marman et al. |
| 2009/0322671 A1 | 12/2009 | Scott et al. |
| 2009/0324010 A1 | 12/2009 | Hou |
| 2010/0002071 A1* | 1/2010 | Ahiska .................. H04N 5/217 348/36 |
| 2010/0030350 A1 | 2/2010 | House et al. |
| 2010/0082585 A1 | 4/2010 | Barsook et al. |
| 2010/0141772 A1 | 6/2010 | Inaguma et al. |
| 2010/0157049 A1 | 6/2010 | Dvir et al. |
| 2010/0166260 A1 | 7/2010 | Huang et al. |
| 2010/0185933 A1 | 7/2010 | Coffman et al. |
| 2010/0198870 A1 | 8/2010 | Petersen et al. |
| 2010/0203901 A1 | 8/2010 | Dinoff et al. |
| 2011/0013836 A1 | 1/2011 | Gefen et al. |
| 2011/0085017 A1 | 4/2011 | Robinson et al. |
| 2011/0091072 A1 | 4/2011 | Fukuda |
| 2011/0091117 A1 | 4/2011 | Sakamoto |
| 2011/0116711 A1 | 5/2011 | Wang et al. |
| 2011/0119640 A1 | 5/2011 | Berkes et al. |
| 2011/0135149 A1 | 6/2011 | Gefen |
| 2011/0150272 A1 | 6/2011 | Gunasekaranbabu et al. |
| 2011/0193939 A1 | 8/2011 | Vassigh et al. |
| 2011/0199372 A1 | 8/2011 | Porter et al. |
| 2011/0206124 A1* | 8/2011 | Morphet ............... G06T 7/2013 375/240.16 |
| 2011/0291925 A1 | 12/2011 | Israel et al. |
| 2012/0022786 A1 | 1/2012 | Siliski et al. |
| 2012/0026277 A1 | 2/2012 | Malzbender et al. |
| 2012/0057006 A1 | 3/2012 | Joseph et al. |
| 2012/0078899 A1 | 3/2012 | Fontana et al. |
| 2012/0126973 A1 | 5/2012 | Deangelis et al. |
| 2012/0127297 A1 | 5/2012 | Baxi et al. |
| 2012/0224748 A1 | 9/2012 | Kim et al. |
| 2012/0250943 A1 | 10/2012 | Aomi |
| 2012/0278073 A1 | 11/2012 | Weider et al. |
| 2013/0036442 A1 | 2/2013 | Wingert |
| 2013/0064460 A1 | 3/2013 | Zhang et al. |
| 2013/0155229 A1 | 6/2013 | Thornton et al. |
| 2013/0182905 A1 | 7/2013 | Myers et al. |
| 2013/0208124 A1 | 8/2013 | Boghossian et al. |
| 2013/0223686 A1 | 8/2013 | Shimizu et al. |
| 2013/0225196 A1 | 8/2013 | James et al. |
| 2013/0342482 A1 | 12/2013 | Kim et al. |
| 2014/0056519 A1 | 2/2014 | Gupta |
| 2014/0085501 A1 | 3/2014 | Tran |
| 2014/0098221 A1 | 4/2014 | Brown et al. |
| 2014/0146084 A1 | 5/2014 | Polo et al. |
| 2014/0164118 A1 | 6/2014 | Polachi |
| 2014/0211993 A1 | 7/2014 | Ishii |
| 2014/0258201 A1 | 9/2014 | Finlow-Bates |
| 2014/0270363 A1 | 9/2014 | Chakraborty et al. |
| 2014/0270483 A1 | 9/2014 | Lucey et al. |
| 2014/0285717 A1 | 9/2014 | Cai |
| 2014/0348383 A1 | 11/2014 | Kamiya et al. |
| 2014/0369555 A1 | 12/2014 | Zhong et al. |
| 2014/0376775 A1 | 12/2014 | Datta et al. |
| 2015/0077548 A1* | 3/2015 | Meredith ................ H04W 4/22 348/143 |
| 2015/0079565 A1 | 3/2015 | Miller et al. |
| 2015/0104102 A1 | 4/2015 | Carreira et al. |

(56) References Cited

U.S. PATENT DOCUMENTS

| | | |
|---|---|---|
| 2015/0178320 A1 | 6/2015 | Gao et al. |
| 2015/0178930 A1 | 6/2015 | Gao et al. |
| 2015/0178931 A1 | 6/2015 | Gao et al. |
| 2015/0179219 A1 | 6/2015 | Gao et al. |
| 2015/0237470 A1 | 8/2015 | Mayor et al. |
| 2015/0356354 A1 | 12/2015 | Dunlop et al. |
| 2016/0232774 A1 | 8/2016 | Noland et al. |
| 2018/0115868 A1 | 4/2018 | Shaik |

FOREIGN PATENT DOCUMENTS

| | | |
|---|---|---|
| CN | 101493736 A | 7/2009 |
| CN | 101571875 A | 11/2009 |
| CN | 101753999 A | 6/2010 |
| CN | 102073668 A | 5/2011 |
| CN | 102207966 A | 10/2011 |
| CN | 102301396 A | 12/2011 |
| CN | 102549602 A | 7/2012 |
| CN | 102771110 A | 11/2012 |
| CN | 102870123 A | 1/2013 |
| CN | 102986229 A | 3/2013 |
| CN | 103179405 A | 6/2013 |
| CN | 103186790 A | 7/2013 |
| CN | 102547479 B | 8/2016 |
| EP | 0967584 A2 | 12/1999 |
| JP | H08335223 A | 12/1996 |
| JP | 2000333080 A | 11/2000 |
| JP | 2002352250 A | 12/2002 |
| JP | 2005286685 A | 10/2005 |
| JP | 2007200249 A | 8/2007 |
| JP | 2008117042 A | 5/2008 |
| JP | 2008269557 A | 11/2008 |
| JP | 2008271522 A | 11/2008 |
| JP | 2010136099 A | 6/2010 |
| JP | 2015217122 A | 12/2015 |
| KR | 20120134936 A | 12/2012 |
| WO | 2004045215 A1 | 5/2004 |
| WO | 2010086866 A1 | 8/2010 |
| WO | 2012029518 A1 | 3/2012 |
| WO | 2013022802 A1 | 2/2013 |
| WO | 2013072401 A2 | 5/2013 |
| WO | 2013171746 A1 | 11/2013 |

OTHER PUBLICATIONS

Tekalp et al., "Automatic Vehicle Counting from Video for Traffic Flow Analysis," IEEE, 2007.*

Fan et al. ("A Novel Approach for Privacy-Preserving Video Sharing," CIKM, 2005.*

Ji et al., "3D Convolutional Neural Networks for Human Action Recognition," IEEE, Jan. 2013.*

Abbott, J.J., et al., "Effects of Position Quantization and Sampling Rate on Virtual-Wall Passivity," IEEE Transactions on Robotics, Oct. 2005, vol. 21, No. 5, IEEE, Piscataway, NJ, pp. 952-964.

Temel, D., et al., "Efficient Streaming of Stereoscopic Depth-Based 3D Videos," Proceedings of SPIE—The International Society for Optical Engineering, Feb. 2013, SPIE, Bellingham, Washington, 10 pages.

Ahanger G., et al., "Video Query Formulation," Proceedings of SPIE, SPIE—International Society for Optical Engineering, US, vol. 2420, Feb. 9, 1995 (Feb. 9, 1995), pp. 280-291, XP000571790, ISSN: 0277-786X, DOI: 10.1117/12.205295 ISBN: 978-1-62841-213-0.

Black J., et al., "Hierarchical Database for a Multi-Camera Surveillance System," Pattern Analysis and Applications, Springer, New York, NY, US, vol. 7, No. 4, Jun. 1, 2005 (Jun. 1, 2005), pp. 430-446, XP001233299, ISSN: 1433-7541, DOI: 10.1007/S10044-005-0243-8.

Burge, et al., "Qualitative Spatial Relations using Arrangements for Complex Images," 1996.

Ge W., et al., "Vision-Based Analysis of Small Groups in Pedestrian Crowds", IEEE Transactions on Pattern Analysis and Machine Intelligence, IEEE Computer Society, USA, vol. 34, No. 5, May 1, 2012 (May 1, 2012), pp. 1003-1016, XP011490668, ISSN: 0162-8828, DOI: 10.1109/TPAMI.2011.176.

Guo J., et al., "Chapter 4: User Interactive Segmentation", In: "Semantic Video Object Segmentation for Content-Based Multimedia Applications", Sep. 30, 2001 (Sep. 30, 2001), Kluwer Academic Publishers, Boston [u.a.], XP055230246, ISBN: 978-0-7923-7513-5, pp. 20-24, DOI: 9780792375135.

Ibanez J. et al., "Storytelling in virtual environments from a virtual guide perspective", Virtual Reality, vol. 7, No. 1, Dec. 1, 2003 (Dec. 1, 2003), pp. 30-42, XP055179410, ISSN: 1359-4338, DOI: 10.1007/s10055-003-0112-y.

International Search Report and Written Opinion—PCT/US2014/071592—ISA/EPO—dated Apr. 7, 2015, 12 pages.

Lipson, et al., "Configuration Based Scene Classification and Image Indexing," 1997.

Makris D., et al., "Finding Paths in Video Sequences," Procedings of the British Machine Vision Conference 2001, Sep. 2001 (Sep. 2001), pp. 263-271, XP055258666, DOI: 10.5244/C. 15.28 ISBN: 978-1-901725-16-2.

Papagiannakis G et al., "LIFEPLUS: Revival of life in ancient Pompeii", Proceeding of Virtual Systems and Multimedia 2002 (VSMM02), Sep. 1, 2002 (Sep. 1, 2002), XP055178462, Retrieved from the Internet: URL:http://george.papagiannakis.org/wp-content/uploads/ 2011/10/Proc.-of-Virtual-Systems-and-Multimedia-VSMM02-Gyeongju-2002-Papagiannakis.pdf [retrieved on Mar. 23, 2015].

Papagiannakis G et al., "Mixing virtual and real scenes in the site of ancient Pompeii", Computer Animation and Virtual Worlds, vol. 16, No. 1, Feb. 1, 2005 (Feb. 1, 2005), pp. 1-31, XP055178172, ISSN: 1546-4261, DOI: 10.1002/cav.53.

Black J., et al., "Hierarchical database for a multi-camera surveillance system," Dec. 2004, Website: url: http://www.springerlink.com/content/vt127692213u252l/, 42 Pages.

* cited by examiner

 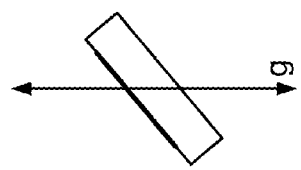 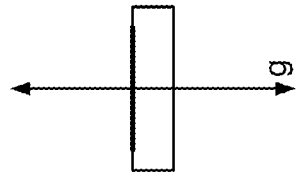
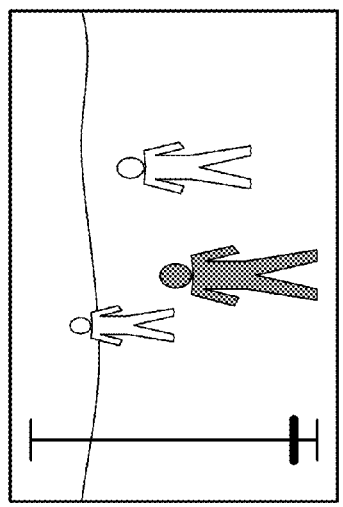 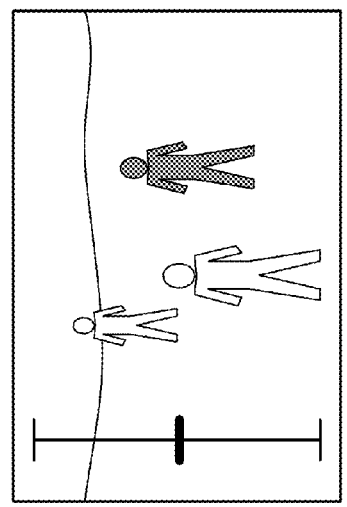 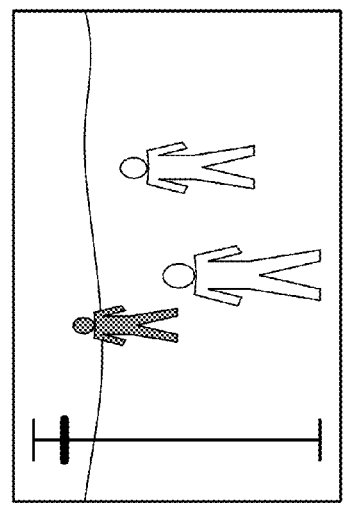
FIG. 15A    FIG. 15B    FIG. 15C

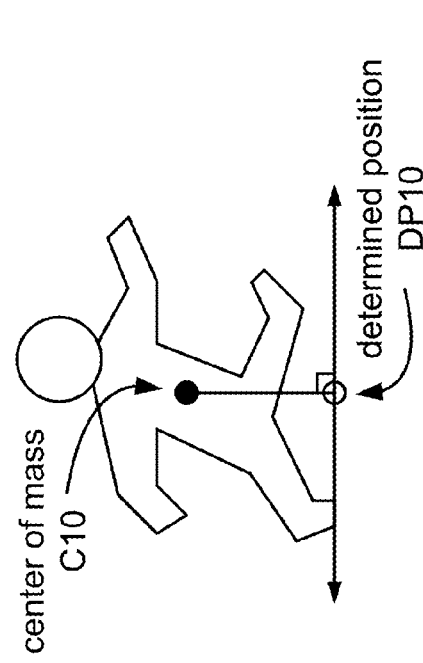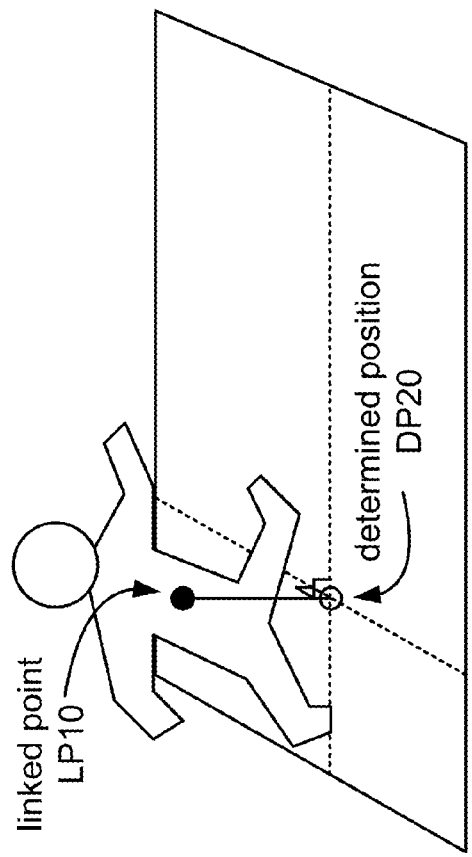
FIG. 17A
FIG. 17B

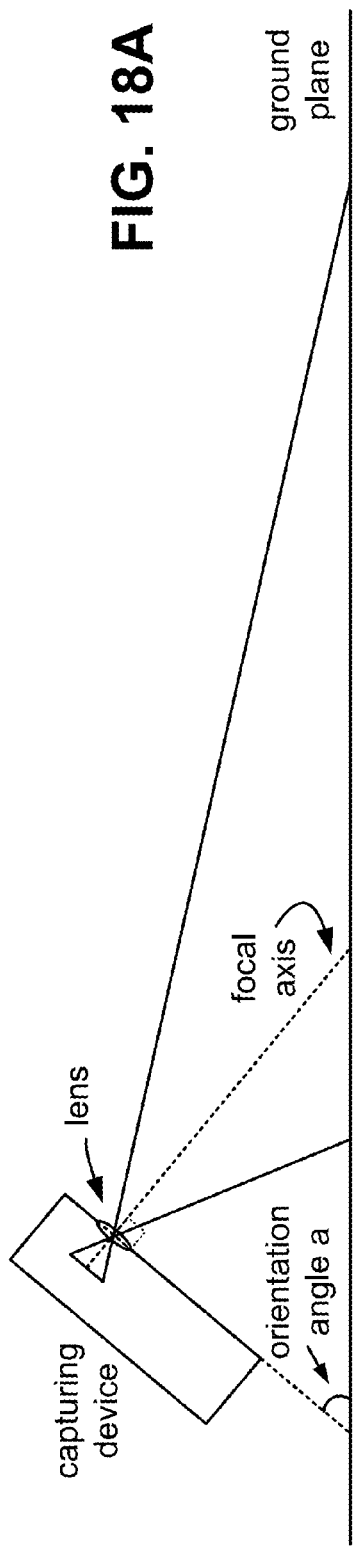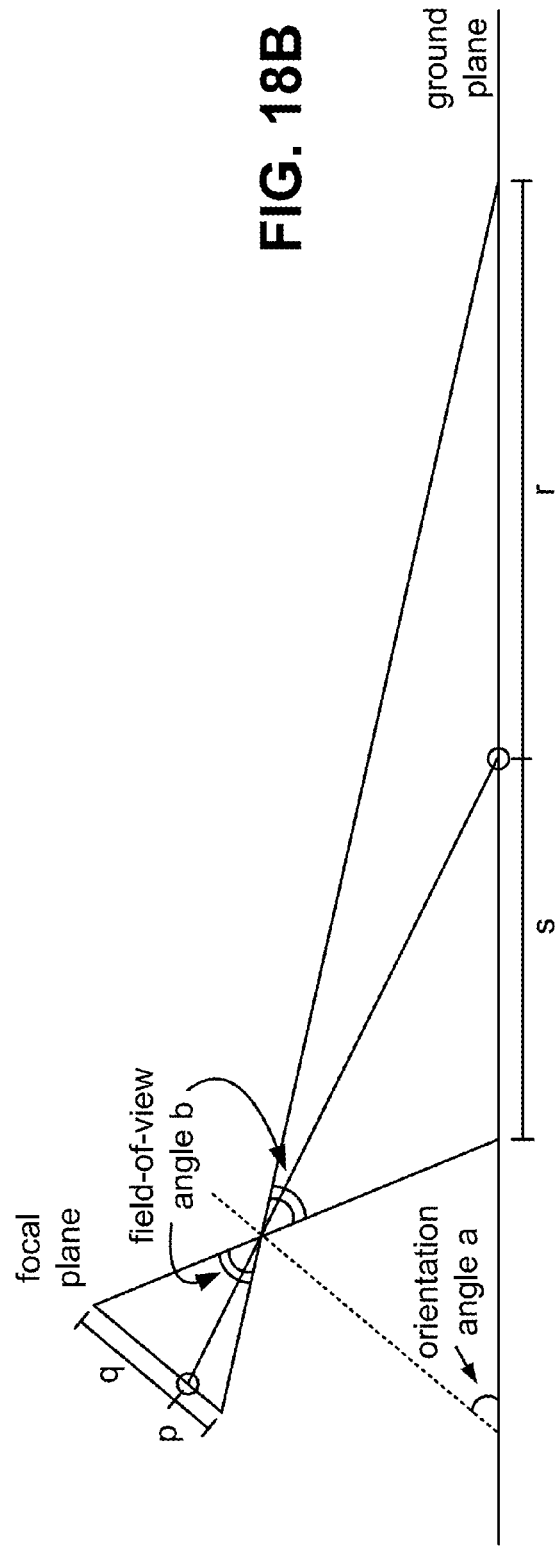

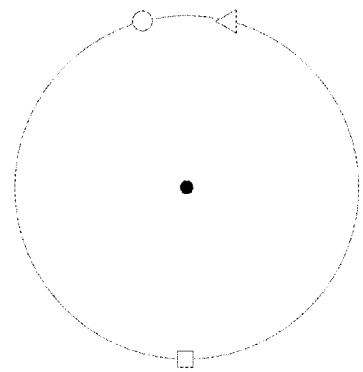
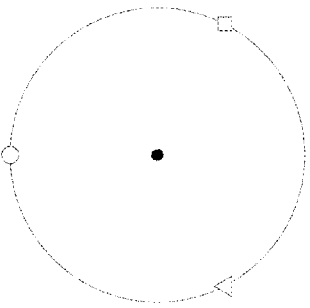
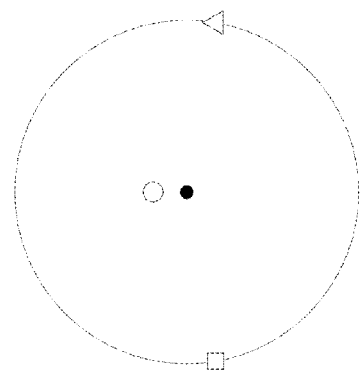
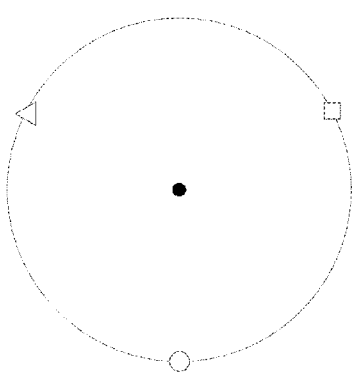
FIG. 33A
FIG. 33B
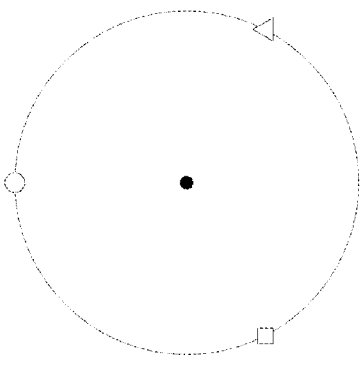
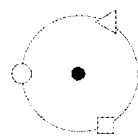

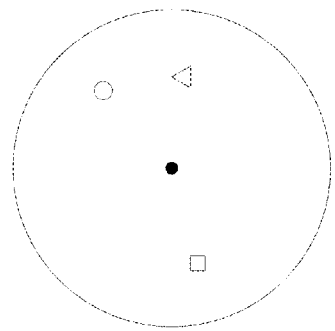
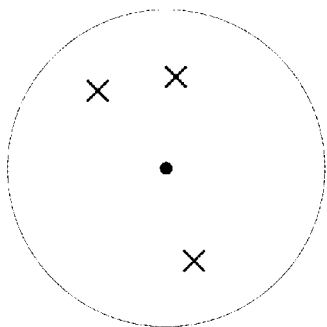
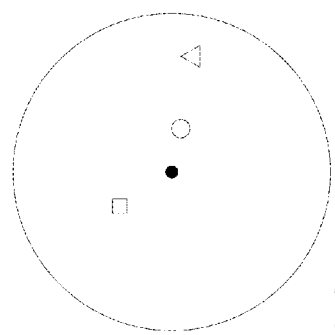
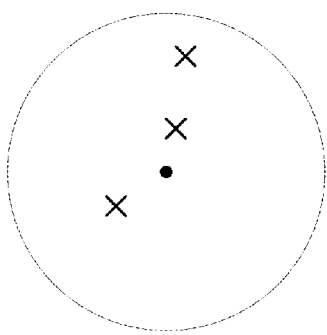
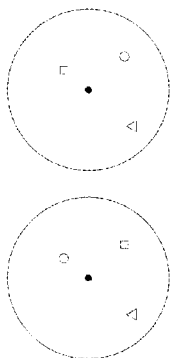
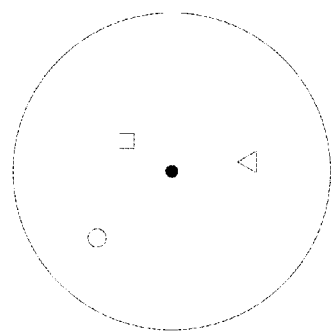
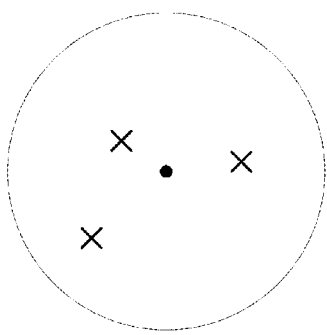
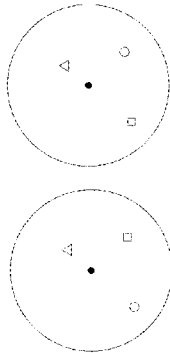
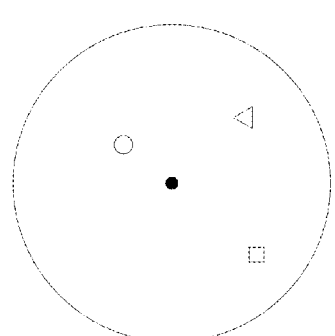
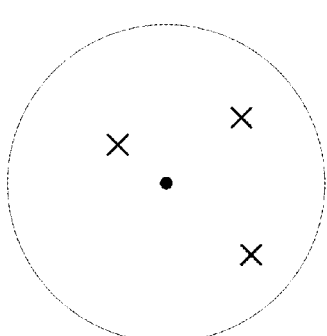
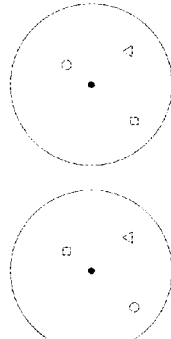
FIG. 34A  FIG. 34B  FIG. 34C

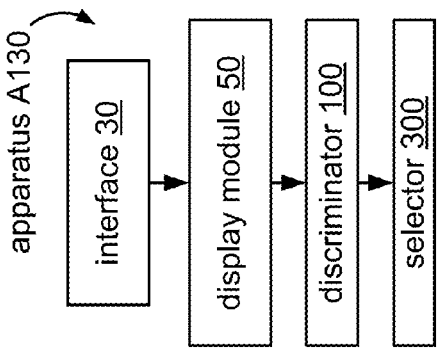
FIG. 38D
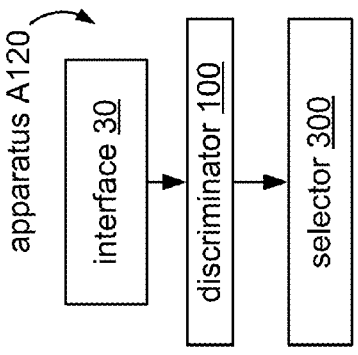
FIG. 38C
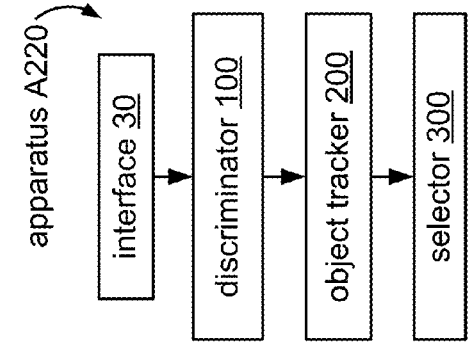
FIG. 38G
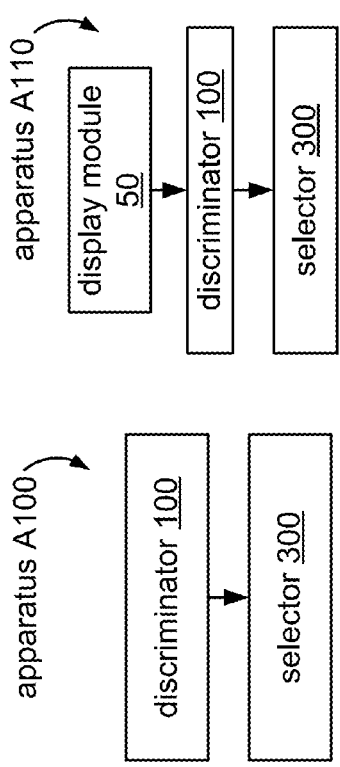
FIG. 38B
FIG. 38A
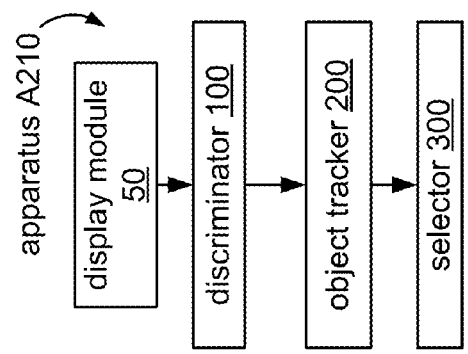
FIG. 38F
FIG. 38E

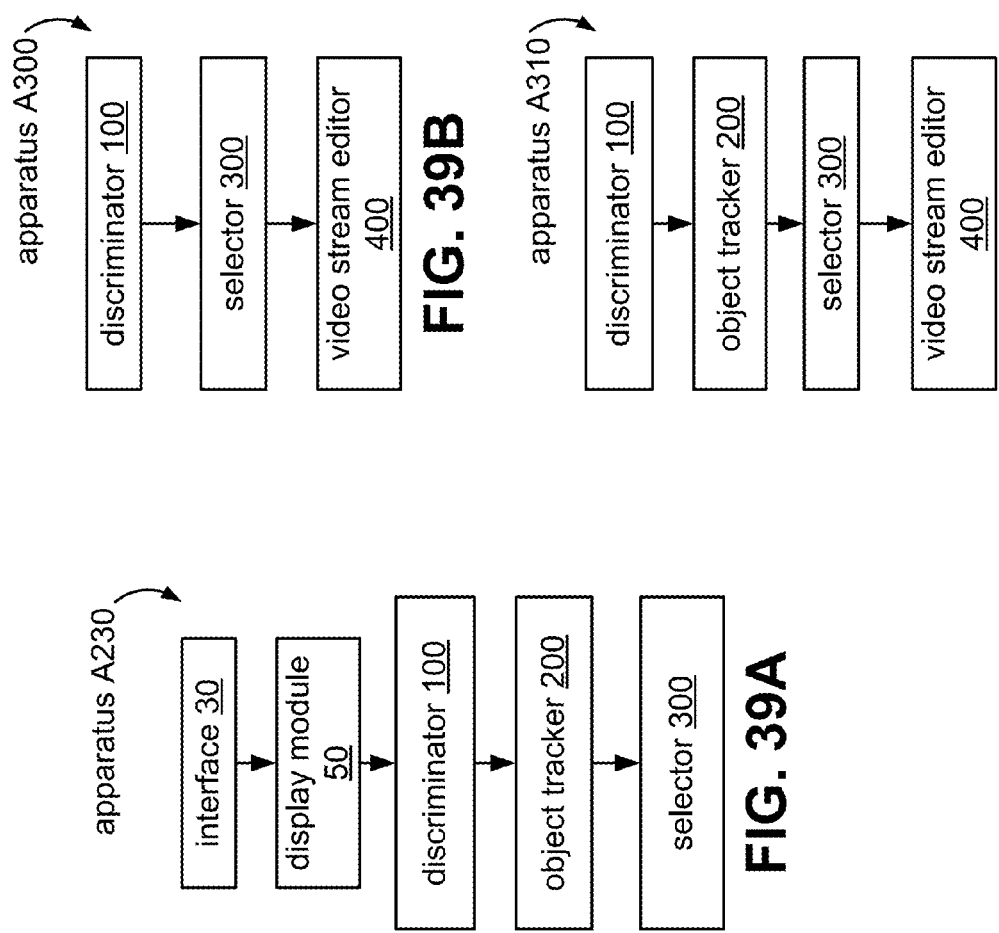
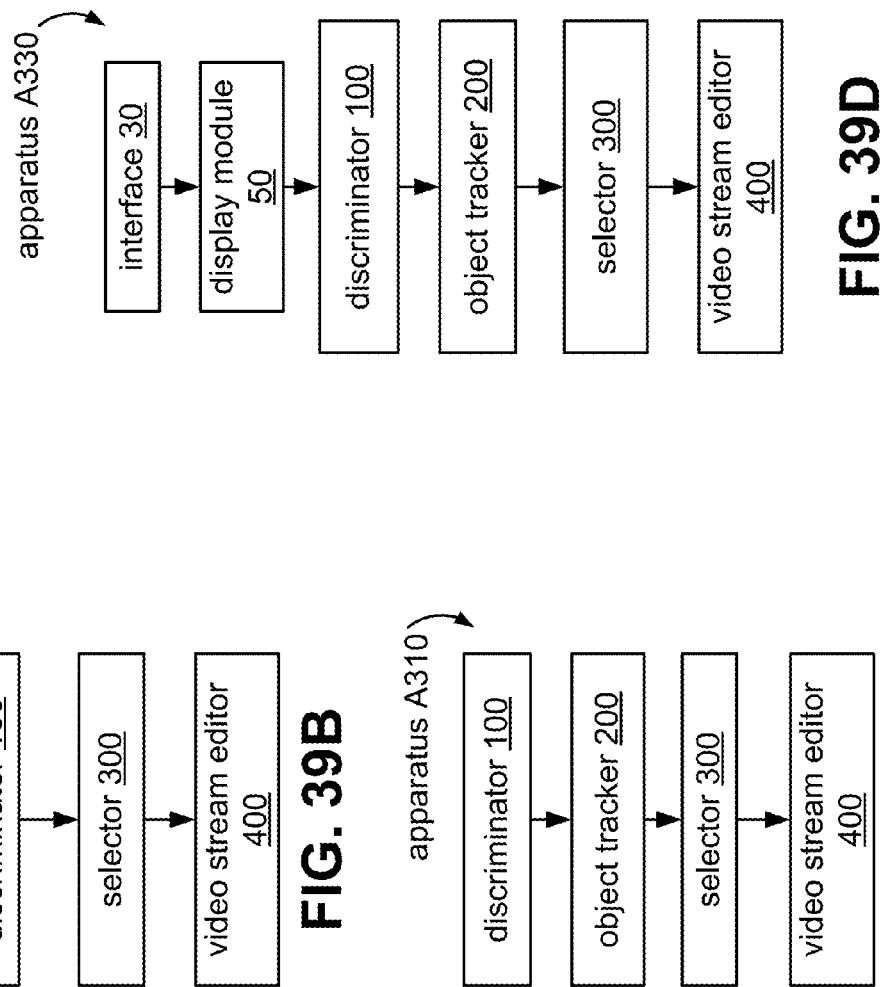

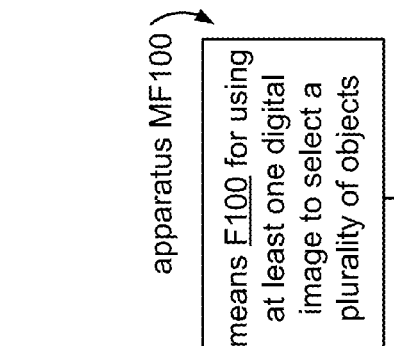
FIG. 40A
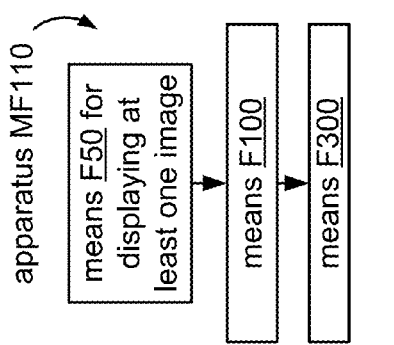
FIG. 40B
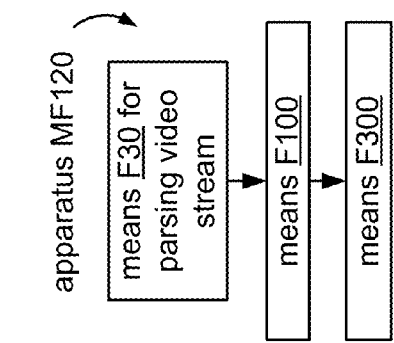
FIG. 40C
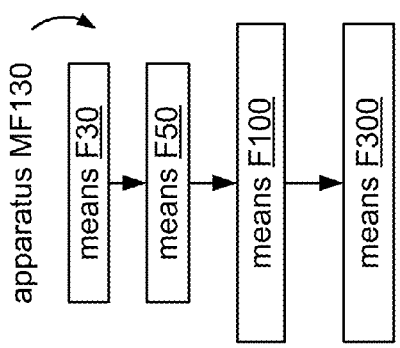
FIG. 40D
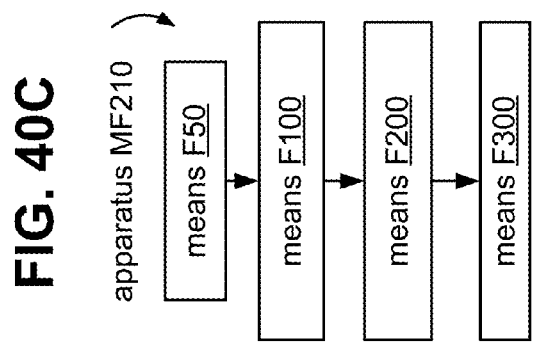
FIG. 40E
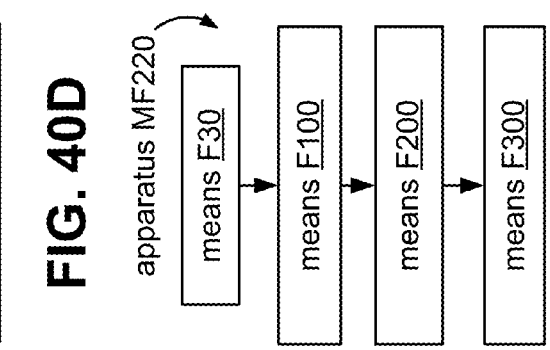
FIG. 40F
FIG. 40G

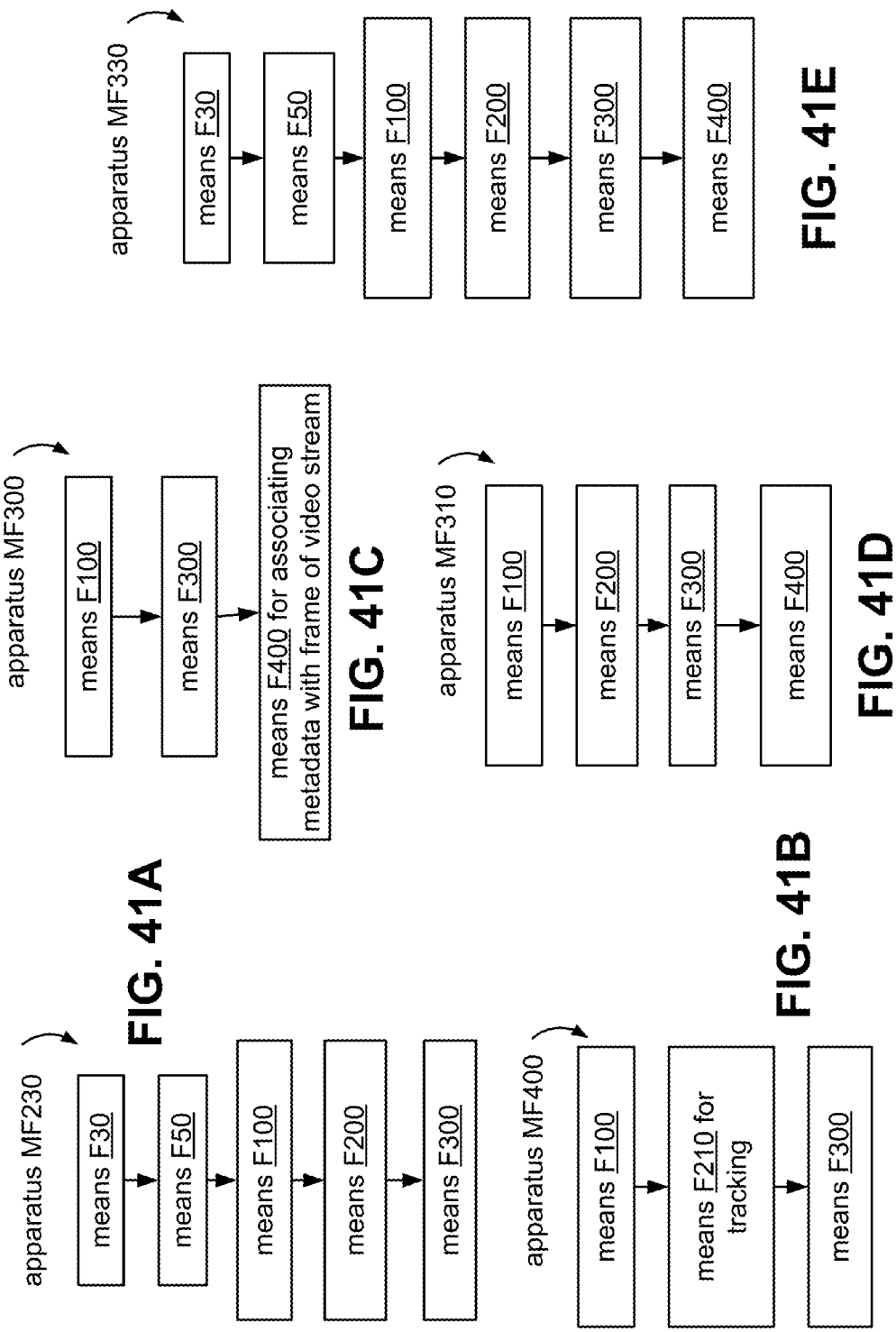

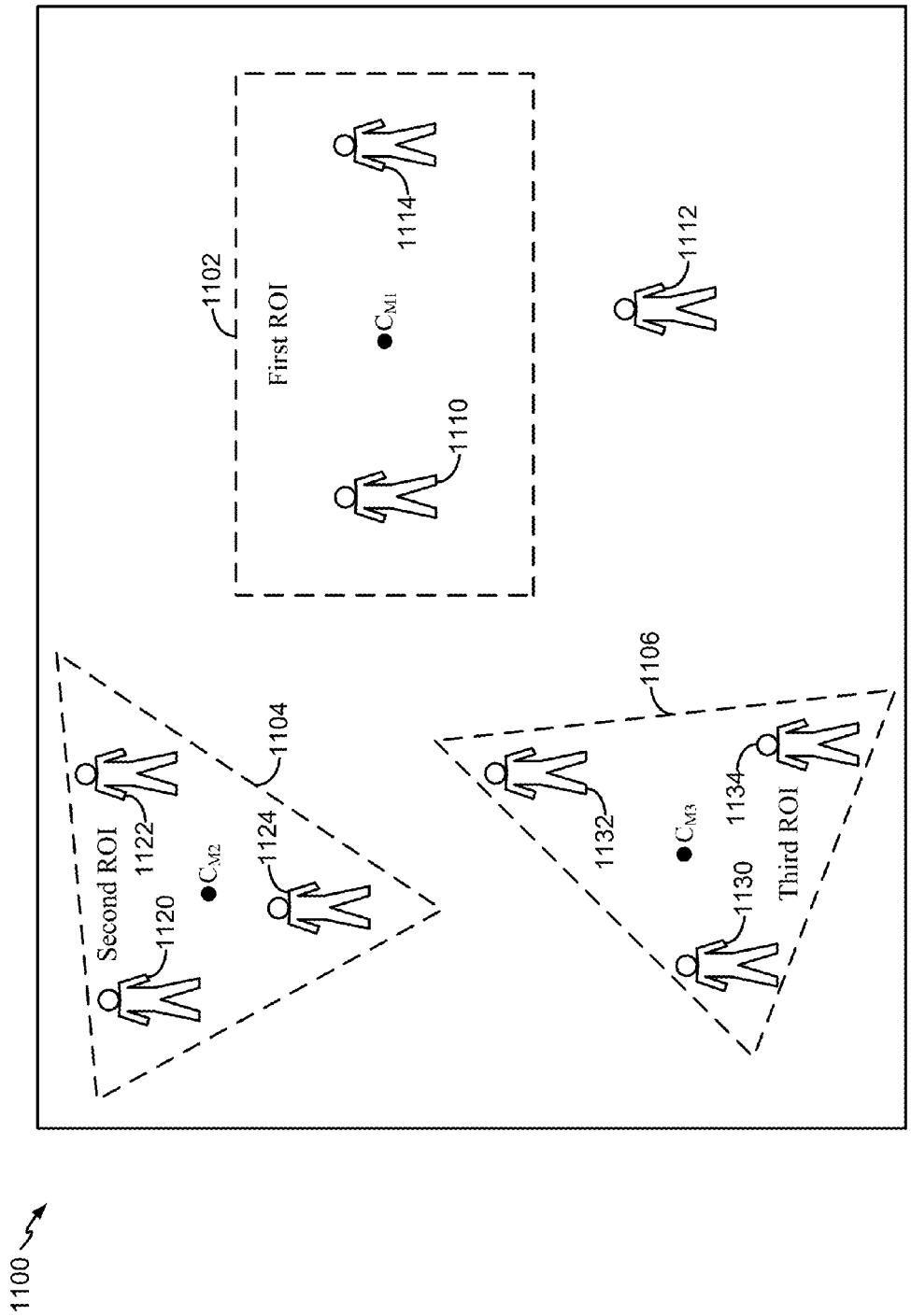

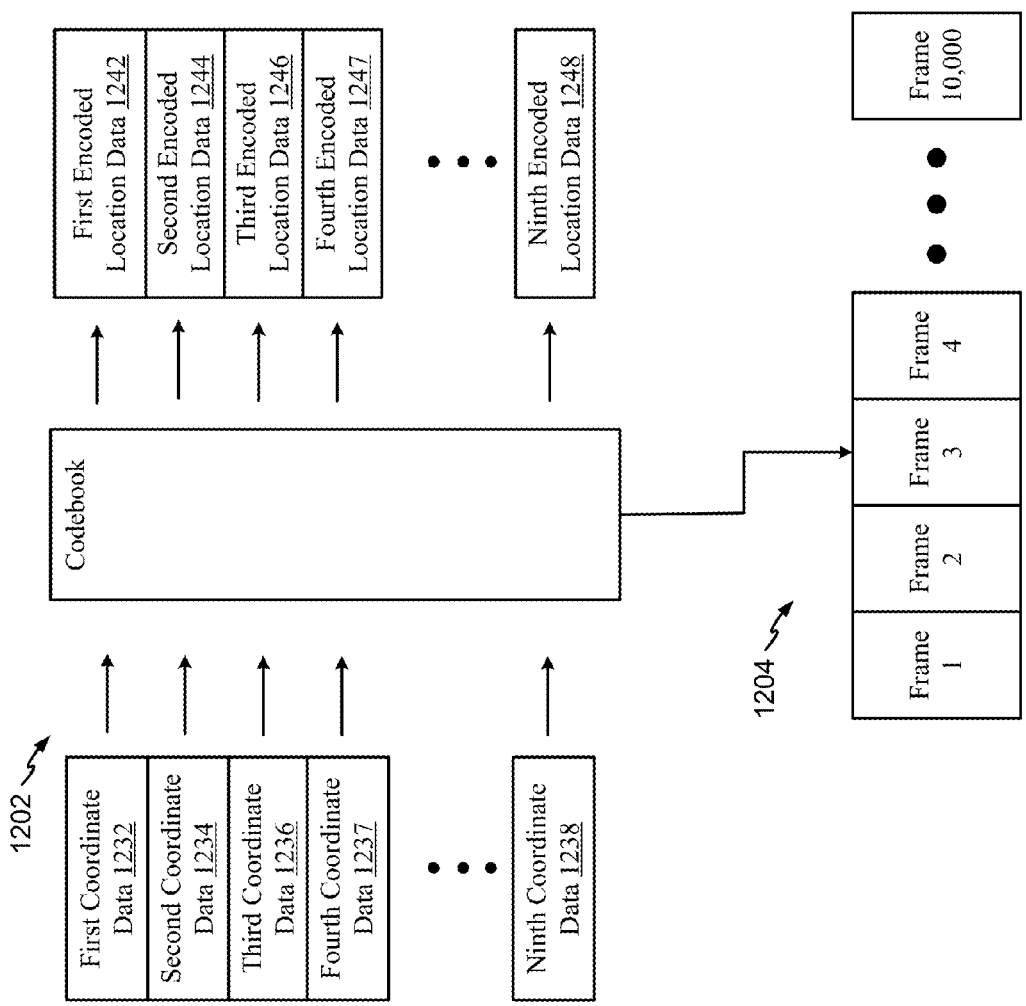

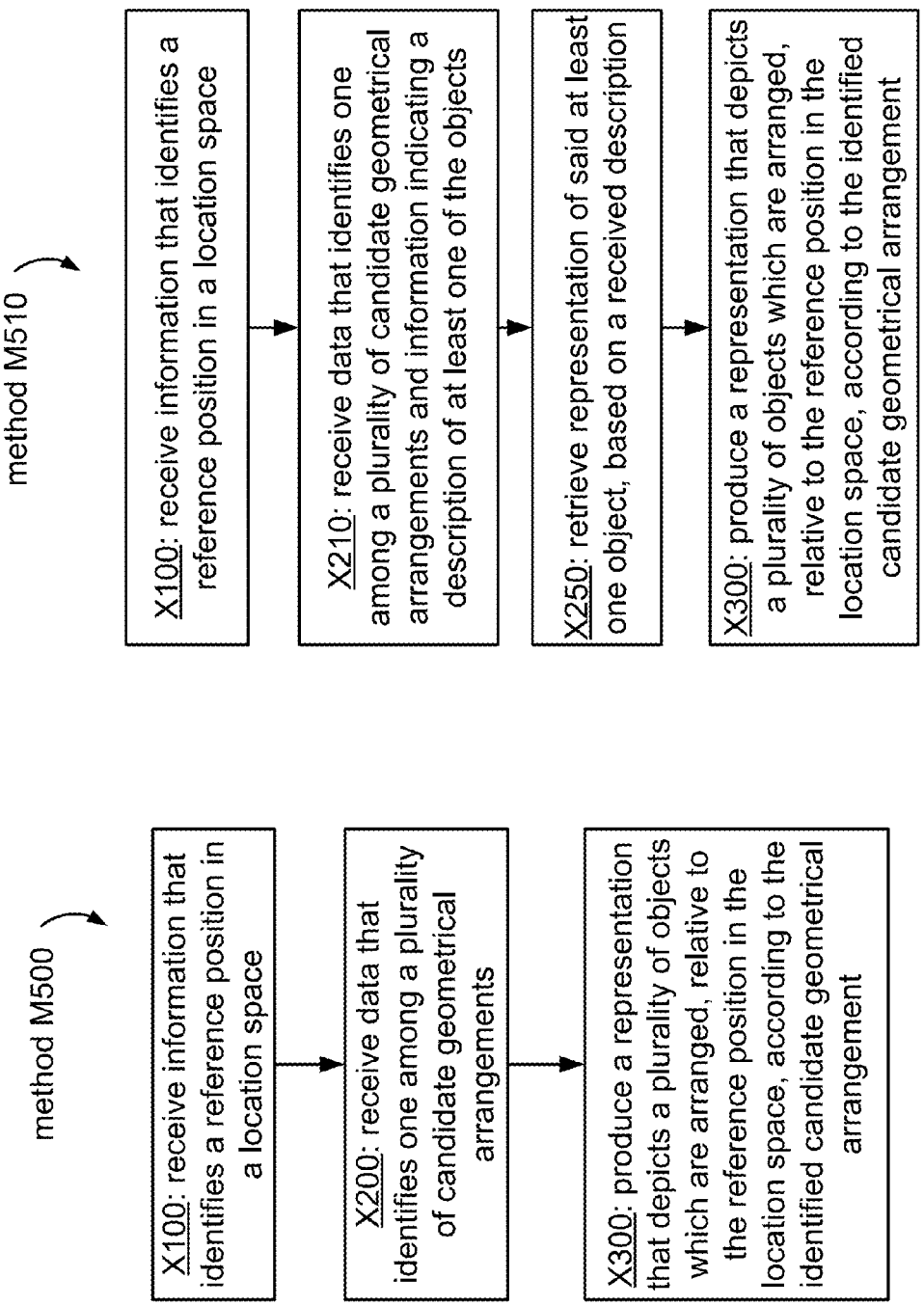

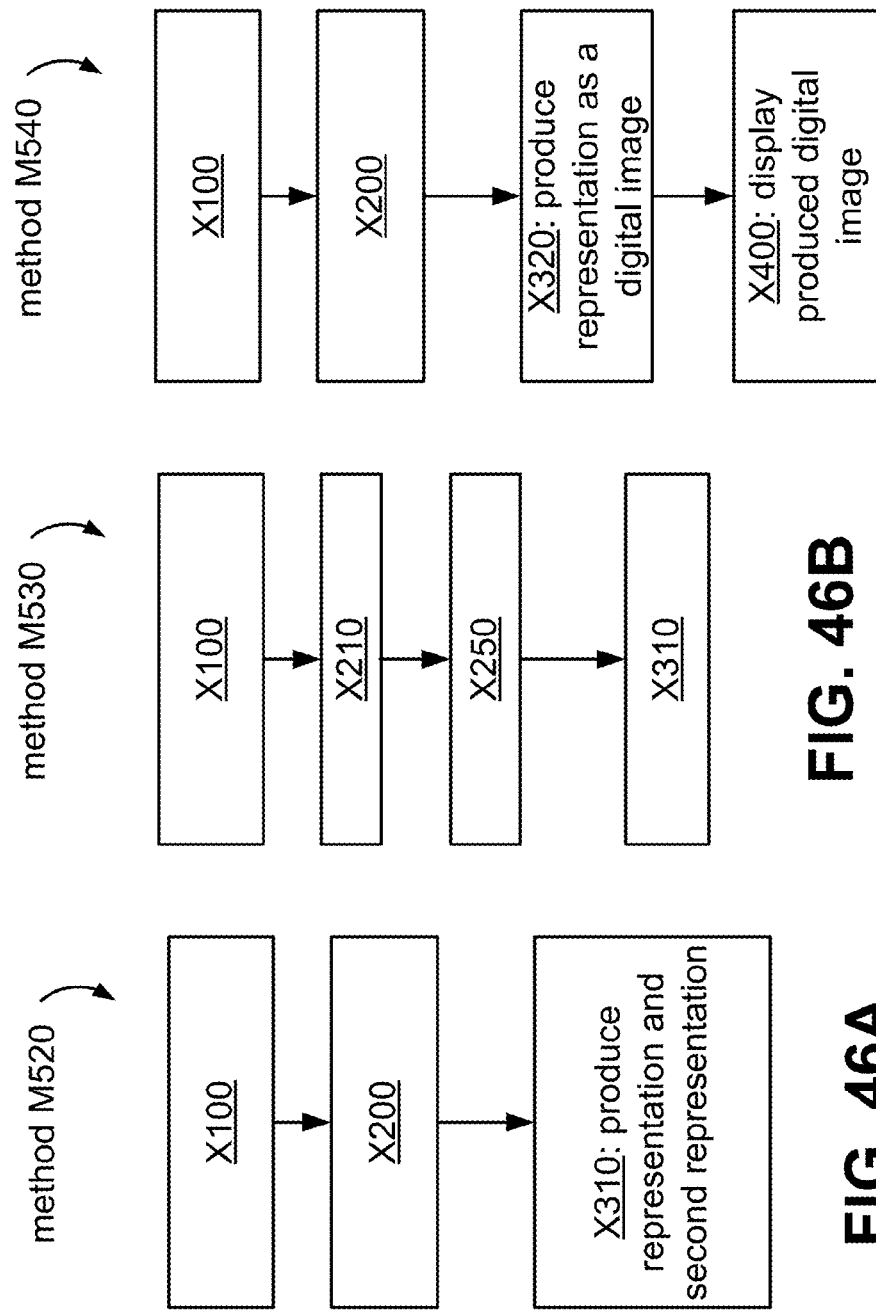

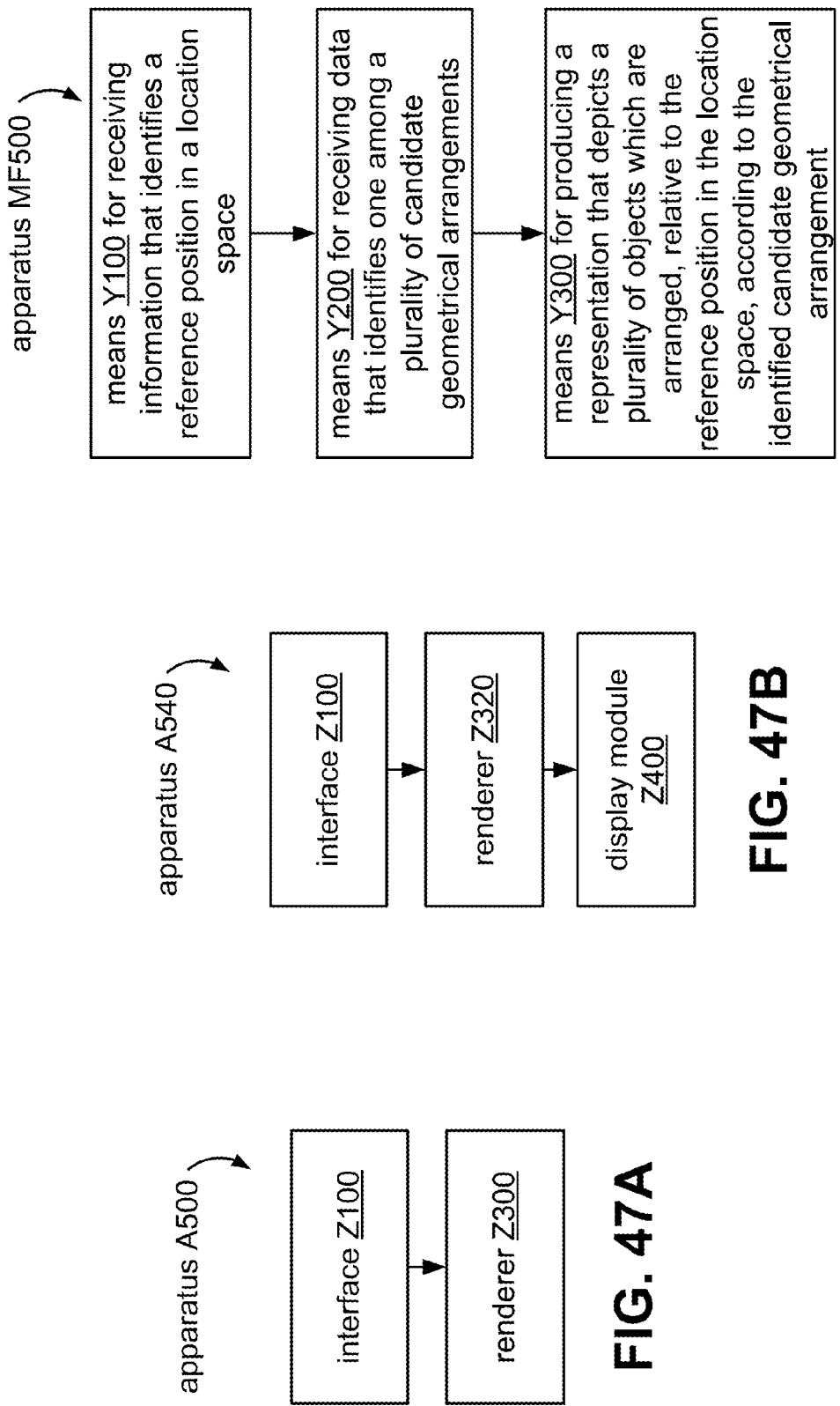

SYSTEMS, METHODS, AND APPARATUS FOR DIGITAL COMPOSITION AND/OR RETRIEVAL

I. CLAIM OF PRIORITY

This application claims priority from U.S. Provisional Patent Application No. 61/919,627, filed on Dec. 20, 2013, U.S. Provisional Patent Application No. 62/036,502 filed on Aug. 12, 2014, and U.S. Provisional Patent Application No. 62/063,498 filed on Oct. 14, 2014, the contents of each of which are incorporated herein in their entirety.

II. FIELD

The present disclosure is generally related to digital composition.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

IV. SUMMARY

A method of generating metadata according to a general configuration includes using at least one digital image to select a plurality of objects, wherein the at least one digital image depicts the objects in relation to a physical space. This method also includes, by at least one processor and based on information indicating positions of the selected objects in a location space, producing metadata that identifies one among a plurality of candidate geometrical arrangements of the selected objects. Computer-readable storage media (e.g., non-transitory media) having instructions that cause a machine executing the instructions to perform such a method are also disclosed.

An apparatus for generating metadata according to a general configuration includes means for using at least one digital image to select a plurality of objects, wherein the at least one digital image depicts the objects in relation to a physical space. This apparatus also includes means for producing, based on information indicating positions of the selected objects in a location space, metadata that identifies one among a plurality of candidate geometrical arrangements of the selected objects.

An apparatus for generating metadata according to another general configuration includes a discriminator configured to use at least one digital image to select a plurality of objects, wherein the at least one digital image depicts the plurality of objects in relation to a physical space. The method also includes a selector configured to produce metadata, based on information indicating positions of the selected objects in a location space, that identifies one among a plurality of candidate geometrical arrangements of the selected objects.

A method according to another general configuration includes receiving information that identifies a reference position in a location space. The method also includes receiving data that identifies one among a plurality of candidate geometrical arrangements. The method also includes producing a representation that depicts a plurality of objects which are arranged, relative to the reference position in the location space, according to the identified candidate geometrical arrangement. Computer-readable storage media (e.g., non-transitory media) having instructions that cause a machine executing the instructions to perform such a method are also disclosed.

An apparatus according to another general configuration includes receiving information that identifies a reference position in a location space. The apparatus also includes means for receiving data that identifies one among a plurality of candidate geometrical arrangements. The apparatus also includes means for producing a representation that depicts a plurality of objects which are arranged, relative to the reference position in the location space, according to the identified candidate geometrical arrangement.

An apparatus according to another general configuration includes an interface configured to receive (A) information that identifies a reference position in a location space and (B) data that identifies one among a plurality of candidate geometrical arrangements. The apparatus also includes a renderer configured to produce a representation that depicts a plurality of objects which are arranged, relative to the reference position in the location space, according to the identified candidate geometrical arrangement.

One particular advantage provided by at least one of the disclosed embodiments is an improved user experience using image tracking and frame retrieval on mobile devices. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

FIGS. 15A-C show examples of using an orientation-sensitive device to manipulate a selection point.

Figure 16:
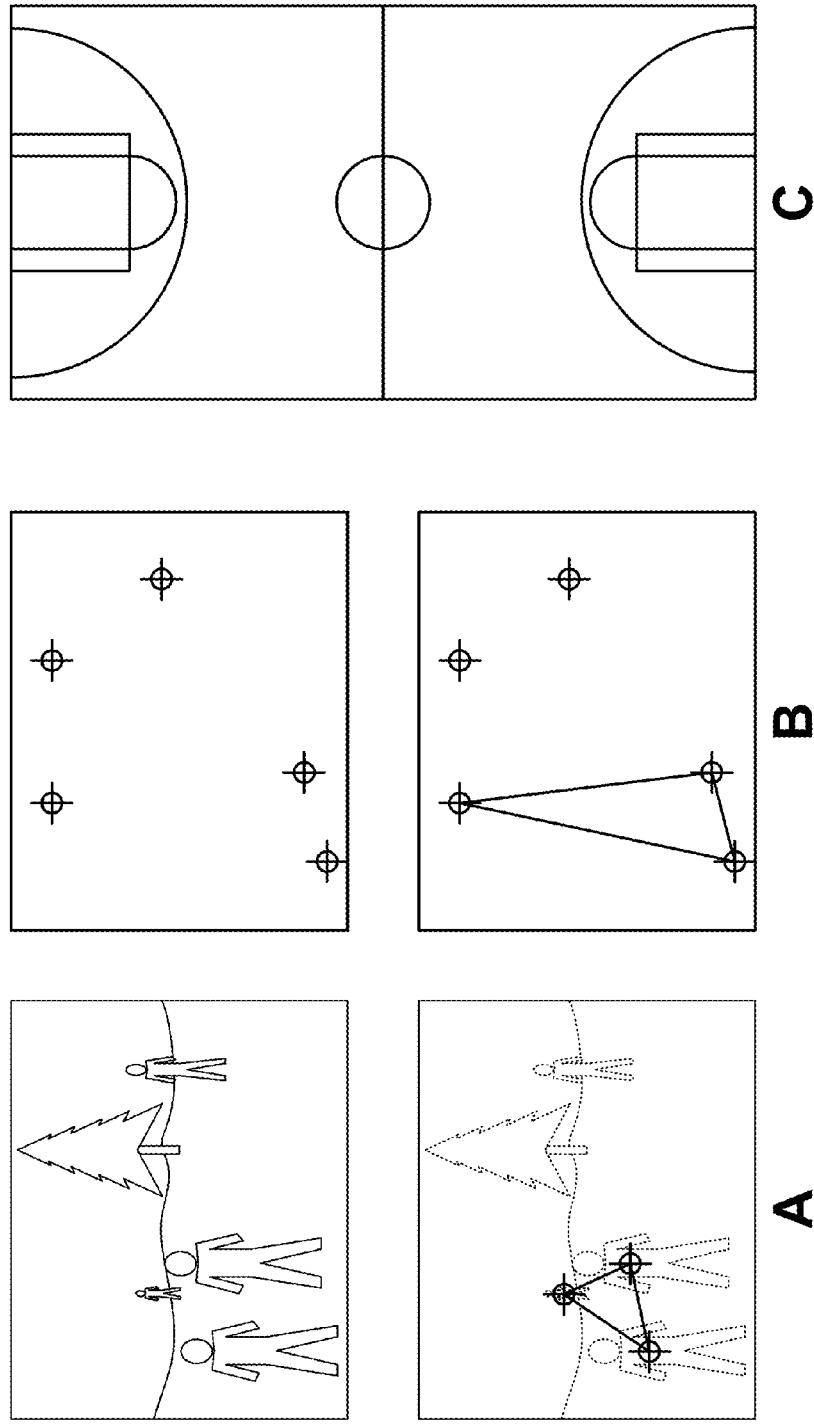

FIG. 16 shows an example of a discrepancy between distances among images of objects compared to actual distances.

FIG. 17A shows an example of projecting a center of mass of an object onto a bottom bounding line of the object to obtain a corresponding determined position.

FIG. 17B shows an example of a projection of a linked point to a determined position in the ground plane.

FIGS. 18A and 18B show a correspondence between distances in the pixel coordinate space and distances in the ground plane.

Figure 19A:
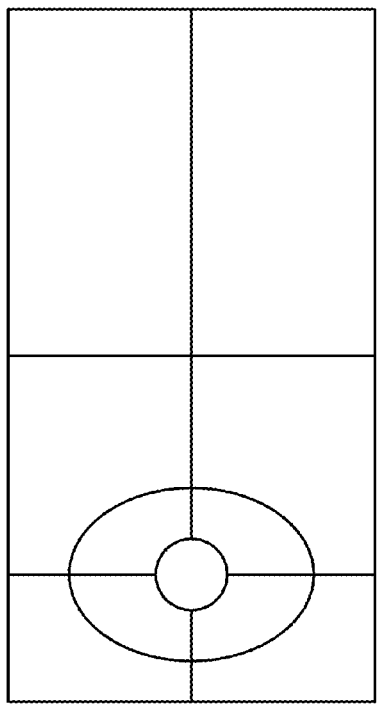
Figure 19B:
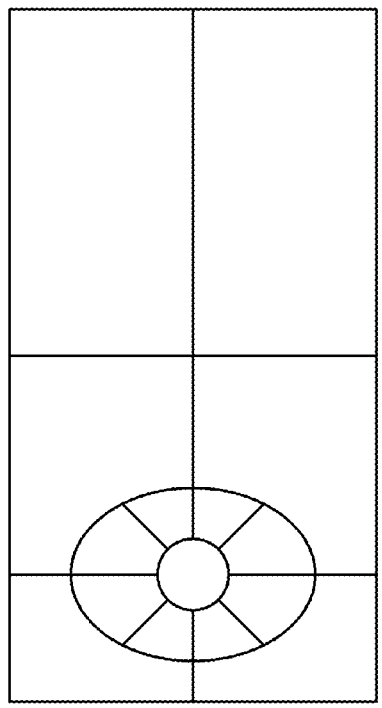
Figure 19C:
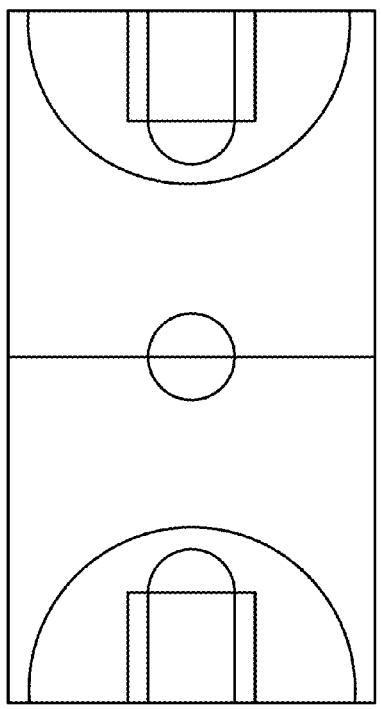
Figure 19D:
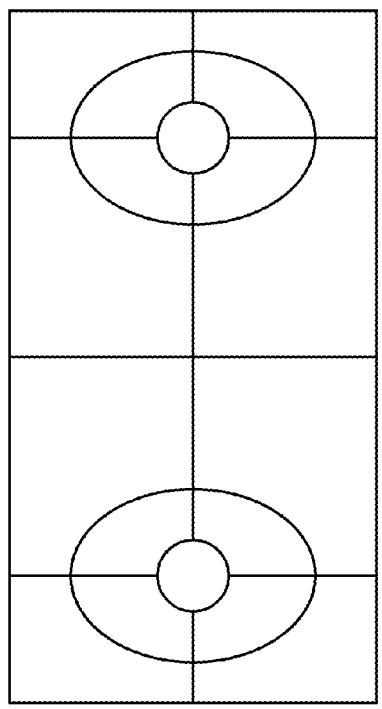

FIG. 19A shows a top view of a basketball court, and FIG. 19B-D show several examples of a non-uniform division of a location space of the court.

Figure 20:
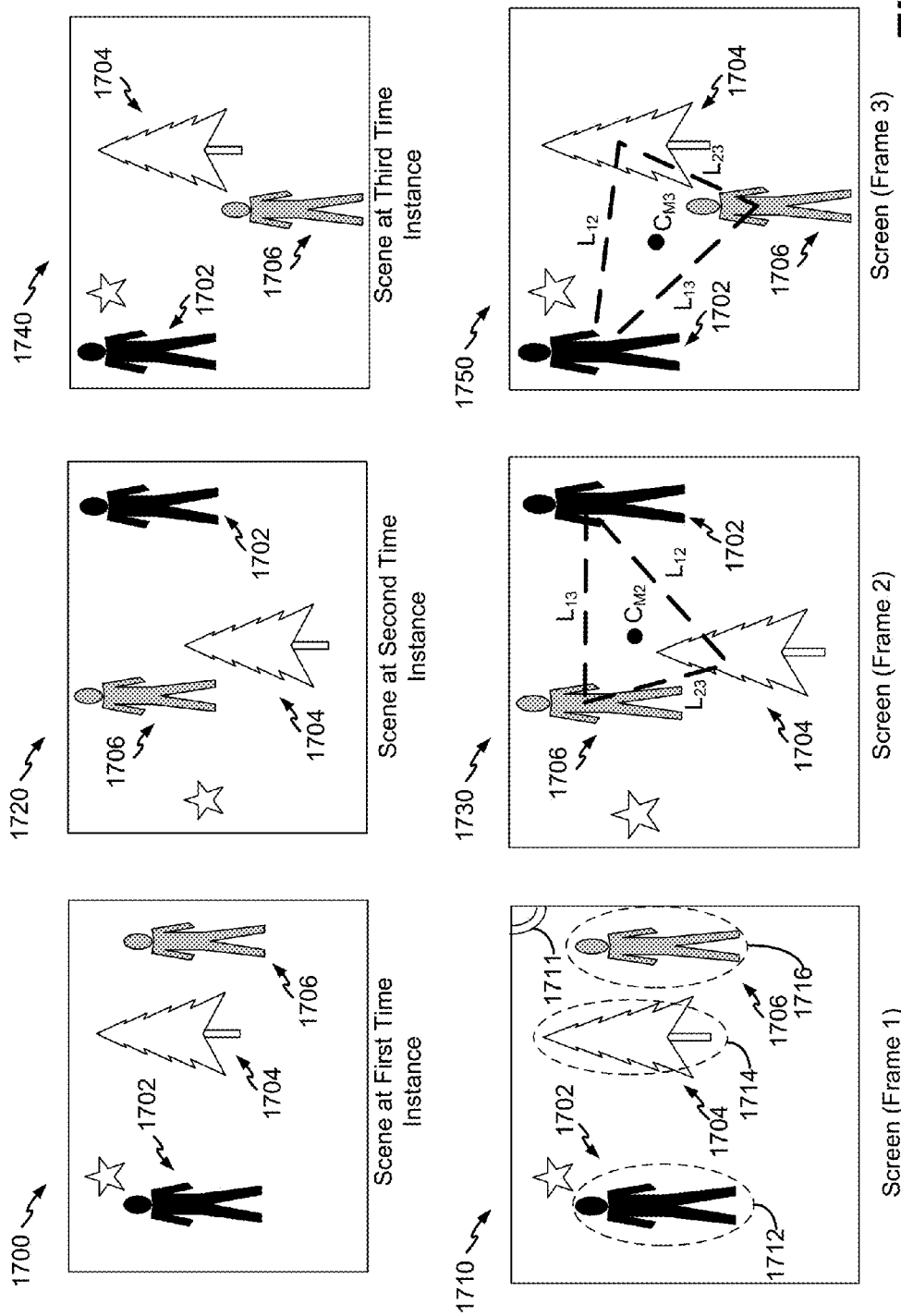

FIG. 20 is another particular embodiment depicting video processing using object tracking.

Figure 21:
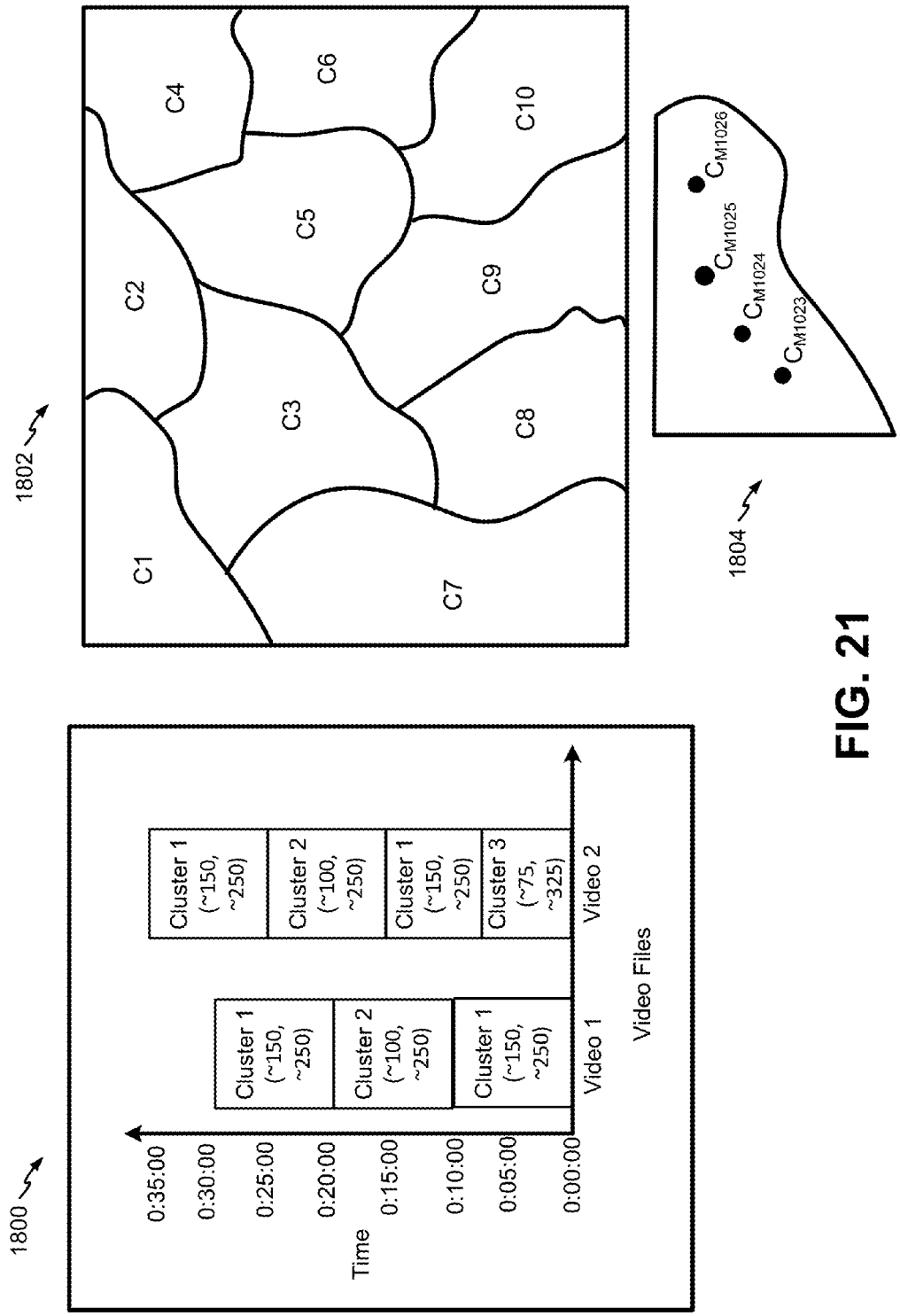

FIG. 21 depicts particular embodiments of a screen of a mobile device that is used to retrieve frames based on clustering.

Figure 22:
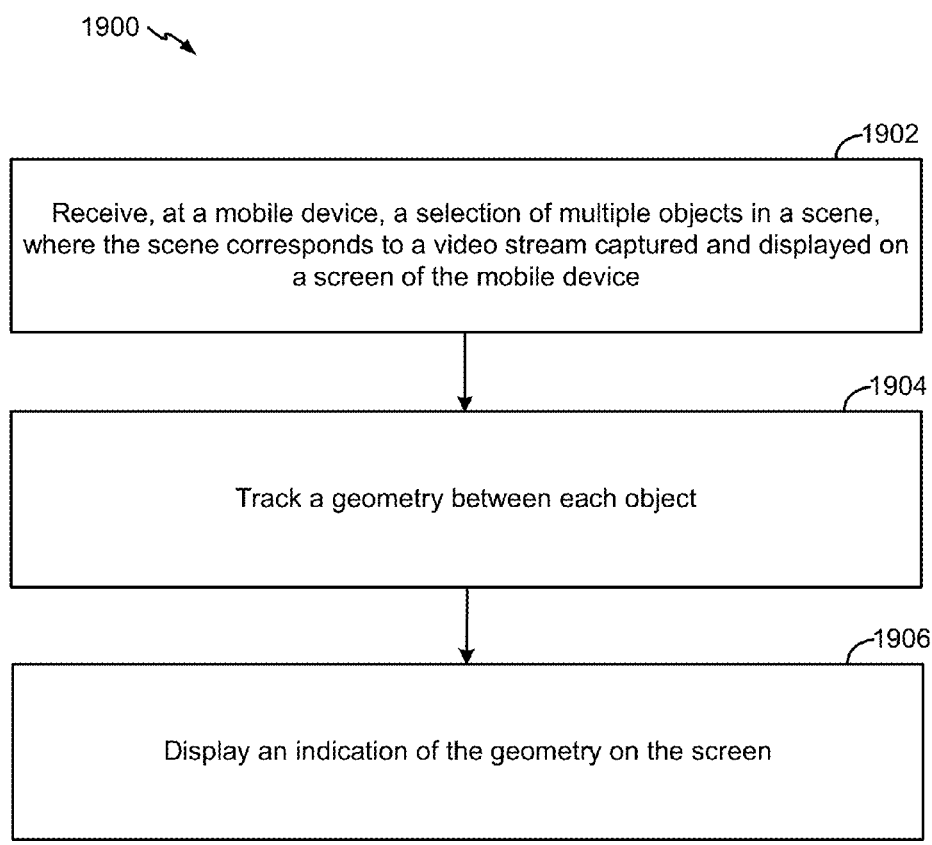

FIG. 22 is another flowchart of a particular illustrative embodiment of a video processing method using object tracking.

Figure 23:
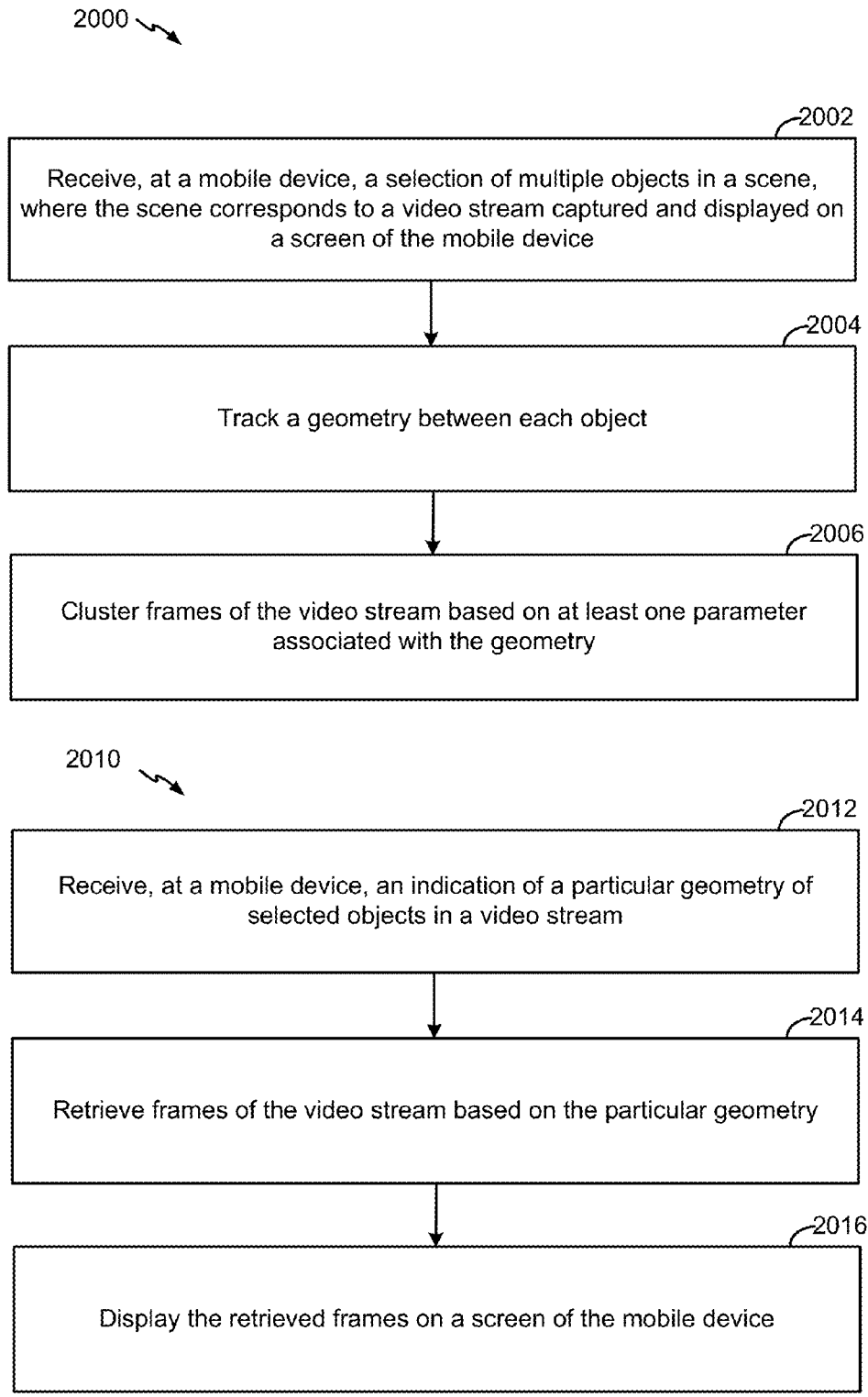

FIG. 23 depicts flowcharts of particular illustrative embodiments of a video processing methods using object tracking.

Figure 24:
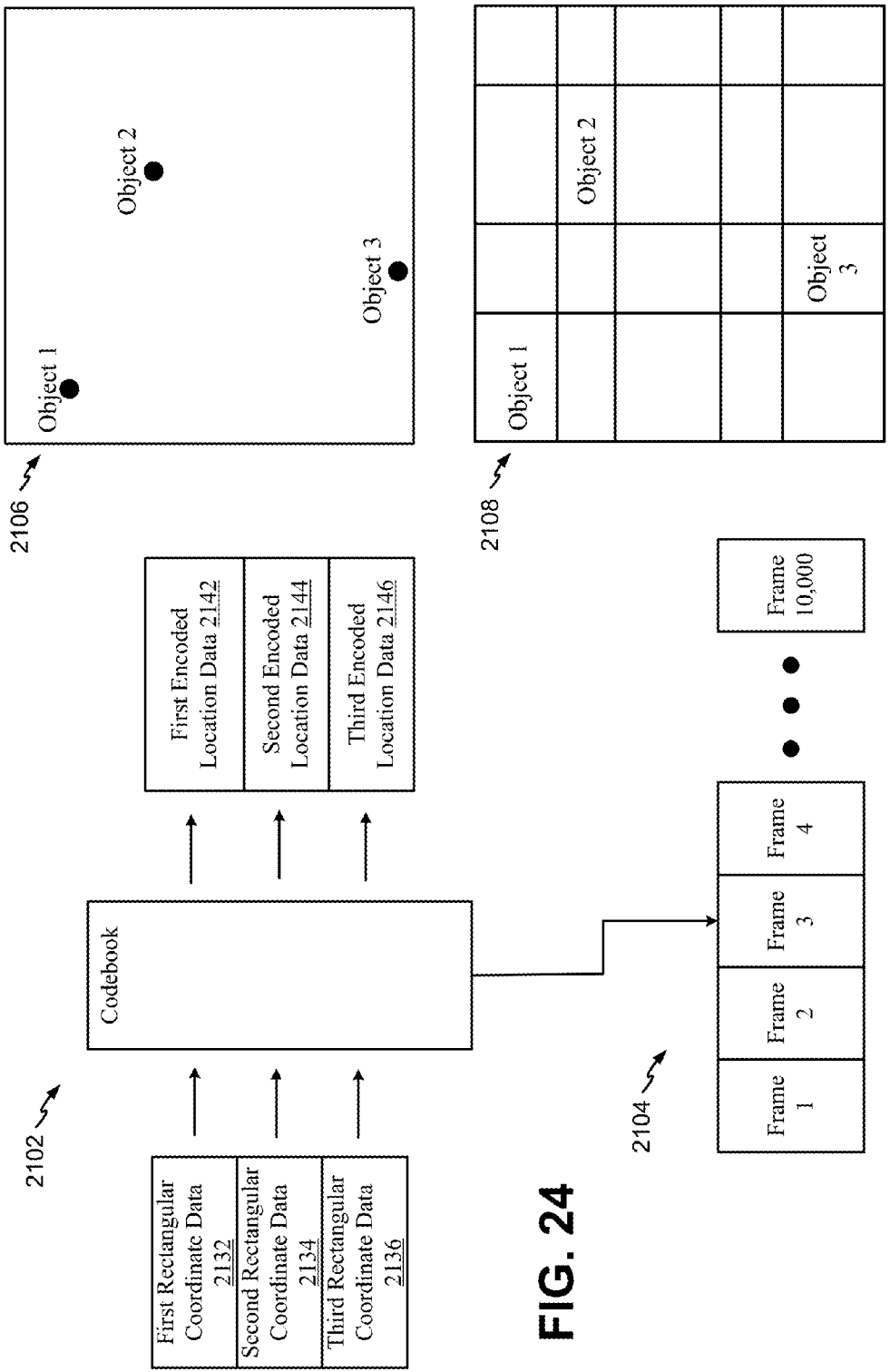

FIG. 24 depicts a particular embodiment of encoding metadata for an object location using rectangular coordinates.

Figure 25:
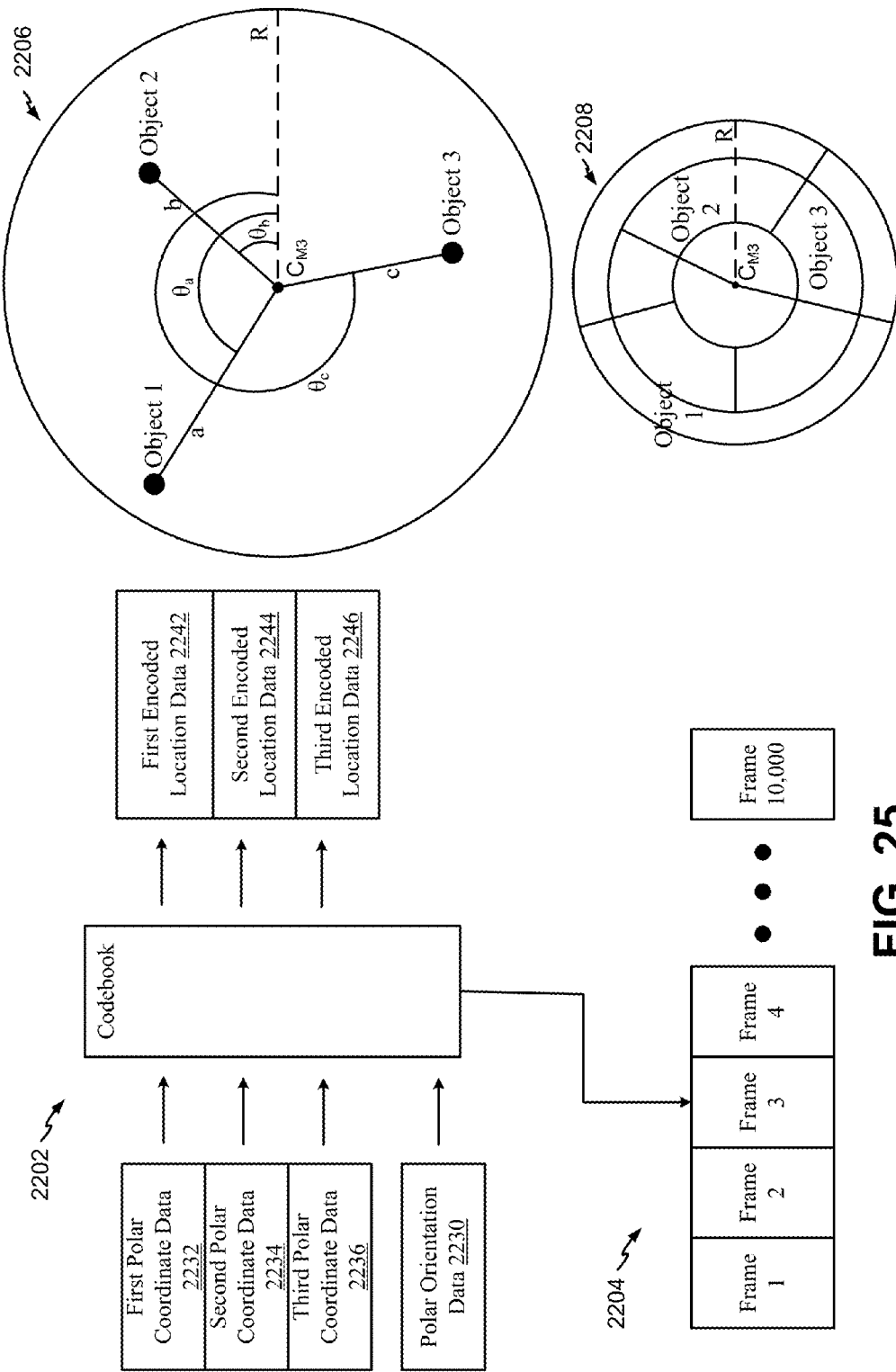

FIG. 25 depicts a particular embodiment of encoding metadata for an object location using polar coordinates.

Figure 26:
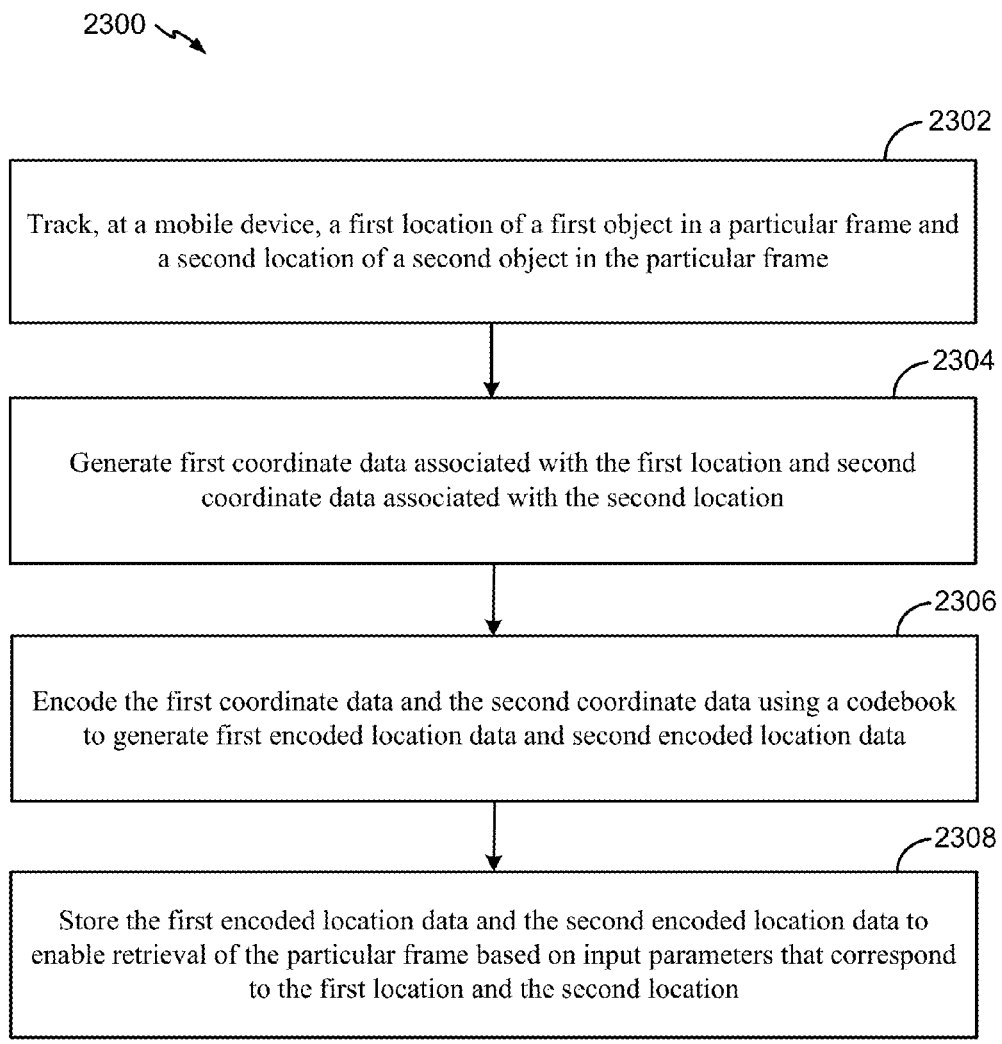

FIG. 26 is a flowchart of a particular illustrative embodiment of a method for encoding metadata.

Figure 27:
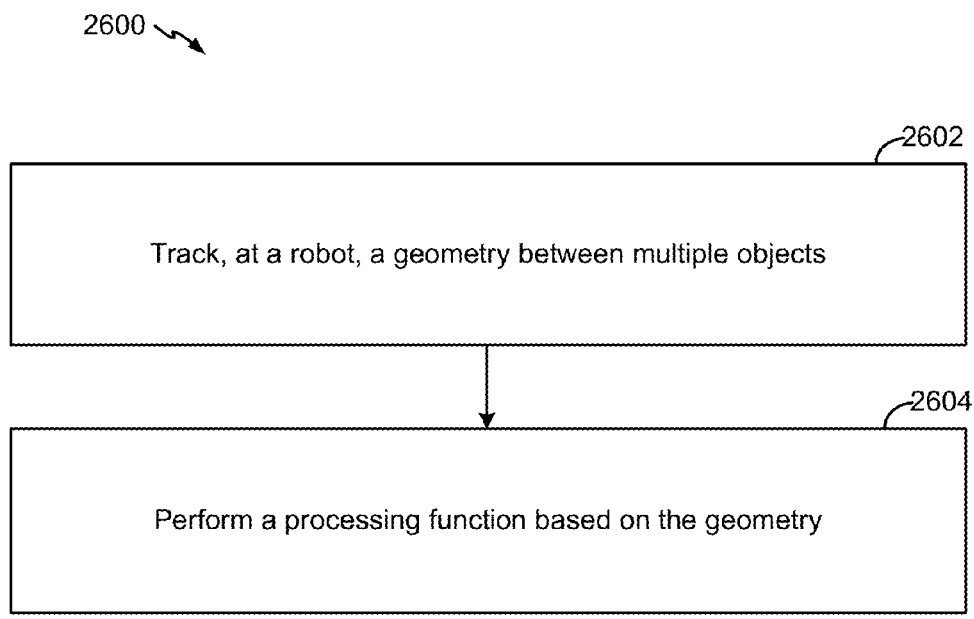

FIG. 27 is another flowchart of a particular illustrative embodiment of a video processing method using object tracking.

Figure 28:
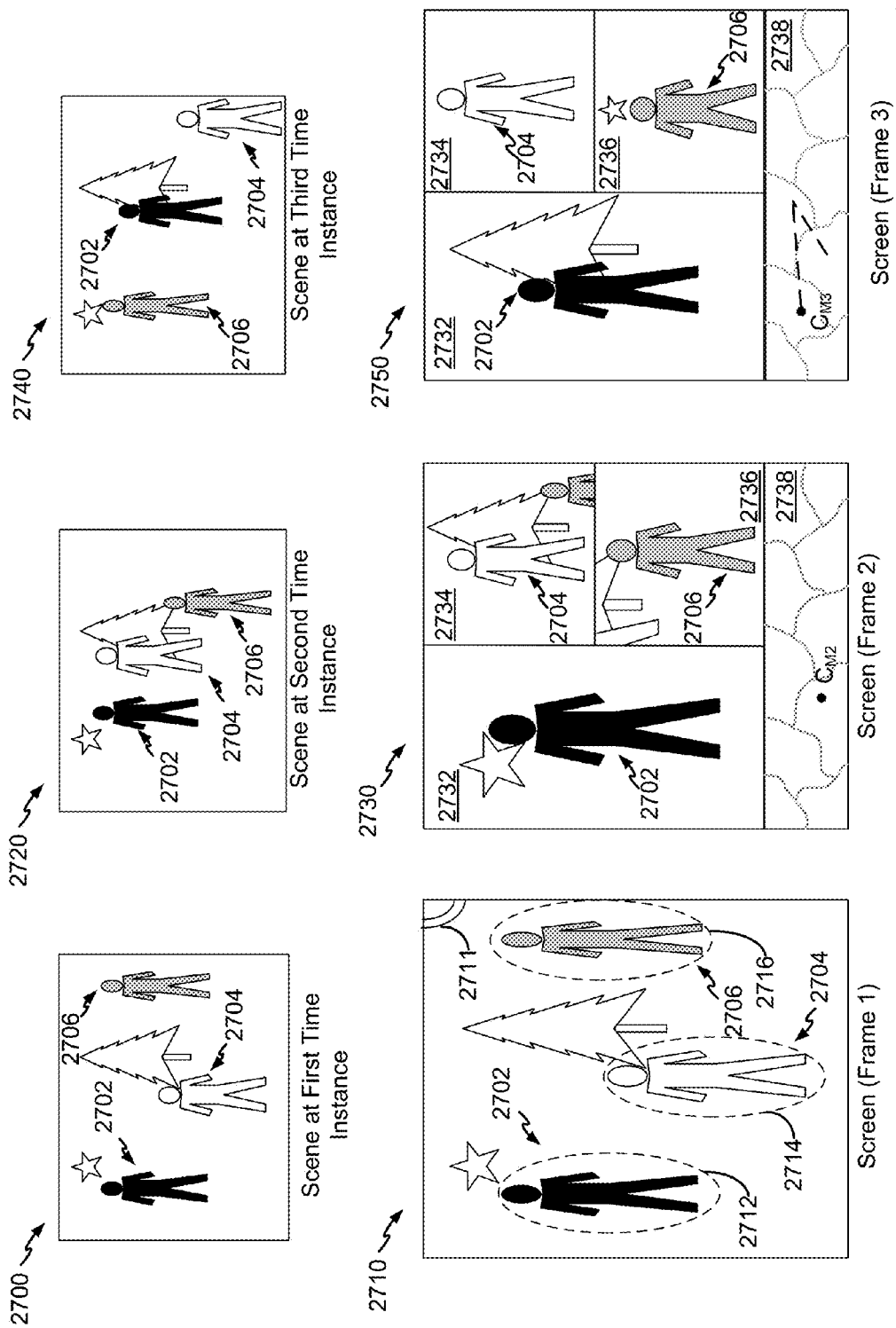

FIG. 28 is another particular embodiment depicting video processing using object tracking.

Figure 29:
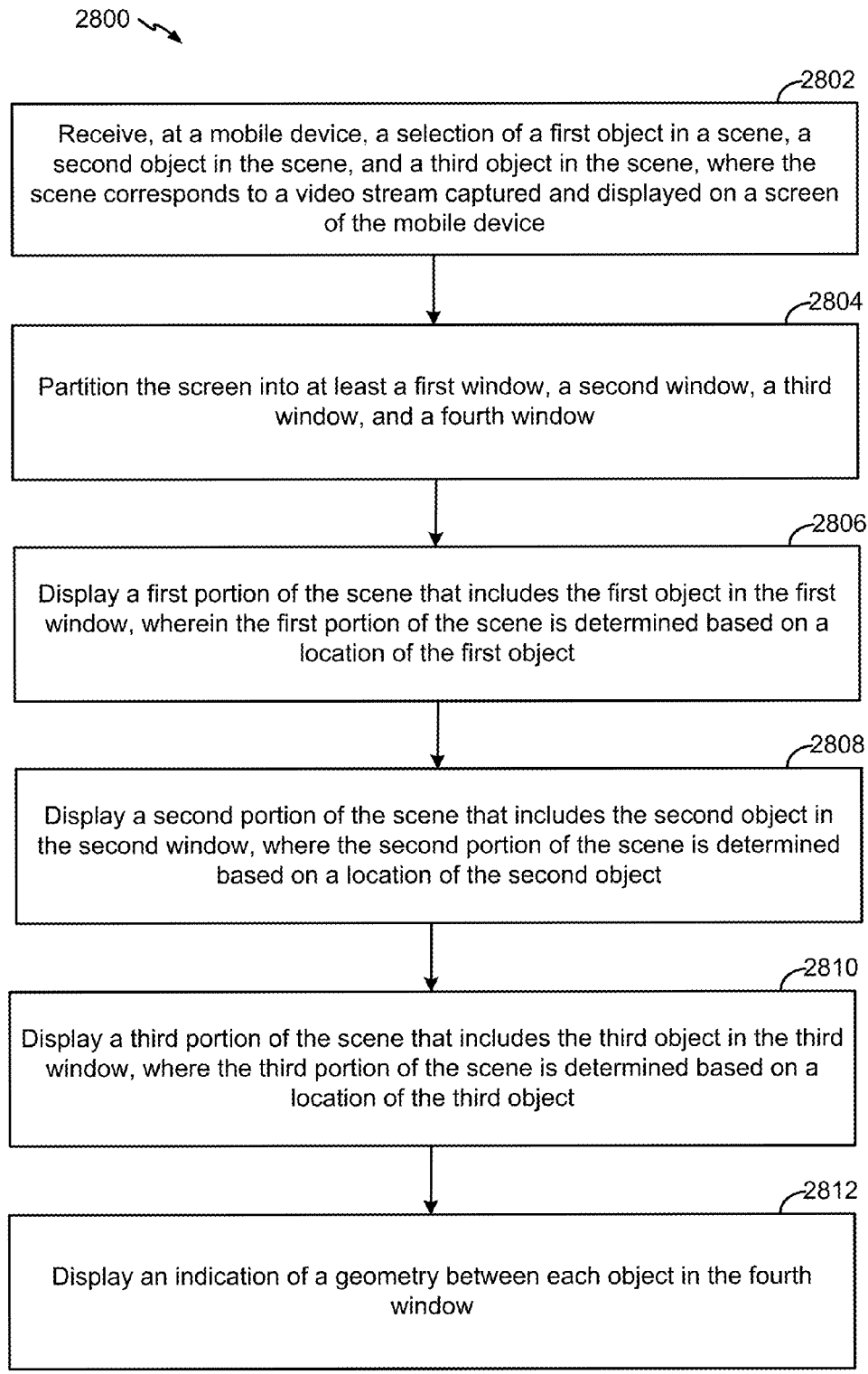

FIG. 29 is another flowchart of a particular illustrative embodiment of a video processing method using object tracking.

Figure 30D:
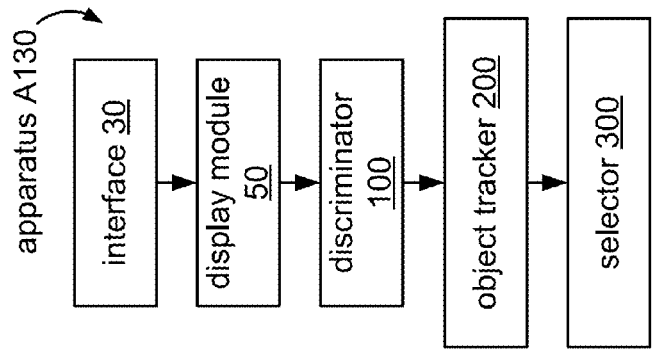
Figure 30C:
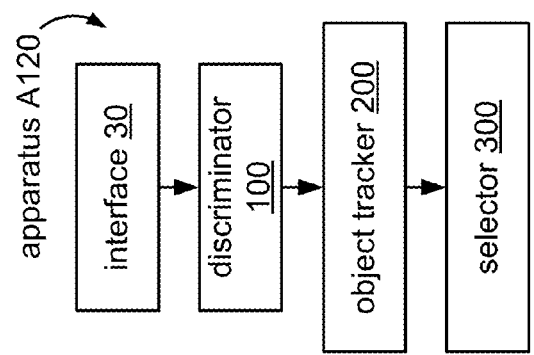
Figure 30B:
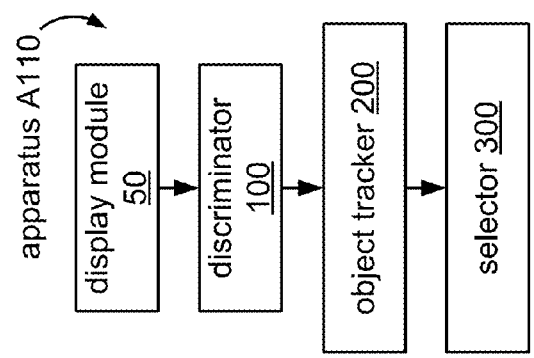
Figure 30A:
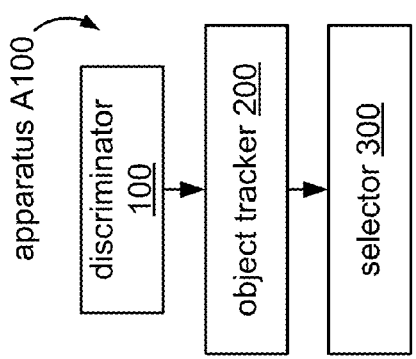

FIG. 30A shows a block diagram of an apparatus A100 according to a general configuration.

FIG. 30B shows a block diagram of an implementation A110 of apparatus A100.

FIG. 30C shows a block diagram of an implementation A120 of apparatus A100.

FIG. 30D shows a block diagram of an implementation A130 of apparatus A110 and A120.

Figure 31:
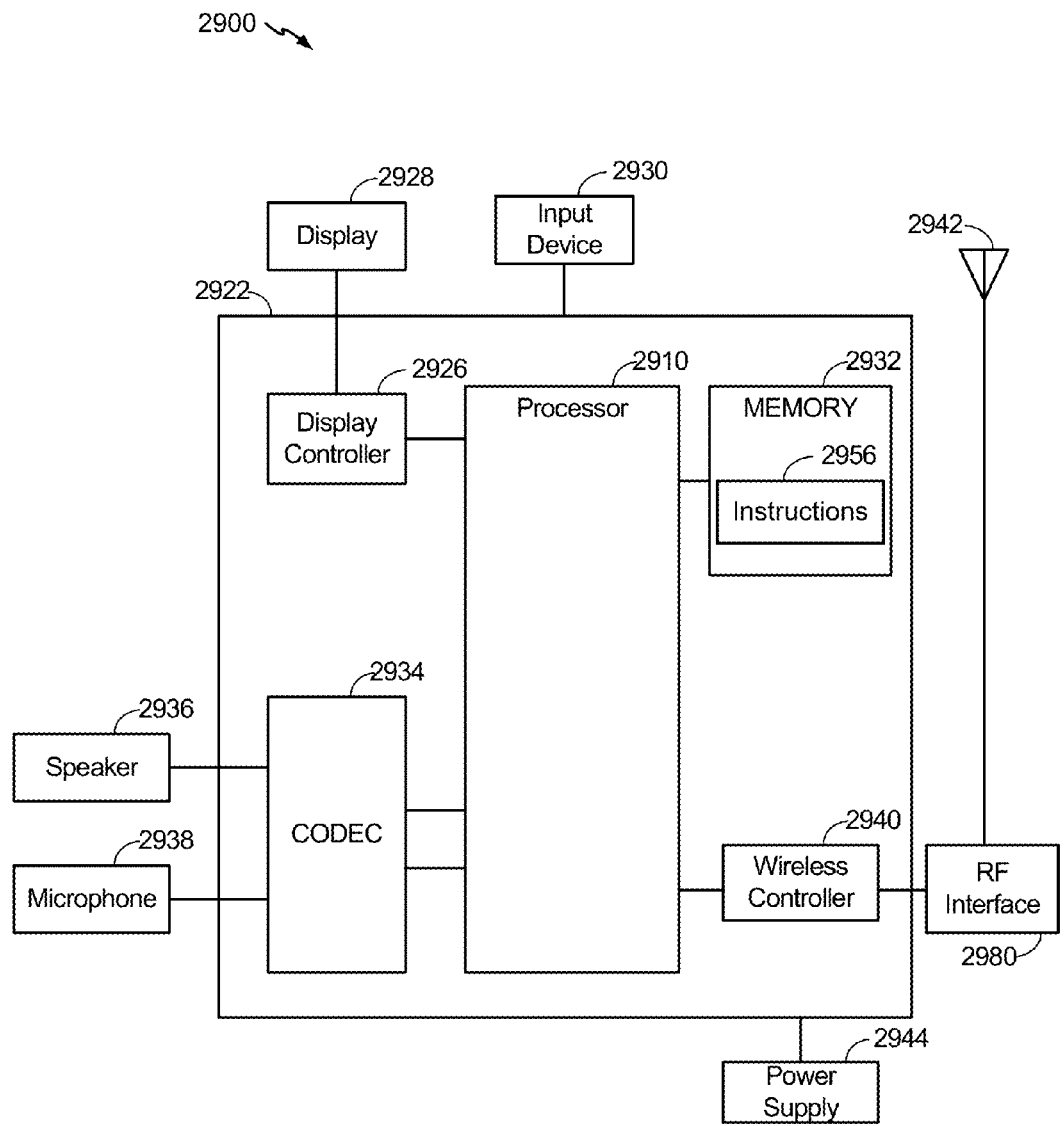

FIG. 31 is a block diagram of a wireless device including components operable to perform video processing techniques.

Figure 32D:
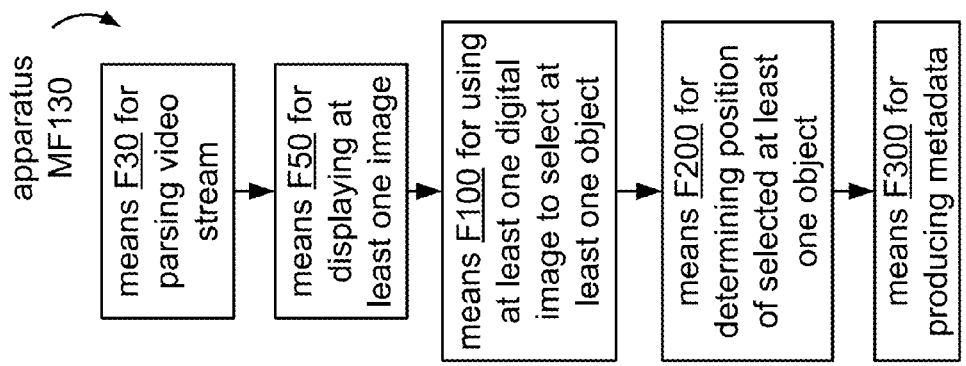
Figure 32C:
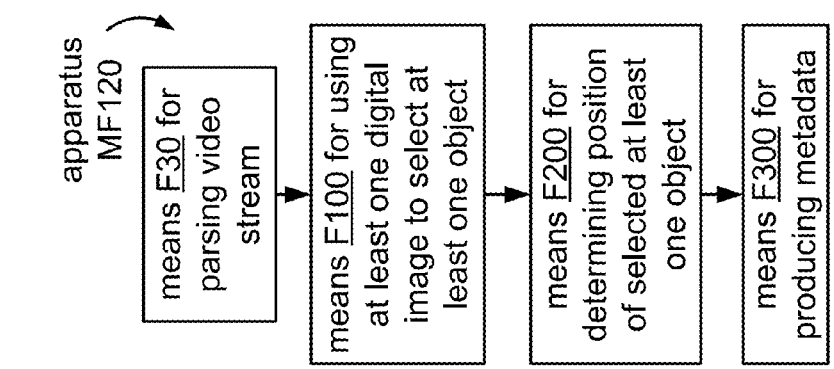
Figure 32B:
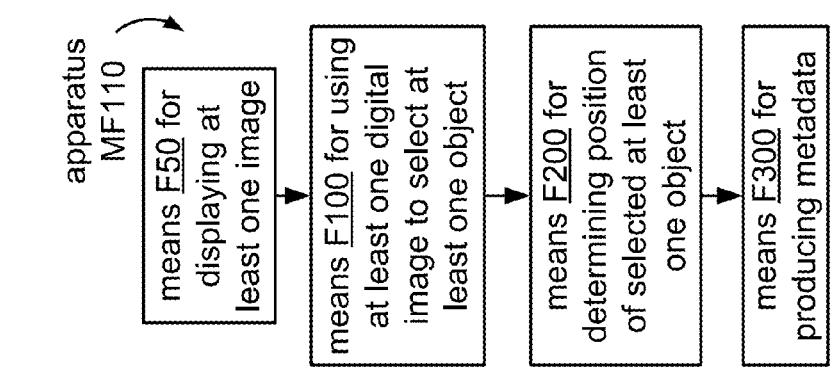
Figure 32A:

FIG. 32A shows a block diagram of an apparatus MF100 according to a general configuration.

FIG. 32B shows a block diagram of an implementation MF110 of apparatus MF100.

FIG. 32C shows a block diagram of an implementation MF120 of apparatus MF100.

FIG. 32D shows a block diagram of an implementation MF130 of apparatus MF110 and MF120.

FIG. 33A shows an example of a set of templates, and FIG. 33B shows examples of modifications to a template.

FIG. 34A shows examples of different formations of selected objects.

FIG. 34B shows examples of non-unique mappings.

FIG. 34C shows unique formations of selected objects.

Figure 35:
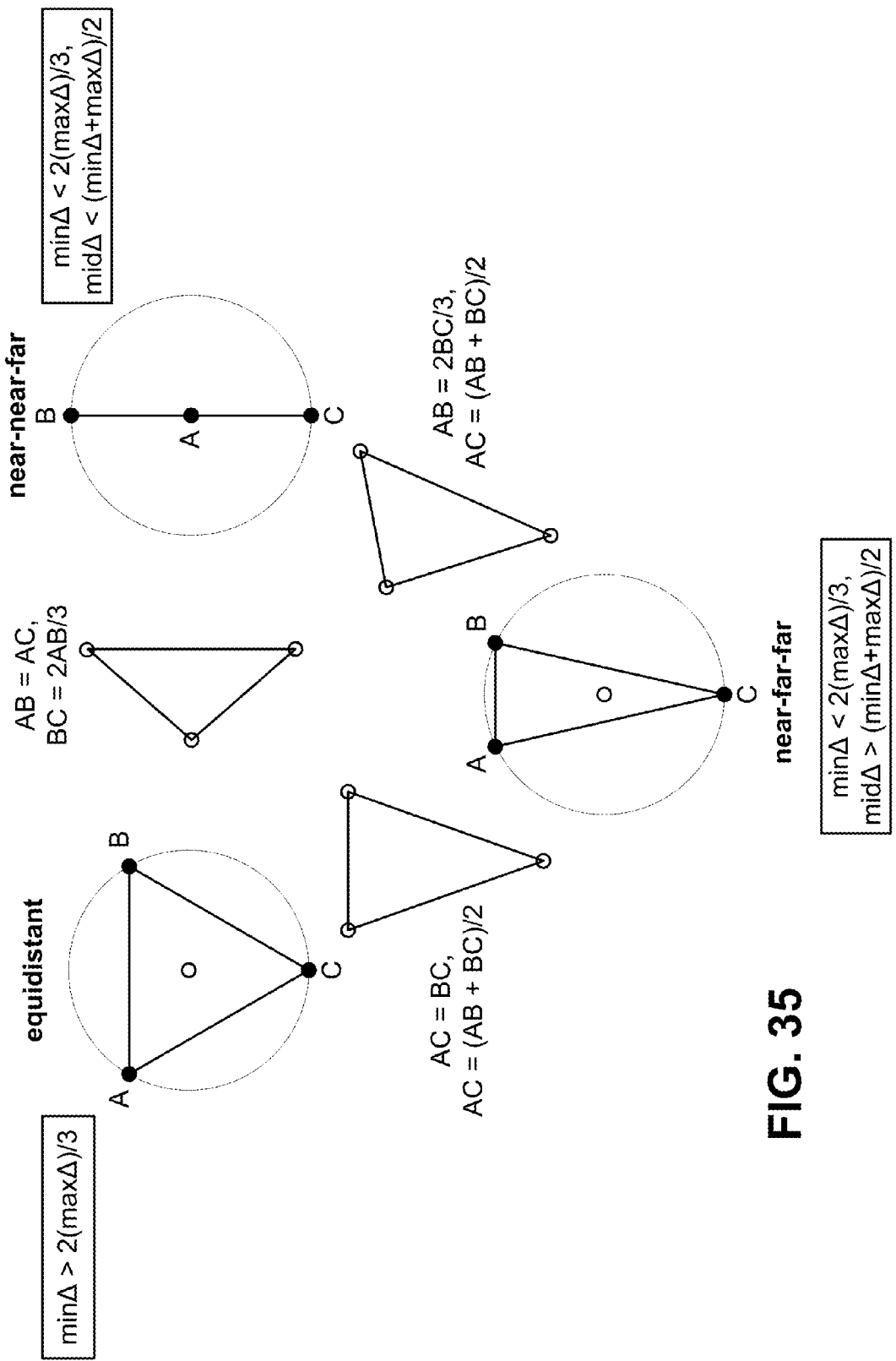

FIG. 35 shows an example of a set of decision metrics.

Figure 36:
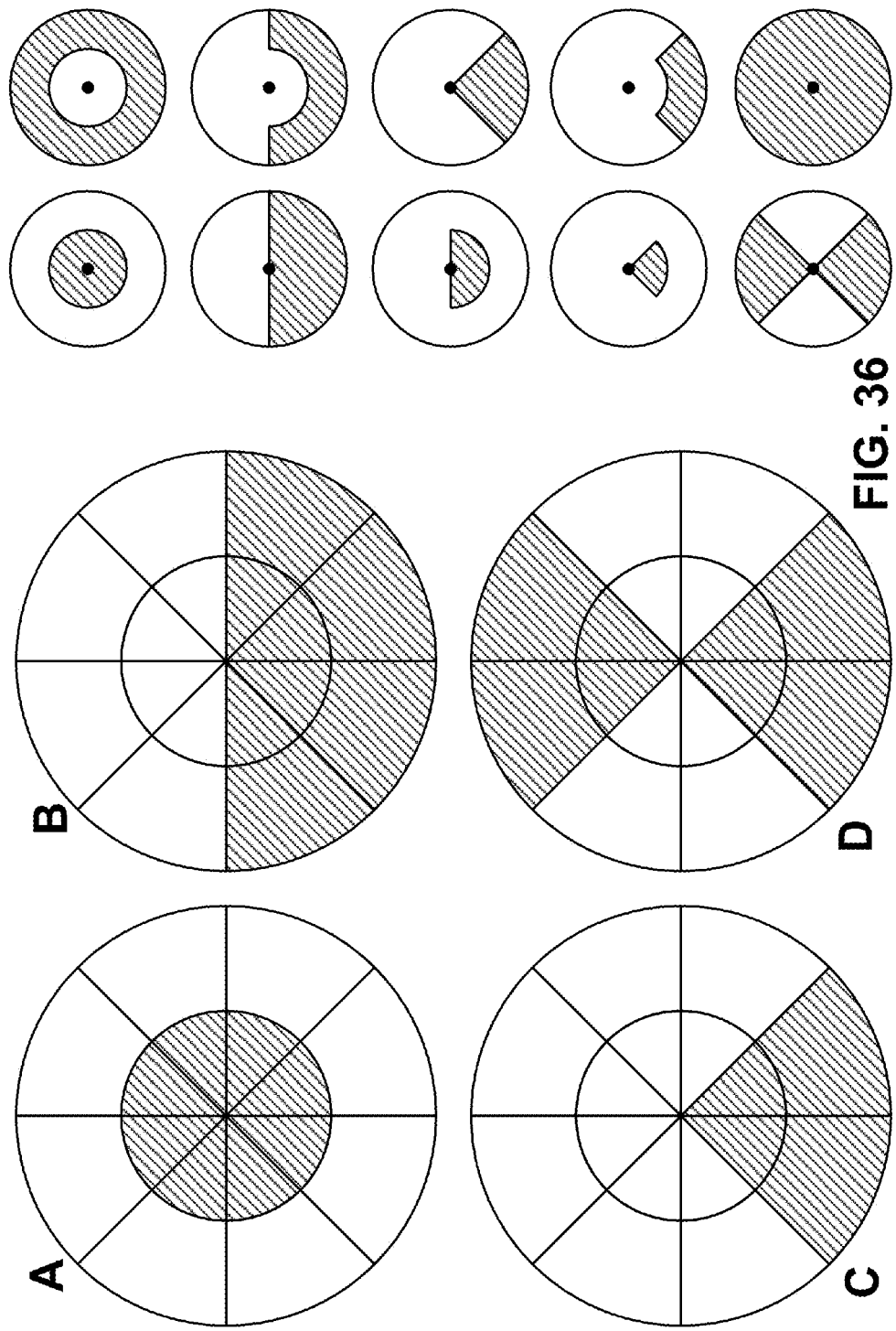

FIG. 36 shows another example of a set of decision metrics.

Figure 37D:
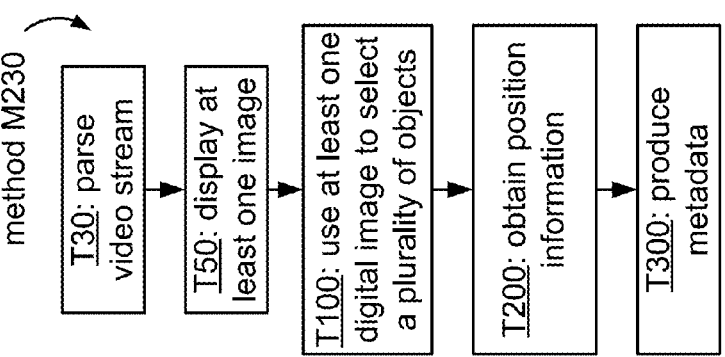
Figure 37C:
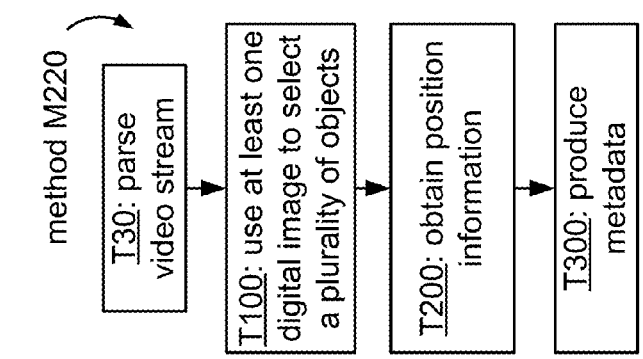
Figure 37B:
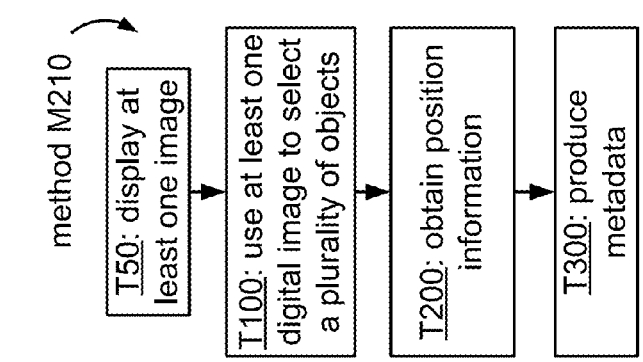
Figure 37A:
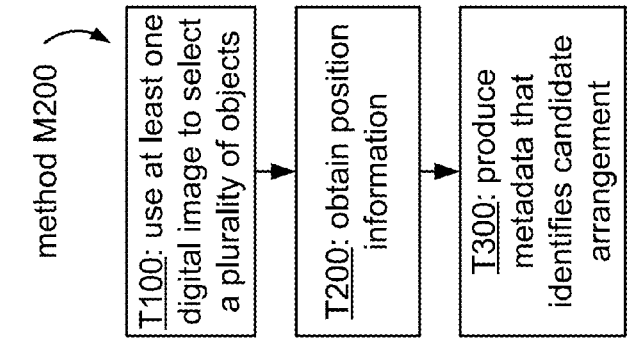

FIG. 37A shows a flowchart of an implementation M200 of method M200.

FIGS. 37B-D show flowcharts of implementations M210, M220, and M230 of methods M110, M120, and M130, respectively.

FIG. 38A shows a block diagram of an apparatus A100 for generating metadata according to a general configuration.

FIG. 38B shows a block diagram of an implementation A110 of apparatus A100.

FIG. 38C shows a block diagram of an implementation A120 of apparatus A100.

FIG. 38D shows a block diagram of an implementation A130 of apparatus A110 and A120.

FIG. 38E shows a block diagram of an implementation A200 of apparatus A100.

FIGS. 38F, 38G, and 39A show block diagrams of implementations A210, A220, and A230 of apparatus A110, A120, and A130, respectively.

FIG. 39B shows a block diagram of an implementation A300 of apparatus A100.

FIGS. 39C and 39D show block diagrams of implementations A310 and A330 of apparatus A200 and A230.

FIG. 40A shows a block diagram of an apparatus MF100 for generating metadata according to a general configuration.

FIG. 40B shows a block diagram of an implementation MF110 of apparatus MF100.

FIG. 40C shows a block diagram of an implementation MF120 of apparatus MF100.

FIG. 40D shows a block diagram of an implementation MF130 of apparatus MF110 and apparatus MF 120.

FIG. 40E shows a block diagram of an implementation MF200 of apparatus MF100.

FIGS. 40F, 40G, and 41A show block diagrams of implementations MF210, MF220, and MF230 of apparatus MF110, MF120, and MF130, respectively.

FIG. 41B shows a block diagram of an implementation MF400 of apparatus MF100.

FIG. 41C shows a block diagram of an implementation MF300 of apparatus MF100.

FIGS. 41D and 41E show block diagrams of implementations MF310 and MF330 of apparatus MF200 and MF230.

FIG. 42 shows a particular embodiment depicting video processing using object tracking.

FIG. 43 shows a particular embodiment of encoding metadata for an object location.

Figure 44:
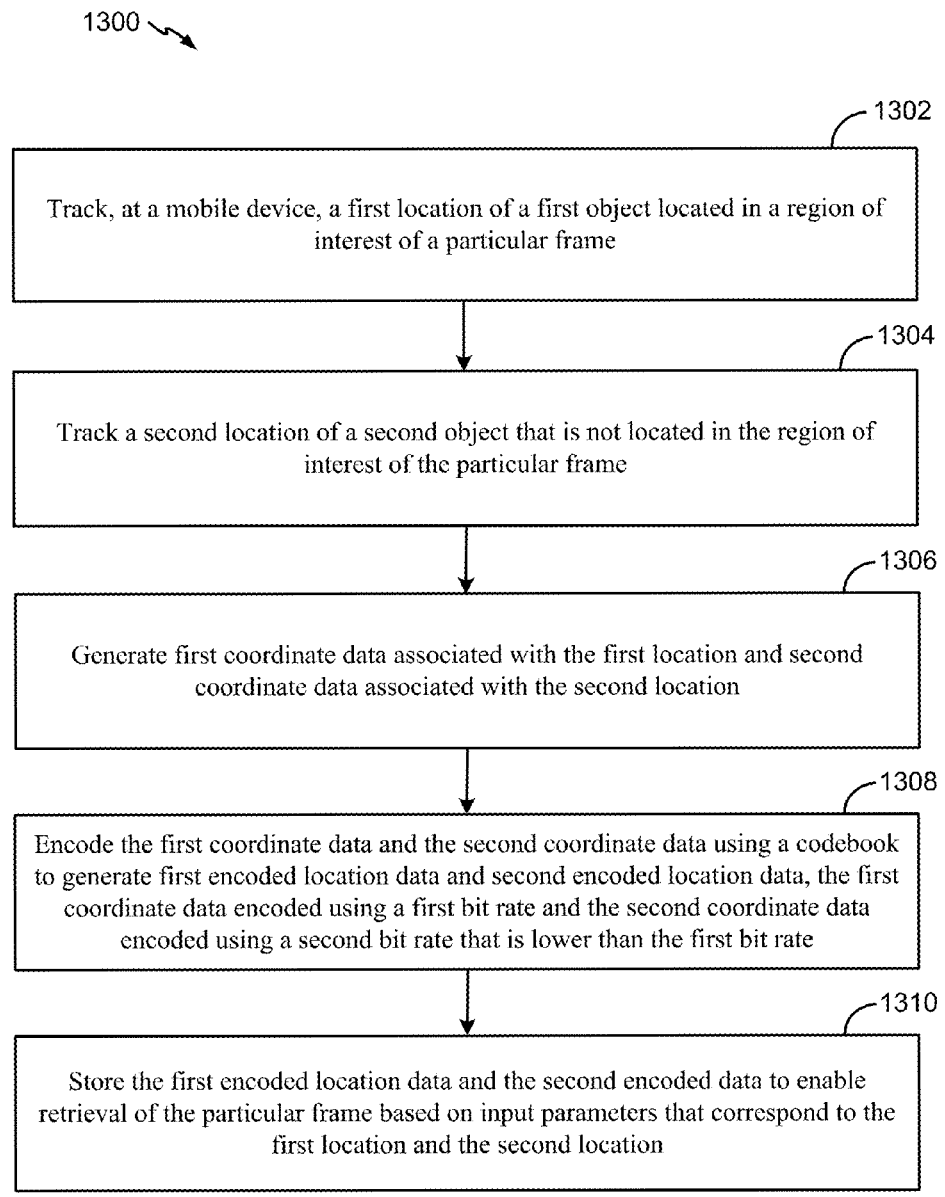

FIG. 44 shows a flowchart that illustrates a particular embodiment of a video processing method.

FIG. 45A shows a flowchart of a method M500 according to a general configuration.

FIG. 45B shows a flowchart of an implementation M510 of method M500.

FIG. 46A shows a flowchart of an implementation M520 of method M500.

FIG. 46B shows a flowchart of an implementation M530 of methods M510 and M520.

FIG. 46C shows a flowchart of an implementation M540 of method M500.

FIG. 47A shows a block diagram of an apparatus A500 according to a general configuration.

FIG. 47B shows a block diagram of an implementation A540 of apparatus A500.

FIG. 47C shows a block diagram of an apparatus MF500 according to a general configuration.

VI. DETAILED DESCRIPTION

A wireless telephone or other mobile device may capture video streams with a camera and/or receive video streams from another device and/or via a network. New and/or improved features for tracking objects within the video streams may be desired.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose."

Unless otherwise indicated, the term "series" is used to indicate a sequence of two or more items. Unless initially introduced by a definite article, an ordinal term (e.g., "first," "second," "third," etc.) used to modify a claim element does not by itself indicate any priority or order of the claim element with respect to another, but rather merely distinguishes the claim element from another claim element having a same name (but for use of the ordinal term). Unless expressly limited by its context, each of the terms "plurality" and "set" is used herein to indicate an integer quantity that is greater than one.

Figure 1:
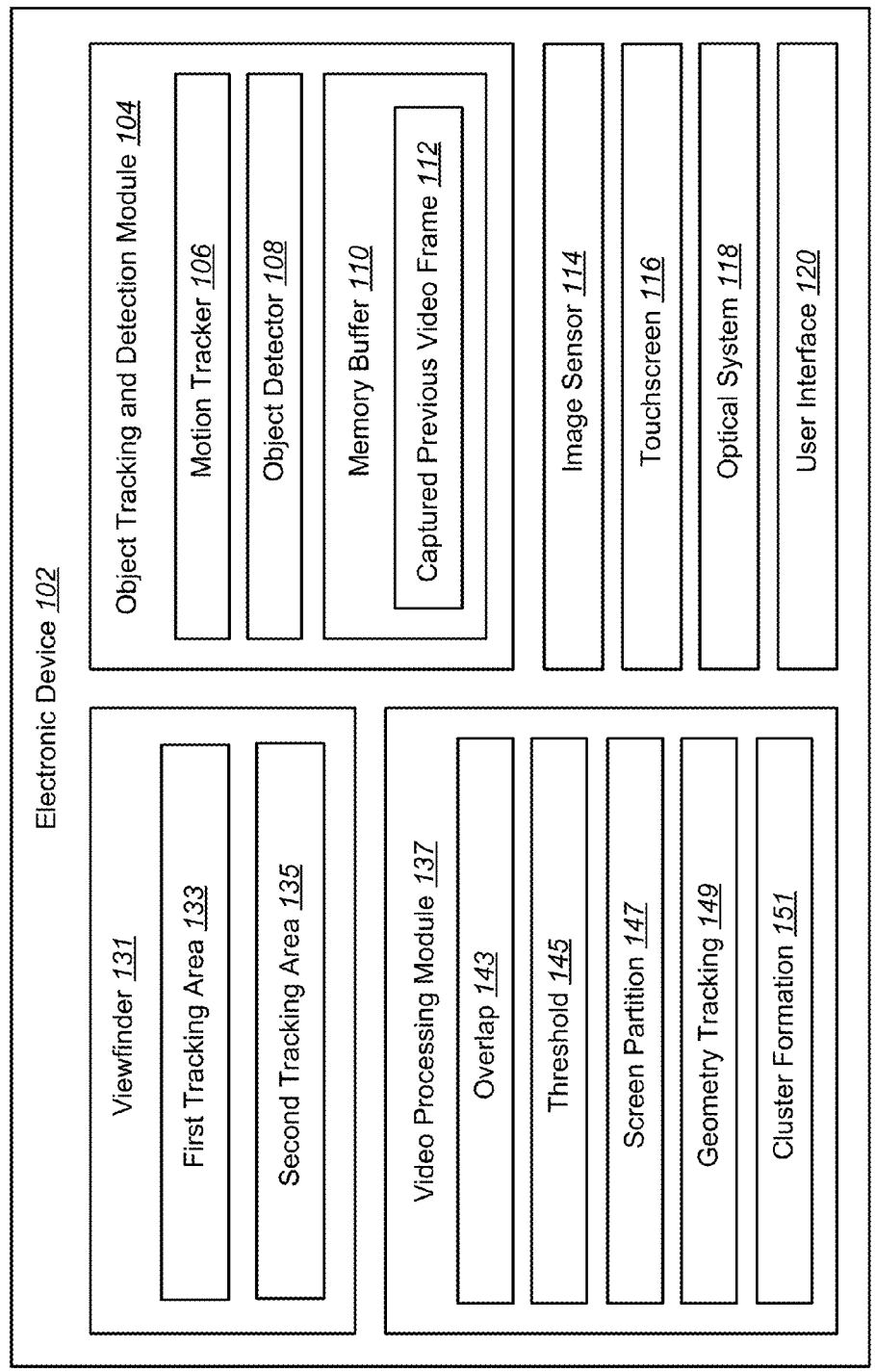
FIG. 1 is a block diagram that depicts an electronic device.

Referring to FIG. 1, a block diagram illustrating an electronic device 102 is shown. The electronic device 102 may also be referred to as a wireless communication device, a mobile device, a mobile station, a subscriber station, a client, a client station, a user equipment (UE), a remote station, an access terminal, a mobile terminal, a terminal, a user terminal, a subscriber unit, etc. Examples of electronic devices include laptop or desktop computers, cellular phones, smart phones, wireless modems, e-readers, tablet devices, gaming systems, etc. Some of these devices may operate in accordance with one or more industry standards.

The electronic device 102, such as a smartphone or tablet computer, may include a camera. The camera may include an image sensor 114 and an optical system 118 (e.g., lenses) that focuses images of objects that are located within the field of view of the optical system 118 onto the image sensor 114. The electronic device 102 may also include a camera software application and a display screen. When the camera application is running, images of objects that are located within the field of view of the optical system 118 may be recorded by the image sensor 114. The images that are being recorded by the image sensor 114 may be displayed on the display screen. These images may be displayed in rapid succession at a relatively high frame rate so that, at any given moment in time, the objects that are located within the field of view of the optical system 118 are displayed on the display screen. Although the embodiments are described in terms of captured frames (e.g., video frames), the techniques discussed herein may be used on any digital image. Therefore, the terms "frame" and "digital image" may be used interchangeably herein.

A user interface 120 of the camera application may permit one or more objects that are being displayed on the display screen to be tracked. The user of the electronic device 102 may be permitted to select the object(s) that is/are to be tracked. Further, the selected object(s) may be used as a reference for later detecting the object.

In one configuration, the display is a touchscreen 116 that receives input from physical touch, e.g., by a finger, stylus or other tool. The touchscreen 116 may receive touch input defining a target object to be tracked. For example, if the electronic device 102 is capturing a nature scene that includes an animal of interest, a user may draw a bounding box around the animal indicating a desire that the animal be tracked, or detected, if necessary. Target objects may be selected in any suitable way. For example, facial recognition, pedestrian recognition, etc., may be used to select a target object that is to be tracked, detected, or both. In one configuration, multiple objects may be tracked. A user interface 120 may allow a user to interact with an object tracking and detection module 104, e.g., to select (i.e., define) one or more target objects. The touchscreen 116 may include a viewfinder 131. The viewfinder 131 may refer to the portion of the touchscreen 116 that displays a video stream or a live feed. For example, the viewfinder 131 may display the view obtained by a camera on the electronic device 102.

The electronic device 102 may include an object tracking and detection module 104 for tracking a selected object and/or detecting the object in a video frame. The object tracking and detection module 104 may include a motion tracker 106 for tracking one or more objects. The motion tracker 106 may be motion-based for tracking a motion of points on an image (e.g., a video frame) from frame to frame to estimate the location and/or change of location of a target object between a previous video frame and a current video frame.

The object tracking and detection module may also include an object detector 108 for detecting an object in a video frame. The object detector 108 may use an object model, rather than a motion-based model, to detect an object by comparing all or a portion of a current video frame to a selected object or portion of a captured previous video frame 112 (e.g., in a sequence of video frames). The object detector 108 may be used for detecting multiple objects within a video frame.

The object tracking and detection module 104 may also include a memory buffer 110. The memory buffer 110 may store one or more captured frames and data associated with the captured video frames. In one example, the memory buffer 110 may store a previous captured video frame 112. The object tracking and detection module 104 may use data provided from the memory buffer 110 about a captured previous video frame 112 in performing motion-based tracking and/or object detection. Data may be provided to the motion tracker 106 or object detector 108 via feedback from the memory buffer 110 in order to tailor motion-based tracking and object detection to more accurately track and/or detect a target object. For example, the memory buffer 110 may provide location and window size data to the motion tracker 106 and the object detector 108 to provide the motion tracker 106 and object detector 108 with one or more parameters that may be used to more accurately pinpoint a location and size of an object when tracking or detecting the object.

As stated above, the electronic device 102 may perform motion-based tracking. Motion-based tracking may be performed using a variety of methods. In one example, tracking is performed by a median flow method in which the motion tracker 106 accepts a pair of images $I_t$, $I_{t+1}$ (e.g., video frames) and a bounding box $\beta_t$ and outputs a bounding box $\beta_{t+1}$. A set of points may be initialized on a rectangular grid within the bounding box $\beta_t$ and the points may be tracked to generate a sparse motion flow between $I_t$ and $I_{t+1}$. A quality of the point prediction may be estimated and each point assigned an error. A portion (e.g., 50%) of the worst predictions may be filtered out while the remaining predictions are used to estimate the displacement of the whole bounding box. The motion tracker 106 may perform motion-based tracking on each video frame captured by the electronic device 102. In a similar method, motion-based tracking may be performed by calculating one or more gradients (e.g., x and y gradients) and using the difference between a pair of frames to calculate a time gradient and using the multiple gradient values to accurately track a target object within a current video frame. Further details regarding motion-based tracking are provided below.

When performing motion-based tracking, the motion tracker 106 may determine a tracking confidence value based on a calculated or estimated accuracy of the motion-tracking method. In some configurations, the tracking confidence value may be a real number between 0 and 1 corresponding to a likelihood or probability that a target object falls within a current video frame or a defined window of the video frame. The tracking confidence value may be compared to a tracking threshold. If the tracking confidence value is greater than the tracking threshold, the likelihood may be high that the target object is found within the current video frame. Alternatively, if the tracking confidence value is less than or equal to a tracking threshold, the likelihood may be low or uncertain whether the target object is found within the current video frame. Various methods for determining a tracking confidence value may be used. In one configuration, the tracking confidence value is determined by calculating a normalized cross correlation (NCC) between a tracked window (e.g., a tracking patch window) in a current video frame and previously stored image patches from previously captured video frames. Further details regarding determining a tracking confidence value are provided below.

The electronic device 102 may also perform object detection. Object detection may be performed using a variety of methods. In one configuration, object detection is performed using a sliding window method in which the content of multiple subsets of windows within a video frame are viewed to determine whether a target object is found in a current video frame or within a particular window or subset of windows of the current video frame. All or a subset of all possible window locations and sizes may be searched in a video frame. For example, each window may correspond to pixels of data and the object detector 108 may perform one or more computations using the pixels of data to determine a level of confidence (e.g., a binary indicator) that the target object is within a particular window or sub-window. Based on the level of confidence associated with one or more windows, a detector confidence value may be obtained for a current video frame. Further, additional techniques may be used for increasing the accuracy or efficiency of the object detection. Some of these techniques are explained below.

In some configurations, the motion tracker 106 and object detector 108 may operate sequentially rather than in parallel. For example, the electronic device 102 may perform motion-based tracking of a selected object (e.g., target object) and sequentially perform object detection of the selected object based on a tracked parameter. In one configuration, the electronic device 102 may perform motion-based tracking on a current video frame. The electronic device 102 may then perform object detection on the current frame based on a tracked parameter. In one configuration, the tracked parameter may be based on a comparison between a confidence value and a threshold. For example, if a tracking confidence value is below a tracking threshold, the electronic device 102 may perform object detection. Alternatively, if a tracking confidence value is above a tracking threshold, the electronic device 102 may skip object detection for a current video frame and continue performing motion-based tracking on a next video frame based on the motion tracking results of the current video frame. In other words, object detection may be performed only when the motion-based tracking is not very good, e.g., tracking confidence value is below a tracking threshold. Other tracked parameters may be used when considering whether and/or how object detection is performed. Examples of tracked parameters may include a region of a target object, a window location, a window size, a scale level, a target size, a tracking and/or detection confidence value, or other parameters that may be used to facilitate efficient tracking and/or detection of a target object.

Sequentially performing motion-based tracking and object detection based on a tracked parameter may enable the electronic device 102 to track and/or detect a target object within a video frame without performing extensive computations. Specifically, because motion-based tracking may be less computationally intensive than object detection, an electronic device 102 may skip performing object detection where motion-based tracking may be used to accurately track a target object within a current video frame. For example, if an electronic device 102 determines that a tracking confidence value exceeds a specific target threshold, the electronic device 102 may determine that object detection is not needed on a current video frame to accurately determine the location or presence of a target object within the current video frame. Further, because object detection may be beneficial in many cases, the electronic device 102 may determine cases in which object detection may be used to more accurately detect a target object or to perform object detection in cases where motion-based tracking is inadequate based on a comparison to a tracking threshold value.

In some configurations, rather than skipping object detection on a current video frame, the results of the motion-based tracking and/or additional information provided by the memory buffer 110 may be used to narrow or tailor the process of performing object detection. For example, where a target object cannot be accurately tracked using a motion-based tracking method, the electronic device 102 may still estimate or obtain information about the location, window scale or other tracked parameter associated with a target object that may be used during object detection to more accurately detect an object using less computational power than without the parameters provided via motion-based tracking. Therefore, even in cases where the motion-based tracking does not provide a tracking confidence value exceeding a tracking threshold, the results of the motion-based tracking may be used when subsequently performing object detection.

The viewfinder 131 on the electronic device 102 may include a first tracking area 133 and a second tracking area 135. Both the first tracking area 133 and the second tracking area 135 may be specified by a user using the touchscreen 116. For example, a user may drag a focus ring on the touchscreen 116 to the desired locations of the first tracking area 133 and the second tracking area 135. Although not required, one of the tracking areas may be stationary. For example, the first tracking area 133 may track an object (e.g., a person walking) and the second tracking area 135 may cover a stationary tree. In one configuration, the second tracking area 135 may cover the entire touchscreen 116 on the electronic device 102.

The electronic device 102 may include a video processing module 137. The video processing module 137 may include an overlap 143. The overlap 143 may reflect the amount of overlap between the first tracking area 133 and the second tracking area 135. For example, the overlap 143 may be 0% if the first tracking area 133 and the second tracking area 135 do not overlap each other at all. Likewise, the overlap 143 may be 100% if the first tracking area 133 completely overlaps the second tracking area 135 (or if the second tracking area 135 completely overlaps the first tracking area 133, depending on which tracking area is larger). The video processing module 137 may include a threshold 145. The overlap 143 may be compared with the threshold 145 to determine whether video processing should be performed, as described with respect to FIG. 13.

The video processing module 137 may also include a screen partition 147 function. For example, the screen partition 147 may partition the viewfinder 131 into multiple windows to display individual video streams associated with the first tracking area 133 and the second tracking area 135, as described with respect to FIGS. 11, 13, 15, and 21. The video processing module 137 may also include a geometry tracking 149 function. For example, the geometry tracking 149 function may track a geometry between the first tracking area 133 and the second tracking area 135, as described with respect to FIGS. 17 and 18. The geometry may be displayed on the viewfinder 131. The video processing module 137 may also include a cluster formation 151 function. The cluster formation 151 function may generate clusters based on at least one parameter (e.g., a center of mass) associated with the geometry. For example, each cluster may include video frames that have a substantially similar geometry between the first tracking area 133 and the second tracking area 135, as described with respect to FIGS. 17 and 18.

Figure 2A:
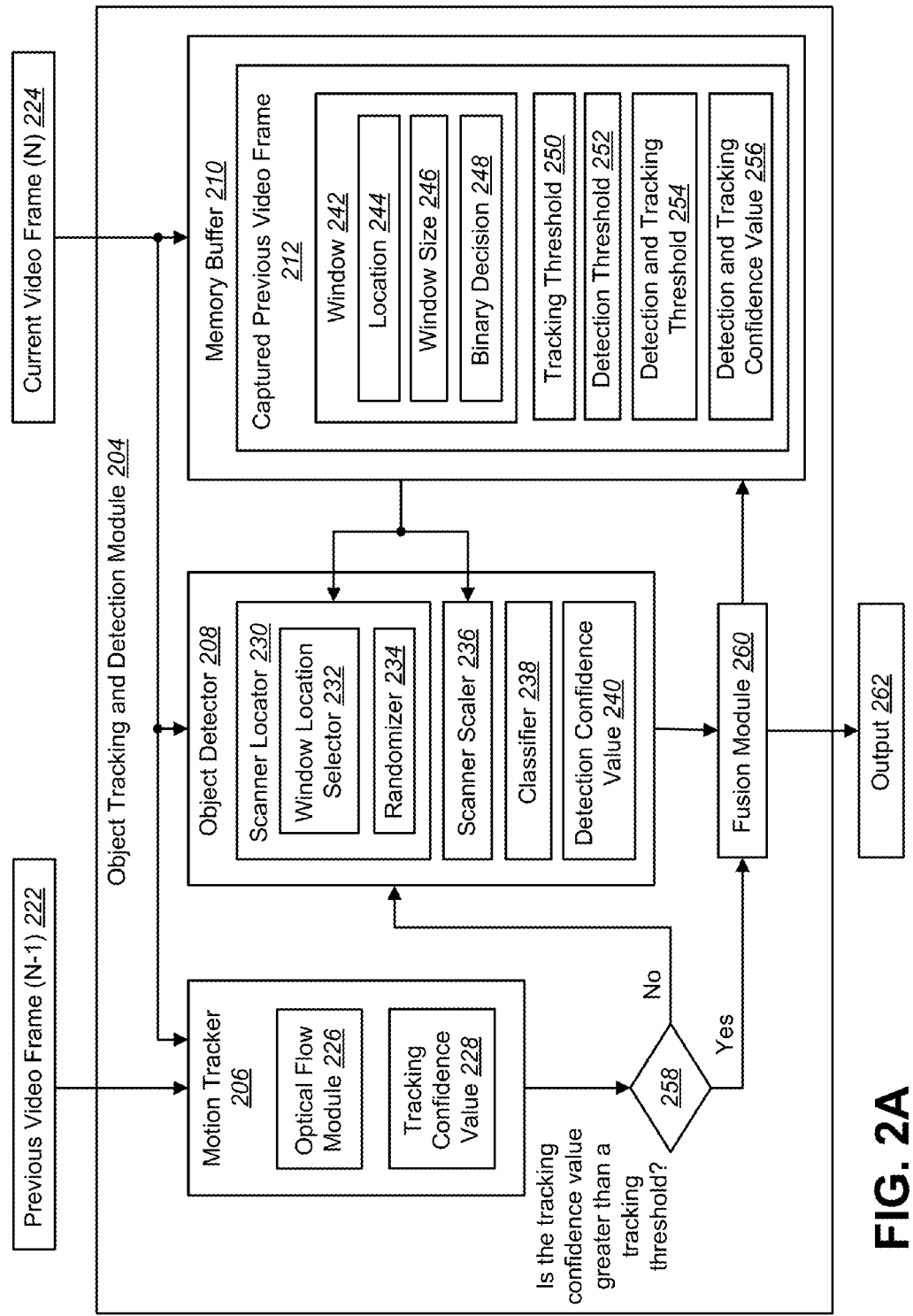
FIG. 2A is a block diagram that depicts a particular illustrative embodiment of an object and detection module.

Referring to FIG. 2A, a block diagram illustrating an object tracking and detection module 204 is shown. The object tracking and detection module 204 may be implemented within an electronic or wireless device. The object tracking and detection module 204 may include a motion tracker 206 having an optical flow module 226 and a tracking confidence value 228. The object tracking and detection module 204 may also include an object detector 208 having a scanner locator 230, scanner scaler 236, classifier 238 and a detection confidence value 240. The memory buffer 210 may store data associated with a captured previous video frame 212 that may be provided to the motion tracker 206 and object detector 208. The object tracking and detection module 204, motion tracker 206, object detector 208 and memory buffer 210 may be configurations of the object tracking and detection module 104, motion tracker 106, object detector 108 and memory buffer 110 described above in connection with FIG. 1.

The motion tracker 206 may be used to perform motion-based tracking on a current video frame (N) 224. For example, a previous video frame (N−1) 222 and a current video frame (N) 224 may be received (e.g., by the electronic device 102). The previous video frame (N−1) 222 may immediately precede a current video frame (N) 224 in a sequence of video frames. Additional video frames may be obtained and processed by the object tracking and detection module 204. The previous video frame (N−1) 222 may be provided to a motion tracker 206. Further, the memory buffer 210 may store data associated with the previous video frame (N−1) 222, referred to herein as a captured previous video frame 212. In some configurations, the memory buffer 210 may obtain information about the previous video frame (N−1) 222 directly from the electronic device 102 (e.g., from the camera). The memory buffer 210 may also obtain tracking results about the previous video frame (N−1) 222 from the fusion module 260 which may specify where an object was tracked and/or detected in the previous video frame (N−1) 222. This information about the previous video frame (N−1) 222 or other previously captured video frames may be stored in the memory buffer 210.

The motion tracker 206 may subsequently receive a current video frame (N) 224 in a sequence of video frames. The motion tracker 206 may compare the current video frame (N) 224 to the previous video frame (N−1) 222 (e.g., using information provided from the memory buffer 210). The motion tracker 206 may track motion of an object on the current video frame (N) 224 using an optical flow module 226. The optical flow module 226 may include hardware and/or software for performing motion-based tracking of an object on a current video frame (N) 224. By comparing the previous video frame (N−1) 222 and the current video frame (N) 224, the motion tracker 206 may determine a tracking confidence value 228 associated with the likelihood that a target object is in the current video frame (N) 224. In one example, the tracking confidence value 228 is a real number (e.g., between 0 and 1) based on a percentage of certainty that the target object is within the current video frame (N) 224 or a window within the current video frame (N) 224.

The object detector 208 may be used to detect an object on a current video frame (N) 224. For example, the object detector 208 may receive a current video frame (N) 224 in a sequence of video frames. The object detector 208 may perform object detection on the current video frame (N) 224 based on a tracked parameter. The tracked parameter may include a tracking confidence value 228 corresponding to a likelihood that a target object is being accurately tracked. More specifically, a tracked parameter may include a comparison of the tracking confidence value 228 to a tracking threshold 250. The tracked parameter may also include information provided from the memory buffer 210. Some examples of tracked parameters that may be used when detecting an object include a region, a window location, a window size, or other information that may be used by the object detector 208 as a parameter when performing object detection.

The object detector 208 may include a scanner locator 230. The scanner locator 230 may include a window location selector 232 and a randomizer 234. The window location selector 232 may select multiple windows within a video frame. For example, a video frame may include multiple windows, each with an associated location and size. In one configuration, each video frame is divided into multiple (e.g., approximately 10,000) overlapping windows, each including a fraction of the total pixels in the video frame. Alternatively, there may be any suitable number of windows and they may not overlap. The window location selector 232 within the scanner locator 230 may select the location of a window in which to attempt to identify a target object. The randomizer 234 may randomly select windows of varying sizes and locations for detecting an object. In some configurations, the randomizer 234 randomly selects windows within a video frame. Alternatively, the randomizer 234 may more precisely select windows based on one or more factors. For example, the randomizer 234 may limit the selection of windows based on a region, size or general location of where an object is most likely located. This information may be obtained via the memory buffer 210 or may be obtained via the motion-based tracking that, while not accurate enough to be relied on entirely, may provide information that is helpful when performing object detection. Therefore, while the randomizer 234 may randomly select multiple windows to search, the selection of windows may be narrowed, and therefore not completely random, based on information provided to the object detector 208.

The object detector 208 may also include a scanner scaler 236, which may be used to draw or select a window of a certain size. The window size may be used by the scanner locator 230 to narrow the sizes of windows when detecting an object or comparing a selection of windows to an original image to detect whether an object is within a specific window. The scanner scaler 236 may select one or more windows of certain sizes or scale levels initially when defining an object or, alternatively, draw one or more windows of certain sizes or scale levels based on information provided from the memory buffer 210.

The classifier 238 may be used to determine whether some or all of a target object is found in a specific window. In some configurations, the classifier 238 may produce a binary value for each window to indicate whether a target object is detected within a specific window or sub-window. This classification (e.g., binary classification) may be performed for each window searched by the object detector 208. Specifically, the classifier 238 may generate a binary 1 for each window in which the object is detected and a binary 0 for each window in which the object is not detected. Based on the number or a combination of 1s and 0s, the object detector 208 may determine a detection confidence value 240 indicating a likelihood that the target object is present within a current video frame (N) 224. In some configurations, the detection confidence value 240 is a real number between 0 and 1 indicating a percentage or probability that an object has been accurately detected.

The object detector 208 may perform object detection according to a variety of tracked parameters, including a region, target size, window size, scale level, window location and one or more confidence values. Once the windows of a video frame or a subset of windows are searched and the object detector 208 obtains a binary value for each searched window, the object detector 208 may determine window size as well as a location or region on the current video frame that has the highest confidence. This location and window size may be used in subsequent tracking and detecting to more accurately track and/or detect a target object.

Various techniques may be used by the object detector 208 in detecting a target object. In one configuration, detecting a target object may include performing a binary classification for windows at every possible window location and every possible window size. However, searching every possible window is resource intensive. Thus, in another configuration, the object detector may search a subset of window locations and sizes, rather than all possible windows in a video frame. For example, the object detector 208 may search 1% of all possible windows. Then, if detection is unsuccessful (e.g., the detection confidence value 240 is less than a detection threshold 252), a higher percentage of window locations may be searched in a subsequent captured frame, e.g., 2%. The step in percentage of window locations searched may be uniform, non-uniform, slow or fast, i.e., consecutive frames may have 1%, 2%, 3%, 4% or 1%, 2%, 4%, 8%. In one configuration, the percentage of searched frames may be set very high (e.g., 80%, 90%, 100%) in response to a high detection confidence value, i.e., to ensure that the target object is a next video frame. For example, the percentage of searched frames may jump to at least 80% in response to a detection and tracking confidence value that exceeds a detection and tracking threshold value 256. Alternatively, the percentage may jump to 60%, 70%, 90%, etc. Additionally, any suitable value for the detection and tracking threshold value may be used, e.g., 0.6, 0.65, 0.7, 0.75, 0.8, 0.85, etc. Furthermore, the percentage of windows searched may be determined randomly, based on a randomizer 234 (random number generator), e.g., a random percentage of windows between 1% and 15% may be searched in a captured frame. By searching a subset of all the window locations, the object detection may use fewer resources in the electronic device 102.

The techniques described herein may search a subset of window sizes for each location. Each window size may be referred to herein as a scale level, each scale level corresponding to a specific window size. For example, there may be 20 possible scale levels. Rather than searching all 20 scale levels, a subset of scale levels or window sizes may be searched at each window location.

The techniques described herein may also use feedback from the memory buffer 210 to tailor the window locations and sizes searched. In other words, the location and size of the last captured video frame in which the target object was successfully detected and/or tracked may be used as a starting point for searching a current video frame (N) 224. For example, if the target object was detected and tracked in a recent video frame (i.e., the detection and tracking confidence value 256 for a recent captured video frame is above a detection and tracking threshold), the scanner locator may start searching a current captured frame at the location and size associated with the recent frame. For example, where a target object moves out of the field of view of an optical system or disappears at a distance, the target object may be more likely to reappear at the same size as when the target object left the field of view of the optical system or disappeared at a distance. Thus, a size or range of sizes may be predicted for detecting the target object in subsequent video frames when performing object detection.

The search range of window locations and window sizes searched in the captured video frame (N) 224 may be limited to those similar to the window location and window size associated with the target object in a recent video frame (e.g., the previous video frame (N-1) 222). As used herein, the term "search range" refers to the set of candidate window locations or candidate window sizes (or both) that may be utilized when detecting and/or tracking a target object in a video frame. For example, the subset of the window locations searched may be selected from within a portion of the current video frame (N) 224 based on where the target object was found in a recent video frame, e.g., one of the quadrants or halves of the current video frame (N) 224. In other words, the search space may be limited to nearby where the target object was last tracked or detected. Similarly, the sizes of frames searched for each window location may be limited based on the size of the window in which the targeted object was found in a recent video frame. For example, if the object was detected in a recent frame using a window with a scale level of 8, the scanner scaler 236 may select only window scale levels for the current video frame (N) 224 of 8, plus or minus 3, i.e., scale levels 5-11. This may further eliminate low probability searching and increase the efficiency of object detection. Alternatively, if a recent (non-current) video frame did not detect the target object (i.e., the detection and tracking confidence value 256 for the recent video frame is below a detection and tracking threshold), the object detector 208 may expand the search space (window locations) that is searched, e.g., a wider range of an image or the whole image may be subject to search.

The object tracking and detection module 204 may include a fusion module 260 to merge multiple windows to form a single window. There are initially two confidence values: a detection confidence value 240 from the object detector 208 and a tracking confidence value 228 from the motion tracker 206. The fusion module 260 may combine the two confidence values (e.g., pick the one that is larger) into a detection and tracking confidence value 256. The detection and tracking confidence value 256 may indicate whether the target object was identified on a video frame. In one configuration, the detection and tracking confidence value 256 may be a real number between 0 and 1, where 0 indicates the lowest possible confidence that the target object was identified in a particular video frame and 1 indicates the highest possible confidence that the target object was identified in a particular video frame. In other words, the detection and tracking confidence value 256 may serve as an overall indication of the likelihood that a target object was found. Further, the detection and tracking confidence value 256 may be a parameter used for determining a window location, a window size, or a percentage of windows to search in a next video frame. The fusion module 260 may be used to provide information about a current video frame (N) 224 to the memory buffer 210. In one example, the fusion module 260 may provide information about the tracked window 242 (e.g., window location 244, window size 246, etc.) and a detection and tracking confidence value 256 to the memory buffer 210. The fusion module 260 may use the tracking results (e.g., bounding boxes) from the motion tracker 206 and object detector 208 to form a combined tracking result (e.g., bounding box) and calculate the detection and tracking confidence value 256.

The memory buffer 210 may store one or more values associated with the previous video frame (N-1) 222, the current video frame (N) 224 or other captured video frames. In one configuration, the memory buffer 210 stores a captured previous video frame 212, which may include information corresponding to the previous video frame (N-1) 222. The captured previous video frame 212 may include information about one or more windows 242, including the location 244, window size 246 and a binary decision 248 (e.g., from the classifier 238) for each window 242. The captured previous video frame 212 may also include a tracking threshold 250, detection threshold 252 and a detection and tracking threshold 254. The tracking threshold 250 may be provided to the motion tracker 206 or circuitry on the object tracking and detection module 204 (e.g., confidence level comparator) to determine 258 whether the tracking confidence level is greater than the tracking threshold 250. The detection threshold 252 may be provided to the object detector 208 or other circuitry on the object tracking and detection module 204 to determine whether the detection confidence value 240 is greater than the detection threshold 252. The detection and tracking threshold 254 may be a combined value based on the tracking threshold 250 and the detection threshold 252. The detection and tracking threshold 254 may be compared to a detection and tracking confidence value 256 to determine a combined confidence value for the motion-based tracking and the object detection. Each of the thresholds may be based on a likelihood that a target object is located within a video frame. The object tracking and detection module 204 may perform motion-based tracking and/or detection on a current video frame (N) 224 until a specific detection and tracking confidence value 256 is obtained. Further, the motion-based tracking and object detection may be performed on each video frame in a sequence of multiple video frames.

Performing motion-based tracking and object detection may include sequentially performing motion-based tracking followed by object detection based on a tracked parameter. In particular, the present systems and methods may implement a two-step tracking and detection approach. Since motion-based tracking is based on the relative motion of a scene, rather than actual object identification as used object detection, the motion-based tracking may be less resource-intensive in an electronic device than performing object detection. Accordingly, it may be more efficient to use the motion tracker 206 instead of the object detector 208, where a target object may be accurately tracked without also performing object detection.

Therefore, rather than using the motion tracker 206 in parallel with the object detector 208, the object tracking and detection module 204 only uses the object detector 208 where the motion tracker 206 is insufficient, i.e., the motion tracking and object detection (if performed at all) are performed sequentially instead of in parallel. For each video frame on which tracking is performed, the motion tracker 206 may produce a tracking confidence value 228, which may be a real number between 0 and 1 indicating a likelihood that the target object is in a current video frame (N) 224.

In one configuration of the two-step tracking and detection approach, the motion tracker 206 may first perform motion-based tracking on a current video frame (N) 224. The motion tracker 206 may determine a tracking confidence value 228 based on the motion-based tracking process. Using the tracking confidence value 228 and a tracking threshold 250 provided by the memory buffer 210, circuitry within the object tracking and detection module 204 (e.g., a confidence level comparator) may determine 258 whether the tracking confidence value 228 exceeds a tracking threshold 250. If the tracking confidence value 228 is greater than the tracking threshold 250, the object tracking and detection module 204 may skip performing object detection and provide the tracking result to a fusion module 260 to produce an output 262. The output 262 may include an indication that a target object is within a current video frame (N) 224. Further, the output 262 may include additional information about the target object.

If the tracking confidence value 228 does not exceed the tracking threshold 250, the object detector 208 may subsequently perform object detection on the current video frame (N) 224. The object detection may be performed on all or a subset of windows within the current video frame (N) 224. The object detector 208 may also select a subset of windows, window sizes or other detection criteria based on results of the motion-based tracking and/or information provided from the memory buffer 210. The object detection may be performed using a more or less robust process based on one or more tracked parameters provided to the object detector 208. The object detector 208 may determine a detection confidence value 240 and compare the detection confidence value 240 to a detection threshold 252. If the detection confidence value 240 is above a detection threshold 252, the object detector 208 may provide the detection result to the fusion module 260 to produce an output 262. The output 262 may include an indication that a target object is within a current video frame (N) 224 and/or include additional information about the detected object.

Alternatively, if the detection confidence value 240 is less than or equal to a detection threshold 252, the object detector 208 may perform object detection again using a more robust method, such as searching a greater number of windows within the current video frame (N) 224. The object detector 208 may repeat the process of object detection until a satisfactory detection confidence value 240 is obtained. Once a satisfactory detection confidence value 240 is obtained such that a target object within the current video frame is identified, the object tracking and detection module 204 may be used to perform tracking and detection on a next video frame.

Figure 2B:
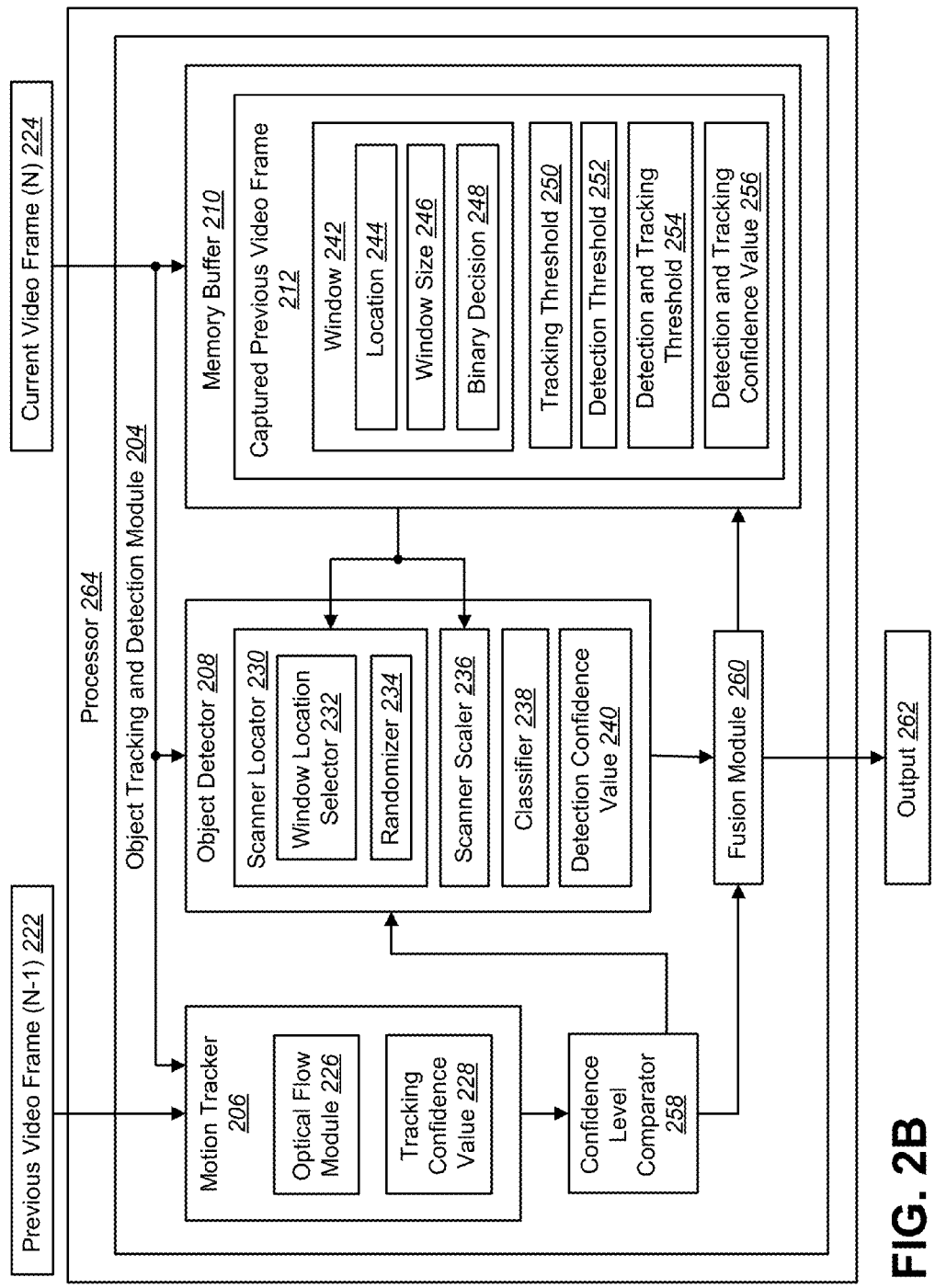
FIG. 2B is a block diagram that depicts a particular illustrative embodiment of a processor implement components within the object and detection module of FIG. 2.

Referring to FIG. 2B, a particular illustrative embodiment of a processor 264 implementing components within the object tracking and detection module 204 is shown. As shown in FIG. 2A, the object tracking and detection module 204 may be implemented by a processor 264. Different processors may be used to implement different components (e.g., one processor may implement the motion tracker 206, another processor may be used to implement the object detector 208 and yet another processor may be used to implement the memory buffer 210).

Figure 3:
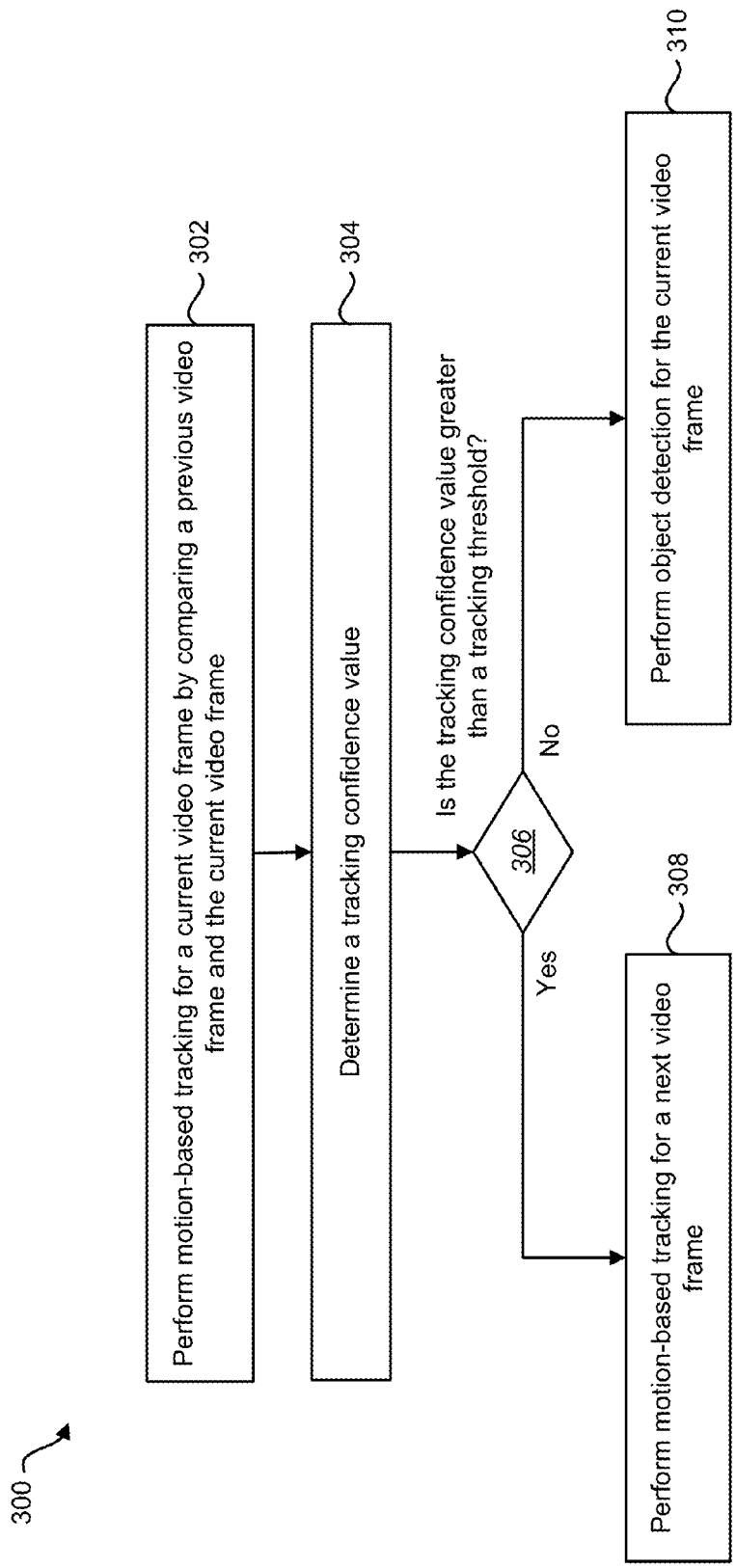
FIG. 3 is a flowchart of a particular illustrative embodiment of a method for performing motion-based tracking and object detection.

Referring to FIG. 3, a flowchart of a particular illustrative embodiment of a method 300 for performing motion-based tracking and object detection is shown. The method 300 may be implemented by an electronic device 102, e.g., an object tracking and detection module 104. The electronic device 102 may perform 302 motion-based tracking for a current video frame (N) 224 by comparing a previous video frame (N−1) 222 and the current video frame (N) 224. Tracking an object may be performed using a median flow method by tracking points between pairs of images. Other methods of motion-based tracking may also be used. Additionally, the motion-based tracking may be performed for a current video frame (N) 224 using information about a captured previous video frame 112 provided via a memory buffer 110.

The electronic device 102 may determine 304 a tracking confidence value 228. The tracking confidence value 228 may indicate a likelihood or certainty that a target object has been accurately tracked. The electronic device 102 may determine 306 whether the tracking confidence value 228 is greater than a tracking threshold 250. If the tracking confidence value 228 is greater than the tracking threshold 250, the electronic device 102 may perform 308 motion-based tracking for a next video frame. Further, the electronic device 102 may skip performing object detection on the current video frame (N) 224 based on the result of the motion-based tracking. In other words, object detection may be performed for the current video frame (N) 224 only when the motion tracking is not very good, i.e., if the tracking confidence value 228 is not greater than a tracking threshold 250. If, however, the tracking confidence value 228 is not greater than the tracking threshold 250, the electronic device 102 may perform 310 object detection for the current video frame (N) 224. The electronic device 102 may perform the object detection in sequence to the motion-based tracking. In some configurations, the object detection may be performed multiple times with varying robustness to obtain a higher detection confidence value 240.

Figure 4:
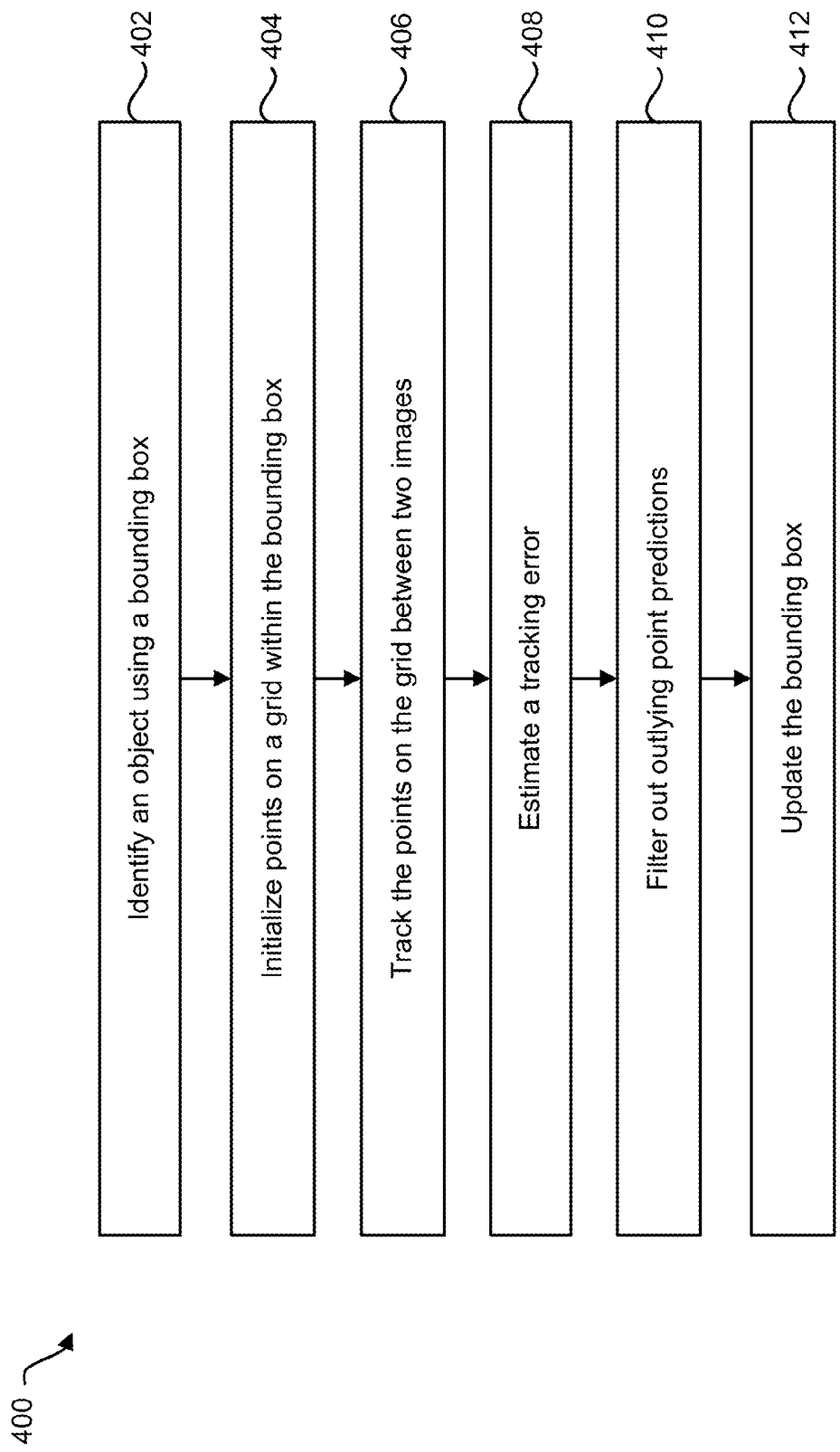
FIG. 4 is a flowchart of a particular illustrative embodiment of a method for performing motion-based tracking.

Referring to FIG. 4, a flowchart of a particular illustrative embodiment of a method 400 for performing motion-based tracking is shown. The method 400 may be implemented by an electronic device 102, e.g., an object tracking and detection module 104. The electronic device 102 may identify 402 a target object using a bounding box. Identifying 402 an object may be performed manually using a touchscreen 116 or other input method in which an object of interest is selected. Multiple objects may be identified in a similar way. Further, other input methods may be used to identify an object to be tracked. In one example, an object is identified by manually drawing a bounding box around the target object.

The electronic device 102 may initialize 404 points on a grid within the bounding box. The points on the grid may be uniformly spaced throughout the bounding box. Further, the points may be tracked 406 on the grid between two images (e.g., previous video frame (N−1) 222 and current video frame (N) 224). In one example, the points are tracked by a Lucas-Kanade tracker that generates a sparse motion flow between images. The electronic device 102 may estimate 408 a tracking error between the two images (e.g., a previous video frame (N−1) 222 and a current video frame (N) 224). Estimating 408 a tracking error may include assigning each point of the tracked points an error value. Further, estimating 408 a tracking error may be performed using a variety of methods, including forward-backward error, normalized cross correlation (NCC) and sum-of-square differences, for example. The estimated tracking error may be used to obtain a tracking confidence value 228 and ultimately determining a likelihood that a target object is in a current video frame (N) 224. In one configuration, the tracking confidence value 228 may be obtained by calculating a normalized cross correlation (NCC) between a tracked window in a current video frame (N) 224 and a previous video frame (N−1) 222. The tracking error may also be estimated using additional techniques, including a forward-backward error estimation described in more detail below in connection with FIG. 5. Further, the electronic device 102 may filter 410 out outlying point predictions. For example, the electronic device may filter out 50% of the worst predictions. The remaining predictions may be used to estimate the displacement of the bounding box.

The electronic device 102 may update 412 the bounding box. Updating 412 the bounding box may be performed such that the updated bounding box becomes the new bounding box for the next video frame. The motion-based tracking process may then be repeated for a next video frame or, if a tracking confidence value 228 is less than or equal to a tracking threshold 250, the motion-based tracking process may be discontinued for a next video frame until a target object may be accurately tracked. In some configurations, where the motion-based tracking for a current video frame (N) 224 does not provide a satisfactory result, the electronic device 102 may perform object detection on the current video frame (N) 224 to obtain a higher level of confidence in locating a target object. In some configurations, where motion-based tracking cannot produce satisfactory results (e.g., when a target object moves out of range of a video frame), object detection may be performed on any subsequent video frames until a target object is detected.

Figure 5:
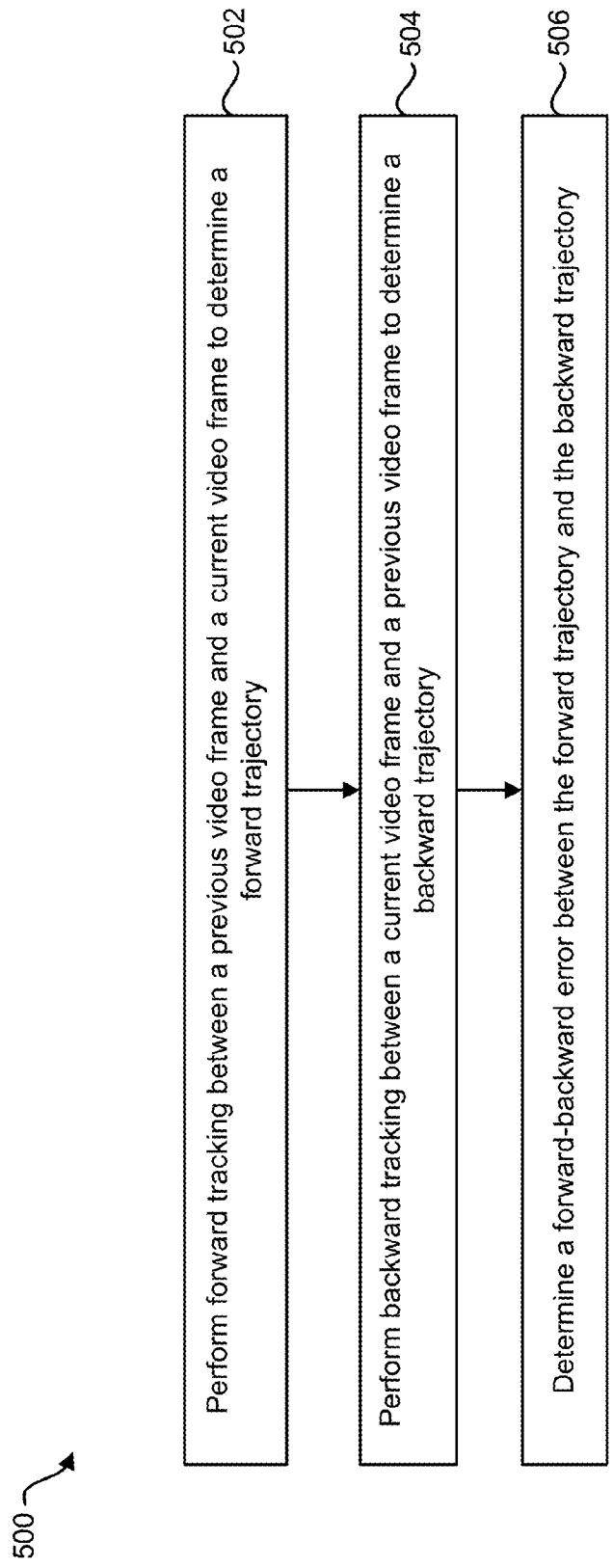
FIG. 5 is a flowchart of a particular illustrative embodiment of a method for estimating a tracking error in motion-based tracking based on forward-backward error.

Referring to FIG. 5, a flowchart of a particular illustrative embodiment of a method 500 for estimating a tracking error in motion-based tracking based on forward-backward error is shown. The method 500 may be implemented by an electronic device 102 (e.g., an object tracking and detection module 104). In some configurations, the electronic device 102 may calculate a normalized cross correlation (NCC) between tracked windows. The normalized cross correlation (NCC) may be used to determine a tracking confidence value 228. The electronic device 102 may also use various tracking error estimation techniques complementary to normalized cross correlation (NCC) (e.g., forward-backward error, sum-of-square difference). In an example using forward-backward error estimation, an electronic device 102 may perform 502 forward tracking between a previous video frame (N−1) 222 and a current video frame (N) 224 to determine a forward trajectory. Forward tracking may include tracking an image forward for k steps. The resulting forward trajectory may be equal to $(x_t, x_{t+1}, \ldots, x_{t+k})$, where $x_t$ is a point location in time and k indicates a length of a sequence of images. The electronic device 102 may perform 504 backward tracking between a current video frame (N) 224 and a previous video frame (N−1) 222 to determine a backward trajectory. The resulting backward trajectory may be equal to $(\hat{x}_t, \hat{x}_{t+1}, \ldots, \hat{x}_{t+k})$, where $\hat{x}_{t+k}=x_{t+k}$.

The electronic device 102 may determine 506 a forward-backward error between the forward trajectory and the backward trajectory. The forward-backward error may be defined as the distance between the forward trajectory and the backward trajectory. Further, various distances may be defined for the trajectory comparison. In one configuration, the Euclidean distance between the initial point and the end point of the validation trajectory may be used when determining the forward-backward error. In one configuration, the forward-backward error may be used as the tracking error, which may be used to determine a tracking confidence value 228.

Figure 6:
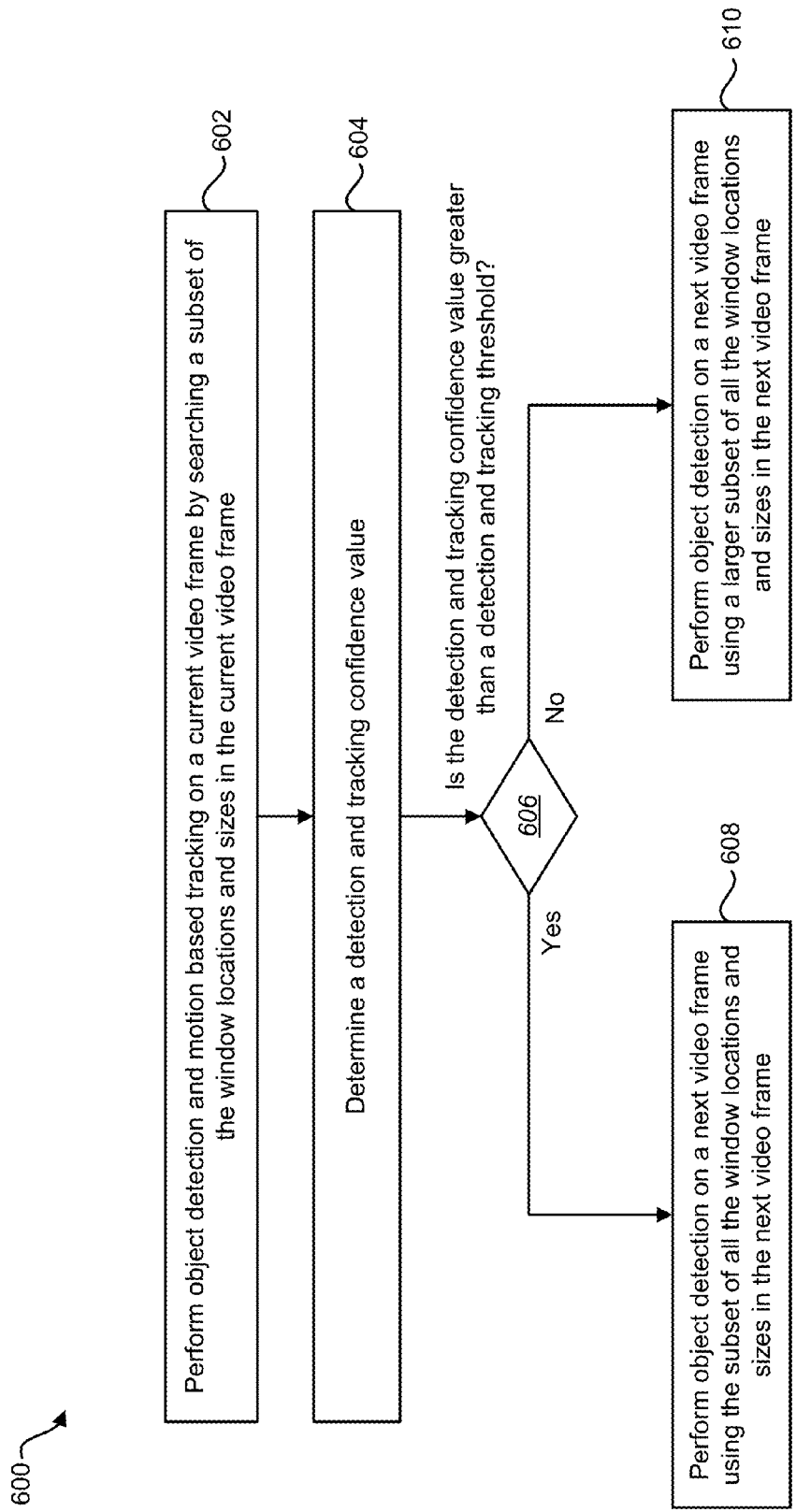
FIG. 6 is a flowchart of a particular illustrative embodiment of a method for performing object detection.

Referring to FIG. 6, a flowchart of a particular illustrative embodiment of a method 600 for performing object detection is shown. The method 600 may be implemented by an electronic device 102 (e.g., an object tracking and detection module 104). The electronic device 102 may perform 602 object detection and motion-based tracking on a current video frame (N) 224 by searching a subset of the window locations and sizes in the current video frame (N) 224.

The electronic device 102 may determine 604 a detection and tracking confidence value 256. The detection and tracking confidence value 256 may provide a level of confidence of whether the target object is found in a current video frame (N) 224 or within a particular window. The electronic device 102 may also determine 606 whether the detection and confidence value 256 is greater than a detection and tracking threshold 254. If the detection and confidence value 256 is greater than a detection and tracking threshold 254, the electronic device 102 may perform 608 object detection on a next video frame using the subset (e.g., the same subset) of windows and sizes in the next video frame. Alternatively, if the detection and confidence value 256 is less than a detection and tracking threshold 254, the electronic device 102 may perform 610 object detection on a next video frame using a larger subset of the window locations and sizes in the next video frame. In some configurations, where the confidence value 256 is less than a detection and tracking threshold 254, the electronic device 102 may perform 610 object detection on a next video frame using the entire search space and/or all windows of the next video frame.

Figure 7:
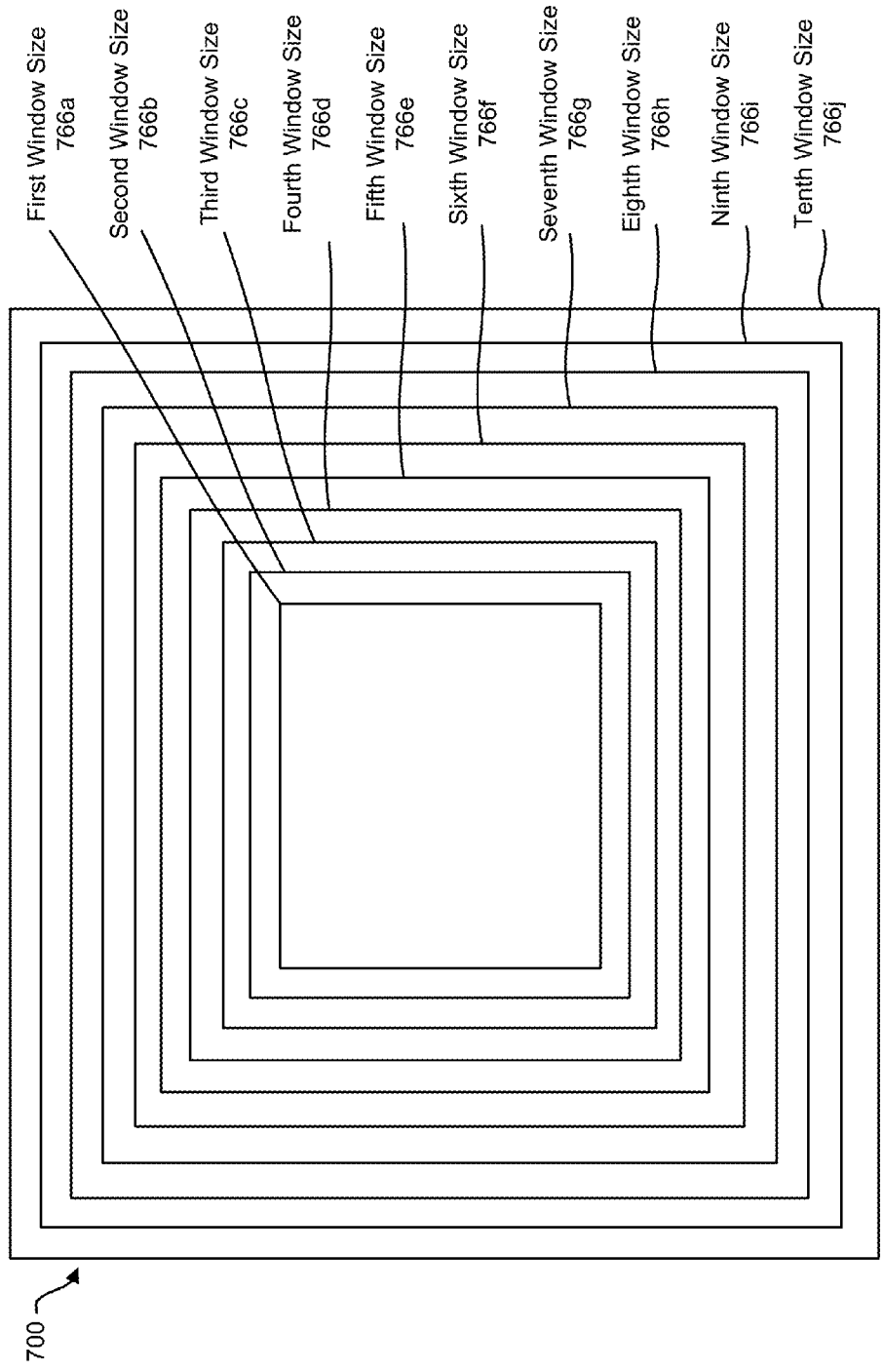
FIG. 7 is a particular illustrative embodiment of an image window having different window sizes.

Referring to FIG. 7, a particular embodiment of an image window 700 having different window sizes 766 is shown. Specifically, FIG. 7 illustrates a set of ten possible window sizes 766a-j. Each window size 766 may correspond to a scale level (e.g., 1-10). Although shown herein as rectangular, the windows that are searched may be any shape, e.g., square, rectangular, circular, elliptical, user-defined, etc. Furthermore, any number of window sizes 766 or scale levels may be available, e.g., 5, 15, 20, 30, etc.

The search range may be denoted by a subset of window sizes used for a particular location, e.g., the window sizes that are searched in the current video frame (N) 224 may be limited to those similar to the window location and window size associated with the target object in the recent frame. For example, without feedback, the object detector 208 may search all ten window sizes 766a-j for each selected window location. However, if the object was detected in a recent (non-current) video frame using a window with the fifth window size 766e, the scanner scaler 236 may select only window sizes for the current captured frame of 5, plus or minus 3, i.e., window sizes 2-8. In other words, the windows with the first window size 766a, ninth window size 766i and tenth window size 766j may not be searched based on feedback from a recent or previous video frame (N−1) 222. This may further eliminate low probability searching and increase the efficiency of object detection. In other words, using feedback from a recent video frame may help reduce computations performed. Alternatively, if a recent video frame did not detect the target object (i.e., the detection and tracking confidence value 256 for the recent captured frame is less than a detection and tracking threshold 254), the object detector 208 may not limit the search range by using a subset of size levels.

Figure 8:
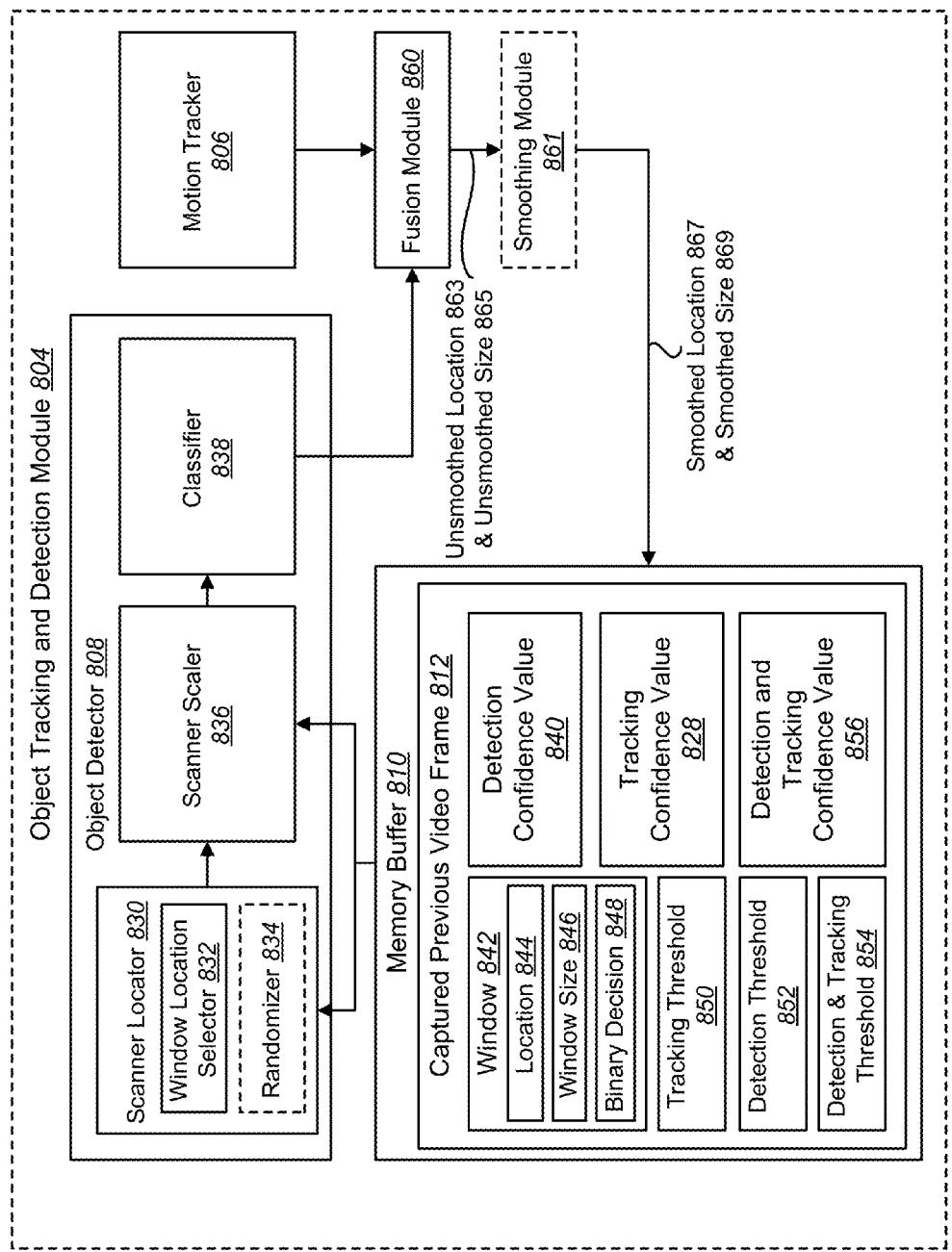
FIG. 8 is a block diagram that depicts a particular illustrative embodiment of an object tracking and detection module.

Referring to FIG. 8, a particular illustrative embodiment of an object tracking and detection module 804 is shown. The object tracking and detection module 804 illustrated in FIG. 8 may include similar modules and perform similar functionality to the object tracking and detection module 204 illustrated in FIG. 2. Specifically, the object detector 808, motion tracker 806, scanner locator 830, window location selector 832, randomizer 834, scanner scaler 836, classifier 838, fusion module 860, memory buffer 810, captured previous video frame 812, window 842, location 844, size 846, binary decision 848, tracking threshold 850, detection threshold 852, detection and tracking threshold 854, detection confidence value 840, tracking confidence value 828 and detection and tracking confidence value 856 illustrated in FIG. 8 may correspond and have similar functionality to the object detector 208, motion tracker 206, scanner locator 230, window location selector 232, randomizer 234, scanner scaler 236, classifier 238, fusion module 260, memory buffer 210, captured previous video frame 212, window 242, location 244, size 246, binary decision 248, tracking threshold 250, detection threshold 252, detection and tracking threshold 254, detection confidence value 240, tracking confidence value 228 and detection and tracking confidence value 256 illustrated in FIG. 2.

The object tracking and detection module 804 may include a smoothing module 861 that is used to reduce the jittering effect due to target motion and tracking error. In other words, the smoothing module 861 smooths the tracking results, causing a search window to have a smoother trajectory in both location (x, y) 844 and size (width, height) 846. The smoothing module 861 can be simple moving average (MA) filters or auto regression (AR) filters. The smoothing degree for the location 844 and size 846 can be different. Predictive filters, such as a Kalman filter may also be suitable for location 844 smoothing. Therefore, the smoothing module 861 may receive an unsmoothed location 863 and an unsmoothed size 865 as input and output a smoothed location 867 and a smoothed size 869.

Figure 9:
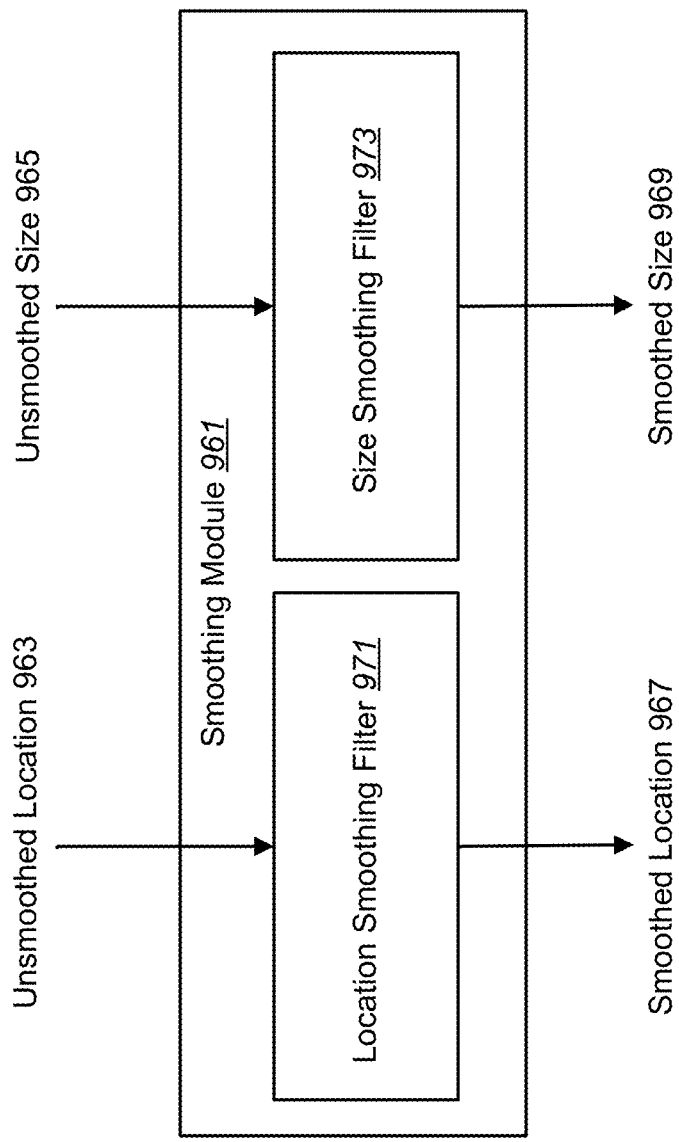
FIG. 9 is a block diagram that depicts a particular illustrative embodiment of a smoothing module.

Referring to FIG. 9, a particular illustrative embodiment of a smoothing module 961 is shown. The smoothing module 961 may be used to reduce the jittering effect due to target motion and tracking error, i.e., so the tracking results (bounding box) have a smoother trajectory in both location (x, y) and size(width, height). In one configuration, the location smoothing filter 971 and the size smoothing filter 973 are implemented using an auto regression (AR) model to receive an unsmoothed location 963 and an unsmoothed size 965 as input and output a smoothed location 967 and a smoothed size 969.

In an auto regression (AR) model, assume X is the variable to be smoothed, either the location or the size. Furthermore, let X' be the output of X by the object tracker. In this configuration, the smoothed filtering of X at time t, $X_t$, can be described according to Equation (1):

$$X_t = W*X'_t + (1-W)*X_{t-1} \quad (1)$$

where $X'_t$ is the tracker output of X at time t, $X_{t-1}$ is the smoothed result of X at time t-1, and W (0<=W<=1) is a smoothing weight that controls the smoothing effect. For example, $X'_t$ may be a window location or window size selected for a current video frame (N) 224 and $X_{t-1}$ may be a window location or window size used for a previous video frame (N-1) 222.

A different smoothing weight, W, can be used for the location smoothing filter 971 and the size smoothing filter 973. For example, in one implementation, $W_{location}=0.8$ and $W_{size}=0.4$ so that there is less smoothing effect on the window location but stronger smoothing effect on the window size. This selection of smoothing weights will produce both less tracking delay and less jittering.

The selection of smoothing weight may also be reduced when the detection and tracking confidence value 856 falls below a certain threshold (e.g., the detection and tracking threshold 854). This may cause stronger filtering when potential tracking or detection errors are high. For example, in response to low tracking confidence (e.g., the detection and tracking confidence value 856 is below the detection and tracking threshold 854), the smoothing weights for location and size may be set to $W_{location}=0.65$ and $W_{size}=0.2$, respectively. In other words, one or both of the weights may be decreased, which may cause the window location and size selection to lean more heavily on window locations and sizes of previous video frames than those of a current video frame.

The weighting may be based on a tracking confidence value 828 or a detection confidence value 840 rather than a detection and tracking confidence value 856. For example, the smoothing weights, $W_{location}$ and $W_{size}$, may be decreased in response to a tracking confidence value 828 falling below a tracking threshold 850, i.e., stronger filtering may be used in response to poor motion tracking. Alternatively, the smoothing weights may be decreased in response to a detection confidence value 840 falling below a detection threshold 852, i.e., stronger filtering may be used in response to poor object detection.

In another configuration, Kalman filtering may be used to smooth the window location. In such a configuration, the filtering may be defined according to Equations (2)-(7):

$$x_k = F_k x_{k-1} + w_k \quad (2)$$

$$z_k = H x_{k-1} + v_k \quad (3)$$

where $x_{k-1}$ is the previous state at time k-1, $x_k$ is the current state defined by $x_k=[x, y, \dot{x}, \dot{y}]$, where (x,y) are the bounding box center location, $(\dot{x}, \dot{y})$ are the velocity in each direction. Furthermore, the state transition model, $F_k$, and the observation model, H, may defined by Equations (4)-(5), respectively:

$$F_k = \begin{bmatrix} 1, & 0, & \Delta t, & 0 \\ 0, & 1, & 0, & \Delta t \\ 0, & 0, & 1, & 0 \\ 0, & 0, & 0, & 1 \end{bmatrix} \quad (4)$$

$$H = \begin{bmatrix} 1, 0, 0, 0 \\ 0, 1, 0, 0 \end{bmatrix} \quad (5)$$

where $\Delta t$ is a tunable parameter. Additionally, wk is process noise that is assumed to be drawn from a zero mean multivariate normal distribution with covariance Q (i.e., $w_k \sim N(0, Q)$) according to Equation (6):

$$Q = \begin{bmatrix} 1, 0, 0, 0 \\ 0, 1, 0, 0 \\ 0, 0, 1, 0 \\ 0, 0, 0, 1 \end{bmatrix} * \sigma_1^2 \qquad (6)$$

where $\sigma_1$ is a tunable parameter. Similarly, wk is observation noise that is assumed to be zero mean Gaussian white noise with covariance R (i.e., $v_k$~N(0, R)) according to Equation (7):

$$R = \begin{bmatrix} 1, 0, 0, 0 \\ 0, 1, 0, 0 \\ 0, 0, 1, 0 \\ 0, 0, 0, 1 \end{bmatrix} * \sigma_2^2 \qquad (7)$$

where $\sigma_2$ is a tunable parameter.

Figure 10:
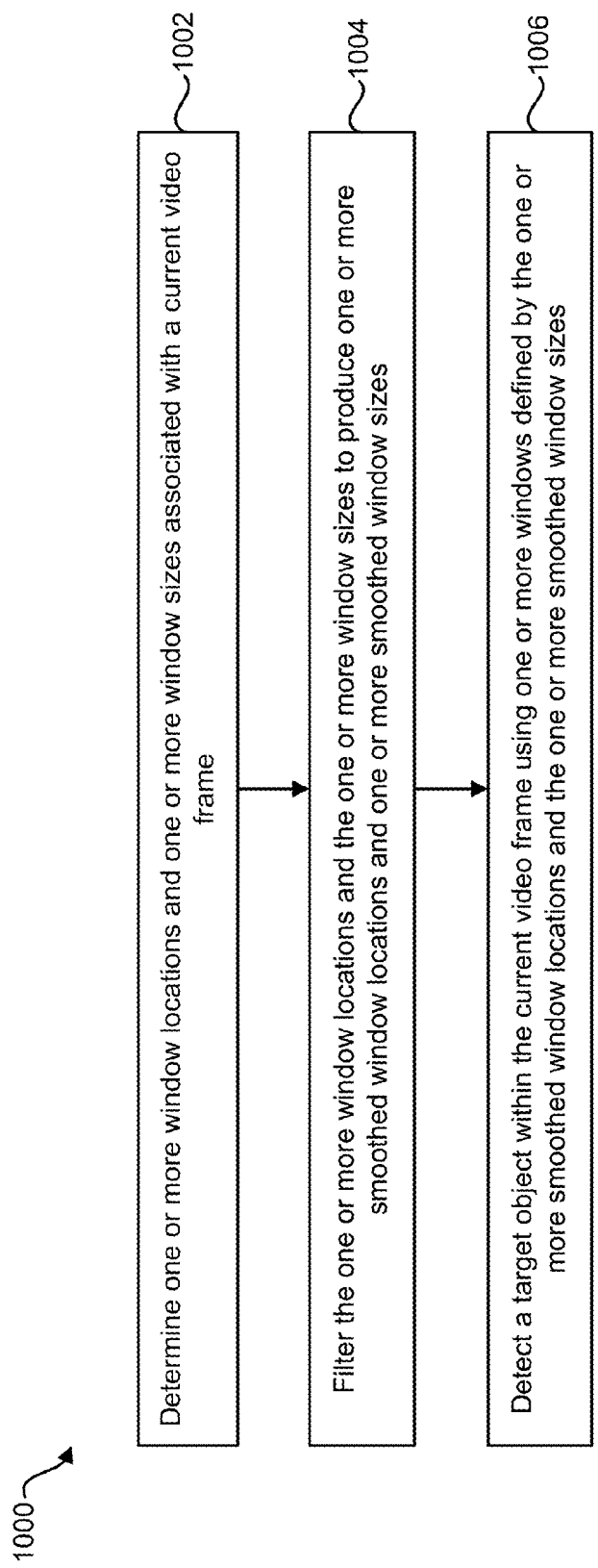
FIG. 10 is a flowchart of a particular illustrative embodiment of a method for smoothing jitter in motion tracking.

Referring to FIG. 10, a flowchart of a particular illustrative embodiment of a method 1000 for smoothing jitter in motion tracking results is shown. The method 1000 may be performed by an electronic device 102, e.g., an object tracking and detection module 804 in an electronic device 102. The electronic device 102 may determine 1002 one or more window locations and one or more window sizes associated with a current video frame 224, e.g., an unsmoothed location 863 and unsmoothed size 865. The electronic device 102 may also filter 1004 the one or more window locations and the one or more window sizes to produce one or more smoothed window locations 867 and one or more smoothed window sizes 869. For example, this may include using a moving average filter, an auto regression filter or a Kalman filter. In one configuration, in response to low tracking confidence (e.g., the detection and tracking confidence value 856 is below the detection and tracking threshold 854), the smoothing weights for location and size may be reduced. Alternatively, the smoothing weights may be reduced based on the detection confidence value 840 or the tracking confidence value 828. The electronic device may also detect 1006 a target object within the current video frame 224 using one or more windows defined by the one or more smoothed window locations 867 and the one or more smoothed sizes 869.

In the context of a scene being imaged, the term "object" refers to a physical object within the scene. In the context of a video stream, the term "object" refers to a representation, within the video stream, of an object (e.g., images of the object in frames of the video stream). The term "mobile device" as used herein includes devices in any of the following form factors: holdables (e.g., smartphones), drivables (e.g., vehicles or robots), wearables (e.g., clothing or accessories), and flyables (e.g., drones). A mobile device may include one or more screens (e.g., a touchscreen) and/or one or more image-capturing devices (e.g., a camera).

Figure 12:
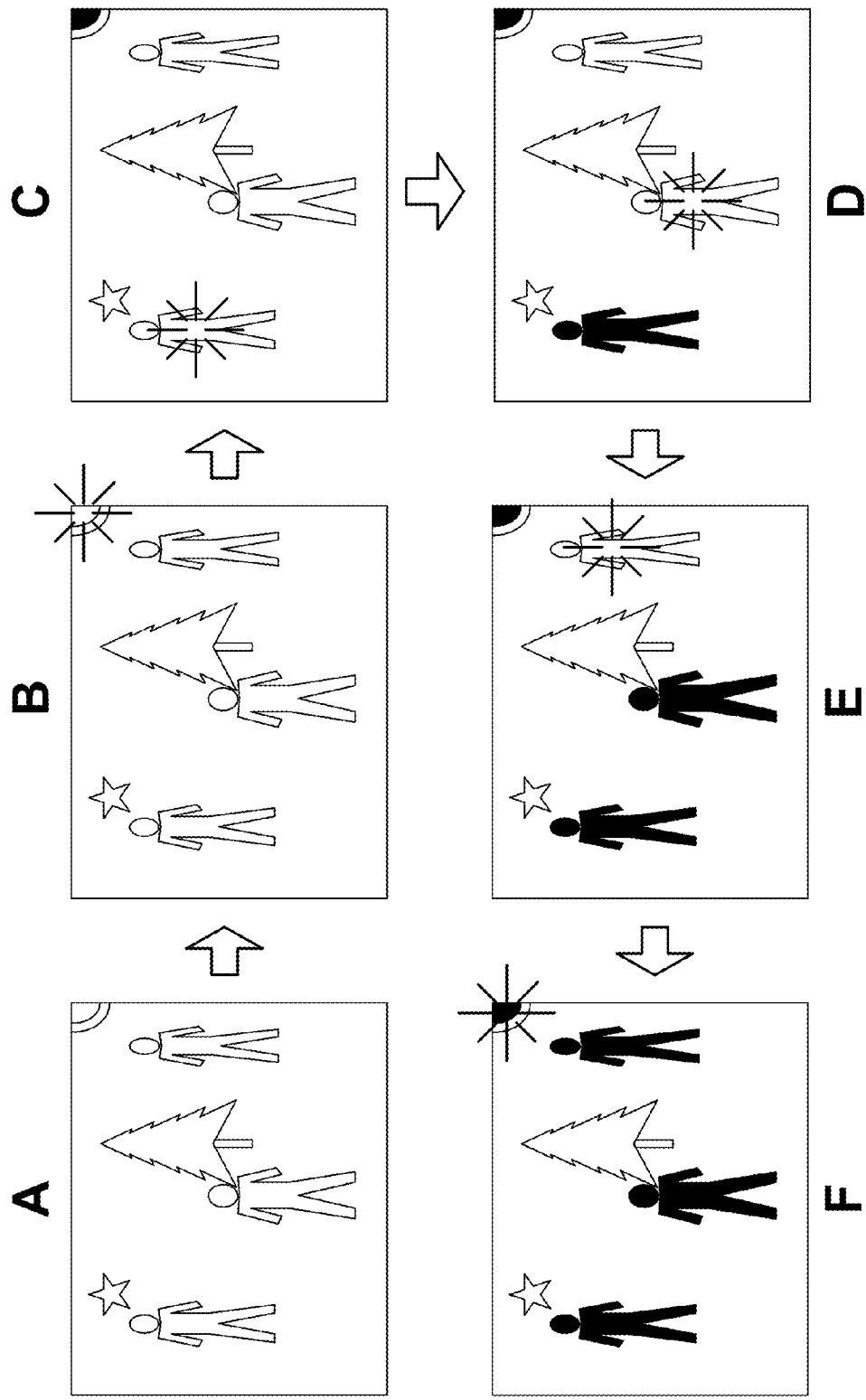
FIG. 12 shows an example of a sequence of user actions to select three objects.

A digital image (e.g., a frame of a video stream) depicts a scene that may include one or more objects. Typically the objects are physical and tangible objects (e.g., people). In FIG. 12, for example, the objects in the scene include three people, a star, and a tree.

It may be desirable to produce, from one or more digital images (e.g., frames of a video stream), an associated stream or file having information that represents locations of selected objects over time within the one or more images. In one example, such information includes an absolute location of a point of interest (e.g., a center of mass of the selected objects), which may change over time. In another example, such information includes locations of the selected objects relative to a location of a point of interest (e.g., a center of mass of the selected objects), which may change over time. The location of a point of interest (e.g., the location of a selected object, or of a center of mass of multiple objects) may be encoded as metadata (e.g., one or more indices, such as codewords, into one or more respective location codebooks).

Figure 11A:
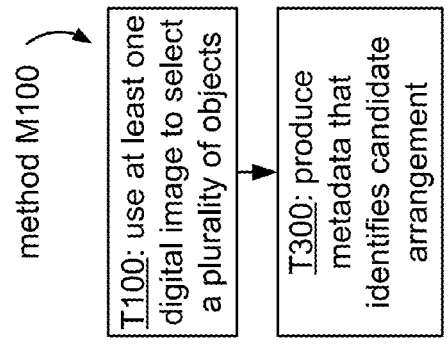
FIG. 11A shows a flowchart of a method M100 of generating metadata according to a general configuration.

FIG. 11A shows a flowchart of a method M100 of generating metadata according to a first configuration that includes tasks T100 and T300. Task T100 uses at least one digital image to select a plurality of objects, wherein the video stream depicts the objects in relation to a physical space. Based on information indicating positions of the selected object in a location space, task T300 produces metadata that identifies one among a plurality of candidate geometrical arrangements of the selected objects. Tasks T100 and T300 may be performed, for example, by the electronic device 102 of FIG. 1, the object tracking and detection module 204 implemented by the processor 264 of FIG. 2B, the object tracking and detection module 804 of FIG. 8 implemented by a processor, the smoothing module 961 of FIG. 9 implemented by a processor, or any combination thereof.

Figure 11B:
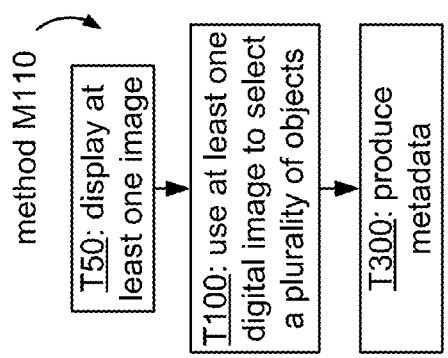
FIG. 11B shows a flowchart of an implementation M110 of method M100.

Task T100 uses at least one digital image to select a plurality of objects, wherein the at least one digital image depicts the objects in relation to a physical space. The selection may be performed in response to a direct action by a user. In such a case, a screen may be used to display the at least one digital image to the user, and the user may enter an indication to select the particular desired objects among the objects that appear in the display. FIG. 11B shows a flowchart of an implementation M110 of method M100 which includes a task T50 that displays the at least one digital image. If the display is performed on a touchscreen, the user may indicate a selection by touching the screen to select a point within a desired object.

The at least one digital image may be one or more frames of a video stream. A video stream describes a series of frames, where each frame represents an image in a pixel coordinate space. A video stream typically includes other information that may be used to recover the frames from the stream (e.g., a corresponding frame start code or packet and frame end code or packet for each frame). A video stream may also include embedded data (e.g., metadata), which may be associated with a particular frame. A video stream may be produced by a camera or other imaging device (which may be sensitive to visible and/or other wavelengths), streamed from another device, or produced by a decoder (e.g., from information stored on a magnetic or optical medium), and may be in compressed or uncompressed form. A video stream may include depth information, such as a video stream based on images captured by a structured light imager or other depth camera (e.g., Microsoft Kinect). Such a video stream may be displayed on a touchscreen by, for example, mapping the depth value of each pixel to a corresponding color. A video stream may be live, delayed, or retrieved from storage (e.g., pre-recorded).

A video stream is a time sequence of digital images ("frames"). In one example, the sequence of images is captured at a particular frame rate (e.g., for presentation at the same frame rate). A video stream may include information that indicates the beginning and end of each frame. In one example, the video stream includes a frame start code before the first pixel of each frame and a frame end code after the last pixel of each frame. In another example, the video stream includes one or more data signals, which carry the pixel information of the frames of the video stream, and one or more synchronization signals, which indicate the start and end of each frame of the video stream. Depending on the particular format of the primary video stream, the primary video stream may include additional information (e.g., headers, metadata). It is also possible for the primary video stream to include data other than the frame data (i.e., the pixel values) between the frame start and end codes. Such other data may include, for example, sensor configuration details and/or image statistics values.

Figure 11C:
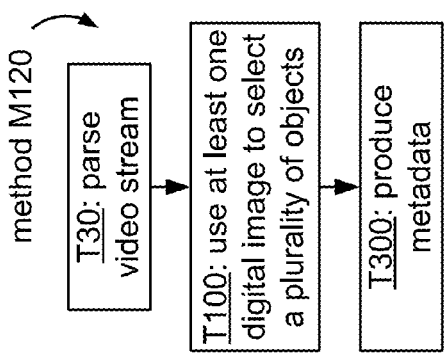
FIG. 11C shows a flowchart of an implementation M120 of method M100.
Figure 11D:
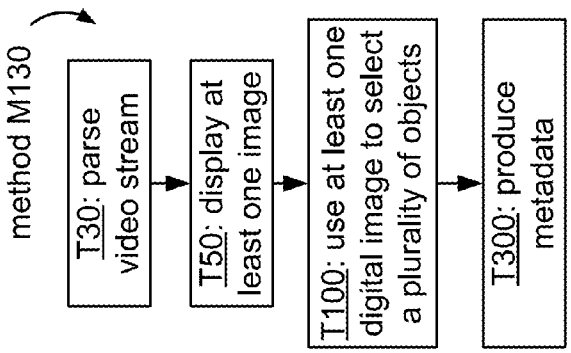
FIG. 11D shows a flowchart of an implementation M130 of methods M110 and M120.

Parsing of a video stream includes extracting frames of the video stream (e.g., using the frame start and end information) and making them available for processing. For example, parsing may include storing each frame to a corresponding specified location, such as a buffer. FIG. 11C shows a flowchart of an implementation M120 of method M100 which includes a task T30 that parses the video stream to produce the at least one digital image. Alternatively, another process may execute to parse the video stream (e.g., for display), such that one or more frames of the video stream are available to method M100 (e.g., in a buffer in memory) at any time. FIG. 11D shows a flowchart of an implementation M130 of methods M110 and M120.

Such a buffer (e.g., memory buffer 110) is typically capable of storing at least one full frame at a time. Parsing of the primary video stream may be configured to alternate between multiple frame buffers. For example, one such frame buffer may store a full frame for processing, while the following frame in the sequence is extracted and stored to another frame buffer. Alternatively, task T30 or the parsing process may be configured to store the parsed frames to a circular buffer, such that the buffer is updated (and old frames are overwritten) as new frames are extracted.

Parsing the primary video stream may include a demultiplexing operation to separate the primary video stream from one or more associated audio streams and/or metadata streams. Alternatively, such an operation may be performed upstream of task T30 or the parsing process (e.g., the primary video stream may be provided by a demultiplexer).

FIG. 12 shows an example of a sequence of user actions to select three objects. Panel A shows a scene as displayed on a touchscreen of a device. The device may be manipulated by the user to initiate a selection mode. For example, the touchscreen may be configured to enter the selection mode when the user touches an appropriate icon. Panel A shows an example of a selection tool icon in the upper right corner of the frame. In panel B, the user touches the selection tool icon to initiate the selection mode. In panel C, the tool icon is highlighted in response to the touch action to indicate that the device is in the selection mode, and the user touches the first object to select it. In panel D, the first object is highlighted (e.g., silhouetted as shown, or outlined) in response to the touch action to indicate that the object is selected, and the user touches the second object to select it. In panel E, the second object is highlighted in response to the touch action to indicate that the object is selected, and the user touches the third object to select it. In panel F, the third object is highlighted in response to the touch action to indicate that the object is selected, and the user touches the selection tool icon again to terminate the selection mode. The device may be configured to de-select a selected object if the user touches it again in the selection mode.

Figure 13:
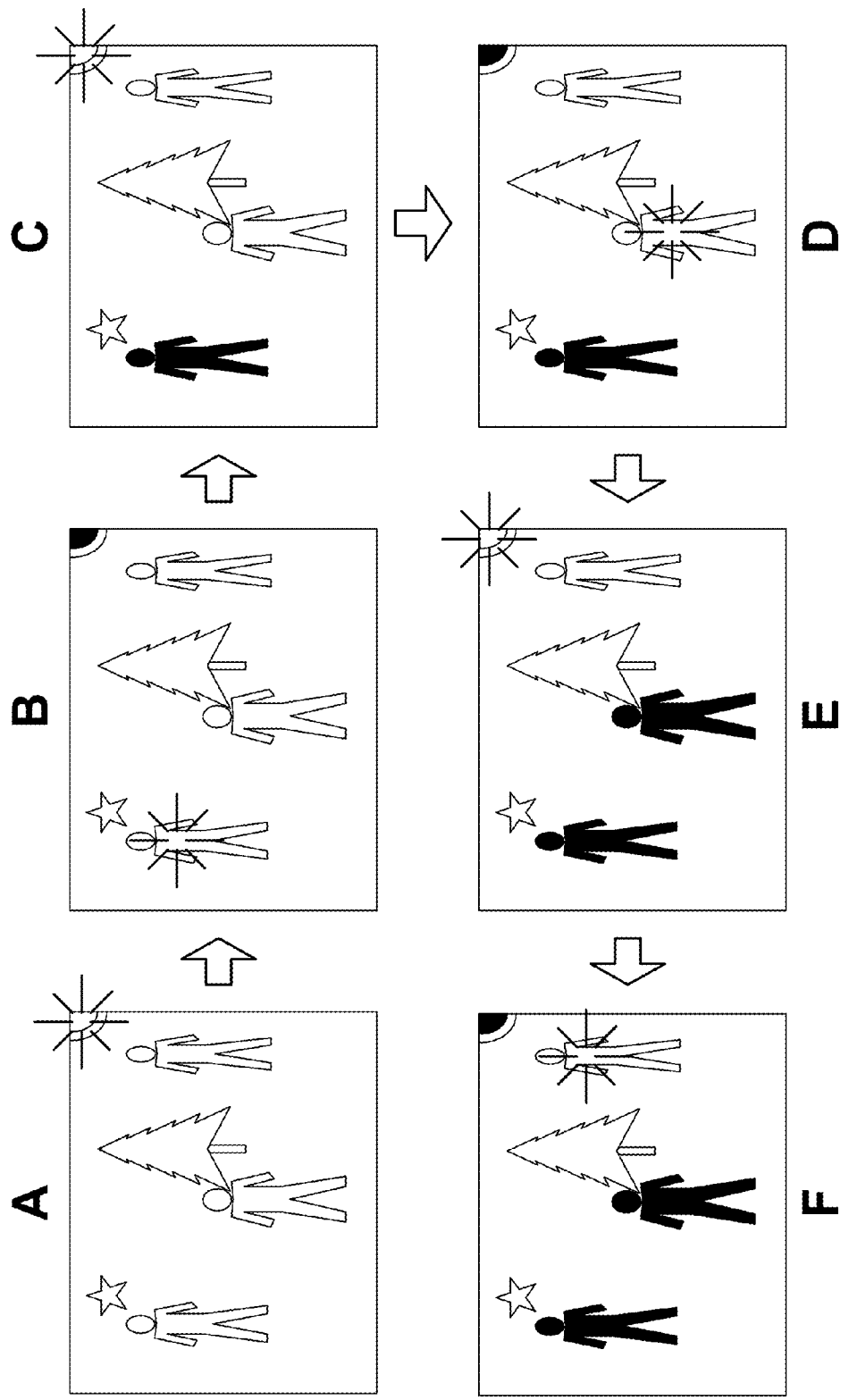
FIG. 13 shows another example of a sequence of user actions to select three objects.

FIG. 13 shows another example of a sequence of user actions to select three objects. In this case, the device operates differently in the selection mode than as shown in FIG. 12. In panel A, the user touches the selection tool icon to initiate the selection mode. In panel B, the tool icon is highlighted in response to the touch action to indicate that the device is in the selection mode, and the user touches the first object to select it. In panel C, the first object is highlighted in response to the touch action to indicate that the object is selected, and in response to the selection, the selection mode is terminated and the highlighting is removed from the tool icon. The user touches the selection tool icon again to initiate the selection mode, and in panel D, the tool icon is highlighted in response to the touch action to indicate that the device is in the selection mode, and the user touches the second object to select it. In panel E, the second object is highlighted in response to the touch action to indicate that the object is selected, and in response to the selection, the selection mode is terminated and the highlighting is removed from the tool icon. The user touches the selection tool icon again to initiate the selection mode, and in panel F, the tool icon is highlighted in response to the touch action to indicate that the device is in the selection mode, and the user touches the third object to select it.

In another example, the touchscreen may be configured to enter the selection mode in response to a two-action selection: a first action selects a menu mode (e.g., the user touches a designated area of the screen to display a menu) and a second action selects a selection mode from the menu. In a further example, the touchscreen may be configured such that the user selects an object by touching and holding a selection tool icon, dragging the icon to the desired point on the screen, and then releasing the icon to select the point. Alternatively, the user may manipulate the touchscreen to indicate a selection by selecting an area of the image that includes at least a portion of the desired object (e.g., a bounding box or ellipse or a lasso). In such case, the user may select the desired objects individually and/or as a group.

It may be desirable to allow the user to manipulate a field of view being displayed during selection mode (e.g., to perform a pinch action to widen the field of view, and a zoom action to narrow the field of view). Besides manipulation of a touchscreen, other possible modalities for direct user selection include actuating one or more buttons or other switches and/or gesture recognition. As an alternative to such direct action by a user, task T100 may perform the selection automatically by applying one or more predetermined criteria to information from the at least one digital image (e.g., one or more frames of a video stream). Such criteria may include, for example, recognition of a player's jersey number, face recognition, and/or velocity detection (e.g., to identify a fast-moving object, such as a ball in an athletic event).

Method M100 may be implemented to track an object in response to its selection in task T100. For example, a position-determining task T200 as described below may be implemented to also track one or more selected objects within the video stream (e.g., as described above with reference to object tracking and detection module 204 and/or object tracking and detection module 804). Alternatively, object tracking may begin prior to task T100. In such case, task T100 may be implemented for selection from among a set of tracked objects. For example, the user may select from among a display of tracked objects. Examples of algorithms that may be used for such object tracking (e.g., by task T200) include the Lucas-Kanade method (and variants, such as the Kanade-Lucas-Tomasi tracker) and mean-shift tracking. Tracking of an object may include segmenting the object from the rest of a frame of the primary video stream, although object tracking may also be performed in the absence of such segmentation.

Segmentation of an object from the rest of a digital image (e.g., frame of a video stream) may be used to support enhanced display of the object relative to the rest of the frame (e.g., silhouetting or outlining). Segmentation may be performed (e.g., by display task T50) in response to selection of an object in task T100. Such segmentation may be used to provide visual feedback to a user by confirming the object's selection. Segmentation may also be performed before selection begins. In such case, selection in task T100 may be made from among a set of objects that are already segmented (e.g., a display in which the segmented objects are enhanced).

Figure 14:
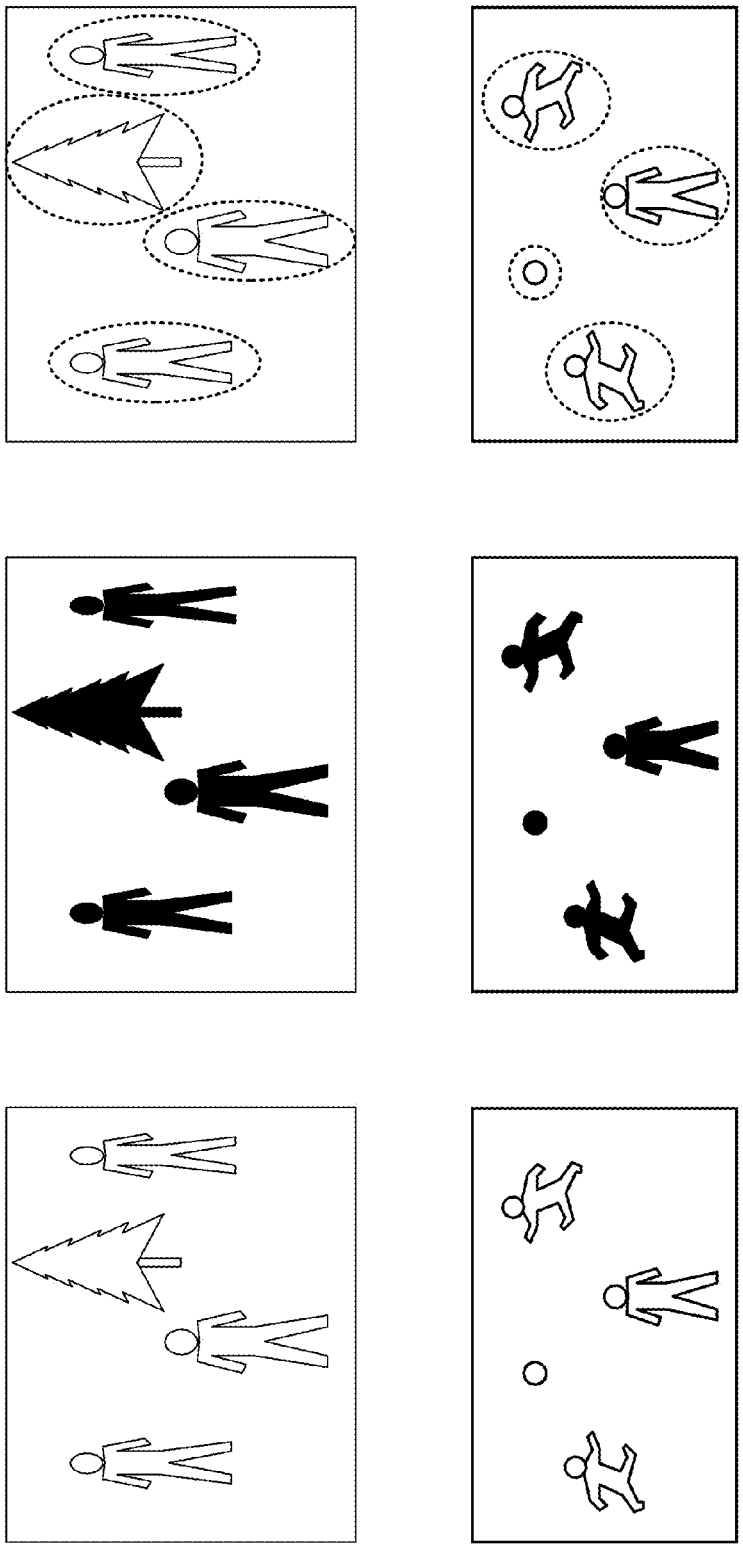
FIG. 14 shows examples of objects within frames and enhanced display of the objects.

The left-hand panels in FIG. 14 show two examples of frames from video streams that depict scenes which include objects. Enhanced display of an object may be performed (e.g., by display task T50) before selection in task T100 or in response to such selection. One example of enhanced display is a silhouette of the object, which may be displayed in a color that contrasts with the background (e.g., black or yellow, as shown in the center panels of FIG. 14). This contrasting color may be the same for all objects or may differ between objects (e.g., in order to contrast with the local background of each object). Other examples of enhanced display (which may likewise be done in a contrasting color) include outlining of the object and displaying a graphical element at, within, or around the object (e.g., a triangle at the apex or centroid of the object, an ellipse around the object as shown in the right-hand panels of FIG. 14, etc.).

Using a display of a video stream as a context for direct selection of objects by a user may be appropriate for slow-moving objects. Such an arrangement may be frustrating for a user, however, if any of the desired objects are moving quickly within the display. In cases of such quick movement, it may be desirable instead to display a single frame of the video stream as a context for direct selection of objects by a user. As described above, selection may be made from a display in which the objects in the frame are segmented and enhanced. If stream-display selection and frame-display selection are both supported, selection among these display modes may be performed by a user and/or automatically. For automatic selection, a degree of motion in the stream may be quantified using a measure such as, e.g., optical flow, motion vectors, pixel differences between frames, etc. In such case, a frame-display mode may be selected when the value of the measure is above a threshold, and a stream-display mode may be selected when the value of the measure is below the threshold.

Based on information indicating positions of the selected objects in a location space, task T300 produces metadata that identifies one among a plurality of candidate geometrical arrangements of the selected objects. The location space may be a pixel coordinate space of the at least one digital image (e.g., of the video stream), such as an (x, y) Cartesian coordinate space of a digital image (e.g., frame of the video stream). The origin of a pixel coordinate space of a digital image (e.g., video frame) is typically designated as the upper left or lower left corner of the image. The position of a selected object may be, for example, the location at which the user touched the screen to select the object. Alternatively, the positions of the selected objects may be provided by an object tracker, such as object tracking and detection module 204 or 804 as described herein.

A geometrical arrangement is an arrangement in space of the selected objects. For example, a geometrical arrangement may be a shape that is described by positions of the selected objects (e.g., as vertices of a polygon). Task T300 may be implemented to identify an appropriate one of the candidate geometrical arrangements by applying one or more metrics to the object positions. In such case, task T300 may use a decision tree to select the candidate according to the metric values. In one example, a training set of geometrical arrangements (e.g., that have already been classified) is used to generate the decision tree. The produced metadata may also include additional information, such as any among the following: a scale factor and/or aspect factor to be applied to the candidate, an orientation direction for the candidate, and a mirror flag indicating whether the candidate is to be flipped around an axis.

Task T300 may be implemented to determine which among the plurality of candidate geometrical arrangements is most similar to a shape described by the positions of the selected objects. For a case in which all of the selected objects are unique, one measure of similarity that may be used by task T300 is the sum of the distances, for each selected object, between the object's observed position and the corresponding position in the candidate geometrical arrangement (e.g., after compensating for orientation and scaling). FIG. 35 shows another example by which task T300 may be implemented to match a shape described by three positions A, B, C to one of a set of three candidate geometrical arrangements, labeled "equidistant," "near-near-far," and "near-far-far".

In this example, the three distances between the points (i.e., AB, BC, and AC) are calculated and sorted by magnitude to determine the minimum, middle, and maximum among them. The minimum distance is compared to a value that is two-thirds of the maximum distance. If the minimum distance is greater, then task T300 selects the candidate "equidistant," as indicated by the box at the top left of FIG. 35. If the minimum distance is lesser, then the middle distance is compared to a value that is one-half the sum of the minimum and maximum distances. If the middle distance is greater, then task T300 selects the candidate "near-far-far," as indicated by the box at the bottom of FIG. 35. If the middle distance is lesser, then task T300 selects the candidate "near-near-far," as indicated by the box at the top right of FIG. 35.

FIG. 35 also shows the three cases that fall on the decision boundaries, which may be assigned by task T300 to either of the adjacent candidates as desired. In this case, the metadata identifying the appropriate candidate may be a parameter having one of three possible values, each indicating a corresponding one of the three candidate geometrical arrangements. The metadata may also indicate an orientation to be applied to the candidate (e.g., as a rotation). In one example, the orientation is indicated as the direction of a line from the center of the geometrical arrangement through the point opposite the minimum distance. In another example, the orientation is indicated as the direction of a line from the center of the geometrical arrangement through the point corresponding to a particular one of the selected objects.

FIG. 37A shows a flowchart of an implementation M200 of method M200 that includes task T200, which obtains the information indicating positions of the selected objects in the location space. Task T200 may be implemented to execute in response to the selecting in task T100. The location space may be a pixel coordinate space of the at least one digital image (e.g., of the video stream), such as an (x, y) Cartesian coordinate space of a digital image (e.g., frame of the video stream). The origin of a pixel coordinate space of a digital image (e.g., video frame) is typically designated as the upper left or lower left corner of the image. FIGS.

37B-D show flowcharts of implementations M210, M220, and M230 of methods M110, M120, and M130, respectively, that include task T200.

The pixel coordinate space of the display may be the same as the location space, or the location space may include the pixel coordinate space of the display. For example, a frame of the display may include only a portion of a corresponding frame of the video stream (e.g., in response to a zoom action to narrow the field of view). Alternatively, the pixel coordinate space of the display may include the location space. For example, the video stream may be displayed in a window of the display that is smaller than a frame of the display, with other content being displayed in another window of the display.

Task T200 may be implemented to determine a position of a selected object as a position of an image of the selected object in the pixel coordinate space. For example, the determined position may be a center of mass of the object. The center of mass is the same as the centroid if constant density is assumed, but differences in density may also be indicated by, for example, differences in color and/or transparency. Other examples of the determined position include the top or bottom pixel of the object, a vertical projection of the center of mass of the object to the top or bottom of the object, or a position of a particular feature of the object. FIG. 17A shows an example of projecting a center of mass C10 of an object onto a bottom bounding line of the object to obtain a corresponding determined position DP10.

Alternatively or additionally, task T200 may be implemented to determine a reference position of a formation of multiple objects. For example, task T200 may be implemented to calculate a reference position as a position of a formation of the selected objects. In such case, the determined reference position may be a center of mass of the formation (with different objects having the same or different densities), the top or bottom pixel among the objects, a vertical projection of the center of mass of the formation to the top or bottom of the formation, or a position of a particular one of the objects. In such case, task T200 may determine the positions of the selected objects as positions relative to the reference position (e.g., to use the reference position as an origin).

The selected objects may be physically separate from one another, such that they are not parts of a common object. For example, at least one of the objects may be capable of moving independently of the others. In a particular example, one or more of the objects are different people, animals, and/or vehicles.

The pixel coordinate space of the video stream or display may be two-dimensional or three-dimensional. Examples of three-dimensional displays include stereoscopic (e.g., left/right) and volumetric displays. User selection of an object in such a location space may include manipulating a selection point in three dimensions using, for example, a glove, a gesture (e.g., tilting an orientation-sensitive device), or a pressure-sensitive touchscreen.

Alternatively, the location space may be the physical space (e.g., the scene space). In one such example, the determined reference position is based on at least one point selected using a video stream that includes depth information, such as a video stream from a structured light imager or other depth camera (e.g., Microsoft Kinect). Such a video stream may be displayed on a touchscreen by, for example, mapping the depth value of each pixel to a corresponding color. The determined reference position may be based on a position of an image of each selected object in the physical space, or may be a position of a formation of the selected objects, as in the examples above (e.g., center of mass). User selection of an object in such a location space may include manipulating a selection point in three dimensions using, for example, a glove, a gesture (e.g., tilting an orientation-sensitive device), or a pressure-sensitive touchscreen.

FIGS. 15A-C show examples of using an orientation-sensitive device to manipulate a selection point in a depth dimension of a displayed scene. Such an orientation-sensitive device may be, for example, a mobile device having one or more orientation sensors that indicate an orientation of the device relative to a gravitational axis (e.g., an axis through the device and the center of the earth). Such one or more orientation sensors may include, for example, one or more inertial sensors (e.g., gyroscopes and/or accelerometers) and/or one or more magnetic field sensors (e.g., magnetometers).

In each of FIGS. 15A-C, the left panel indicates a display of the same digital image on a screen of the orientation-sensitive device, and the right panel indicates a corresponding orientation of the device (shown in cross-section through a vertical line of the display, which is indicated in bold) relative to a gravitational axis g. The scene as displayed in each of these figures includes an object in the foreground (i.e., closest to the capturing device), an object in the middle ground, and an object in the background (i.e., farthest from the capturing device). In each of these examples, the degree of tilt is indicated by a slider at the left of the display. When the device is vertical to the ground as shown in FIG. 15A, the degree of tilt is low and the foreground object is selected (as indicated by the highlighting in the left panel). When the device is horizontal to the ground as shown in FIG. 15C, the degree of tilt is high and the background object is selected (as indicated by the highlighting in the left panel). When the device is at a forty-five-degree angle to the ground between these orientations, as shown in FIG. 15B, the degree of tilt is at midpoint, and the object in the middle ground is selected (as indicated by the highlighting in the left panel).

In another example, the position of an object in the physical space may be indicated by information from one or more position sensors in or on the object (e.g., GPS sensors). For example, the object may include one or more such sensors (e.g., a ball) or be wearing one or more such sensors (e.g., a person or animal). Linking of a user-selected position in the pixel coordinate space of a display to the sensed position of the object in physical space may be performed using position and/or orientation sensors in the touchscreen device and/or recognition of object features (e.g., color, jersey number).

Additionally or alternatively, the position of an object in the physical space may be projected from a position of an image of the object in the pixel coordinate space. The spatial relation between positions of object images in a display plane may not correlate well to the spatial relation between positions of the corresponding objects in the physical space. Such discrepancy may be highest when the display plane (e.g., the focal plane during capture of the video stream) is perpendicular to the ground plane.

FIG. 16 shows an example of a discrepancy between distances among images of objects in a 2-D pixel coordinate space compared to the distances among the actual objects in the scene space. The top panel A shows a digital image (e.g., a frame of a video stream), and the bottom panel A shows the distances among the centroids of the three people at the left of the scene as depicted. These distances indicate that the leftmost person is farther from each of the other two people than they are from each other. The top panel B shows the same scene as viewed from directly above, and the bottom panel B shows that the middle person is actually much farther away from the other two than they are from each other, such that the distance relationship indicated in the bottom panel A is inaccurate with respect to the actual distance relationship in the scene space.

The physical space may be a two-dimensional space, such as a ground plane in the scene space. In one such example, the location space is a ground plane in the scene space, and a point in the pixel coordinate space is projected to a corresponding point in the ground plane. The ground plane may be, for example, an athletic field of play, such as a basketball court as shown in panel C of FIG. 16. It may be desirable to use such a location space to support consistency in object positions among video streams of similar events in the same or similar space that have different fields of view and/or are captured from different viewpoints.

Associating a point in a pixel coordinate space of the digital image to a corresponding point in the ground plane may be performed by projecting a linked point in the scene space (e.g., as indicated by data from one or more sensors and/or a depth camera) downward into the ground plane (or projecting the linked point upward into the ground plane, if appropriate). FIG. 17B shows an example of such projection of a linked point LP10 (which may be indicated by a GPS sensor and/or other position sensor on the object as discussed above) to a determined position DP20 in the ground plane.

Alternatively, associating a point in a pixel coordinate space of the digital image to a corresponding point in the ground plane may be performed by projecting the point from the pixel coordinate space to the ground plane as shown in FIGS. 18A and 18B, which show cross-sections through the focal axis of the capturing device in a plane orthogonal to the ground plane). Such projection may be performed directly if the orientation angle a of the capturing device relative to the ground plane is known (e.g., from one or more orientation sensors as described above). Alternatively, orientation angle a may be inferred from fiducial information in the video frame, such as ground plane fiducials (e.g., boundary lines of an athletic field), the horizon (indicated, e.g., by a difference in light), horizontal features bounding the objects (e.g., lines indicating the front and rear of a performance stage), or at least a rear bounding horizontal feature. As shown in FIG. 18B, the ratio between distances r and s in the ground plane is related, by orientation angle a, to the ratio between corresponding distances p and q in the focal plane. It may be assumed that field-of-view angle b is known, and that the ratio between the distances p and q in the focal plane is equal to corresponding distances as imaged in the display space (i.e., as those distances appear, relative to each other, along a vertical line in the pixel coordinate space of the display).

In one such example, task T200 is implemented to use the orientation of a capturing device and/or image fiducial information to map the display plane to the ground plane (e.g., as described above). In this implementation, task T200 determines the position of each selected object in the display plane by projecting the object's center of mass downward in the display plane to the bottom of the object (e.g., as shown in FIG. 17A), and determines the object position in the location space by mapping this display position to a corresponding position in the ground plane. In this case, task T200 may be implemented to calculate the determined reference position as an average of the object positions in the ground plane, or as a position of a formation of the object positions in the ground plane, according to any of the examples described above.

Task T300 may be implemented to associate the metadata with the at least one digital image (e.g., with the video stream). Such metadata may also include other information regarding the tracked objects, such as labels for selected objects (e.g., a person's name), identification of a geometrical arrangement among the selected objects, etc. Additionally or alternatively, the metadata may include information (e.g., camera settings, camera orientation, sensor characteristics, time and/or location of capture) that may be obtained from other elements of the device and/or from metadata in the at least one image or video stream as received.

Such an implementation of task T300 may encode the metadata into a desired format, such as any among XML (eXtensible Markup Language), KLV (Key-Length-Value), *.srt (SubRip file format), and *.vtt (Web Video Text Track format). In some formats, at least some of the metadata may be included within the digital image or video stream (e.g., within a portion of the frame data that is reserved for embedded data). Alternatively, task T300 may be implemented to package the metadata as a separate file or as a metadata stream that is synchronized with the video stream.

It may be desirable to implement method M100 to include repeated instances of task T300 (e.g., repeated instances of tasks T200 and T300) on a video stream: for each frame of the video stream, for example, or for each n-th frame (where n is an integer greater than one), or upon a specified event (e.g., detection by a tracking task that a selected object has moved). In such case, items of metadata within a metadata file or stream may be timestamped to indicate a desired association between such an item and a corresponding frame of the video stream. In such case, task T300 may also include multiplexing the video and metadata streams (possibly with one or more audio streams as well).

For a case in which a stream containing the metadata is to be transmitted and/or stored, other information and/or formatting may be performed to comply with a particular stream format (e.g., the metadata and/or the stream may be packetized into a header-plus-payload format). Task T300 may be implemented to provide a stream containing the metadata to a compressor or other encoder, which may be configured to encode the stream. Examples of storage file formats that may be used to store such a stream include any of the following video container formats: AVI, WMV, MOV, MKV, MPG, and MP4.

In some applications, the geometrical arrangement of the selected objects may be a distribution of numerous selected objects in the location space (e.g., a crowd of people in a public space, a large group of animals, a large group of airborne or waterborne vehicles or other objects). It may be unnecessary for task T300 to produce metadata indicating a position for each individual object, and the exact total number of the selected objects may also be unnecessary.

In such case, task T300 may be implemented to determine which among the plurality of candidate geometrical arrangements is most similar to a distribution of the selected objects in the location space. For example, it may be desirable to implement task T300 to determine the candidate that most closely approximates a given (e.g., observed) distribution of the selected objects relative to a reference position (e.g., the position of a speaker in a crowd).

FIG. 36 shows one example by which task T300 may be implemented to match a distribution of numerous objects arranged relative to a reference position (e.g., a position of an object of interest or "primary" object), which is indicated by the dot at the center of each of the ten candidates on the right side of the figure. In this case, a circular location space is divided into sixteen regions as shown in the figures on the left side of the figure, and the number of objects in each region is determined. The location space need not be circular (e.g., may be a square, rectangle, ellipse, etc.).

The four large figures to the left of FIG. 36 illustrate one example of a set of four occupancy metrics that may be used as decision metrics for this selection: (A) a ratio between the number of objects in the inner regions and the number of objects in the outer regions, (B) a ratio between the number of objects in the most-populated half and the number of objects in the other half (alternatively, a ratio between the number of objects in the most-populated half and the total number of objects), (C) a ratio between the number of objects in the most-populated quarter and the number of objects in the opposite quarter, and (D) a ratio between the number of objects in the most-populated opposing quarters and the number of objects in the other two quarters (alternatively, a ratio between the number of objects in the most-populated opposing quarters and the total number of objects).

Even when the number of selected objects is large, the values of these four metrics for a particular distribution of objects in the location space may be calculated at very low computational complexity. A decision tree may then be used to select among, for example, the ten candidate geometrical arrangements at the right side of FIG. 36 according to the values of these metrics for the given distribution. In such case, task T300 may be implemented to produce metadata identifying the selected candidate and indicating the total number of the selected objects. To reduce the size of the metadata even further, task T300 may be implemented to produce the metadata to indicate an approximation of the total number of the selected objects (e.g., by dividing the total number by a specified quantization factor and rounding the result to the nearest integer).

As an alternative to the four occupancy metrics above, task T300 may be implemented to produce metadata that encodes the distribution as (A) an indication (possibly approximate as described above) of the total number of objects and (B) a sixteen-bit number in which the state of each bit indicates whether the corresponding region is occupied. In such case, it may be desirable for the encoder to indicate occupancy of a vacant region if a neighboring region is much more occupied than other occupied regions. Other alternatives may include calculating an axis of orientation of the distribution (e.g., second-order moment).

Other characteristics that may be included by task T300 in the metadata include an indication of variability of the boundaries between the regions and a degree of movement of each individual object over time (Brownian motion). The metadata may include overlapping shapes (e.g., more than one candidate for each distribution, possibly selected from a different set of candidates) to indicate additional aspects of the distribution (e.g., to encode an indication of different degrees of activity at different locations within a group of objects).

In the example set of ten candidates shown at the right of FIG. 36, the three shapes concentrated toward the primary object imply the existence of outlier objects positioned at the periphery (otherwise, a shape without such concentration would have been selected). A corresponding decoder (e.g., as described below with reference to implementations of method M500, apparatus MF500, and apparatus A500) may be configured to represent such outliers by distributing a small portion of the total number of objects within the periphery. Alternatively, the encoder may be configured to ignore such outliers when scaling.

Task T300 may also be implemented to perform any of the additional examples of selecting among geometrical arrangements as described below with reference to FIGS. 33A, 33B, 34A-C and the associated discussion of formations, formation data, and formation codebooks. Implementations of method M100 as described herein may be used to provide metadata (e.g., during capture of a video stream) to permit frames indexed as depicting a match to a particular geometrical arrangement among the selected objects to be easily identified for retrieval by searching the metadata, thus avoiding a need to review the entire video stream.

Referring to FIG. 20, a particular embodiment depicting video processing using object tracking is shown. The video processing techniques described with respect to the embodiment depicted in FIG. 20 may be performed by the electronic device 102 of FIG. 1, the object tracking and detection module 204 implemented by the processor 264 of FIG. 2B, the object tracking and detection module 804 of FIG. 8 implemented by a processor, the smoothing module 961 of FIG. 9 implemented by a processor, or any combination thereof.

FIG. 20 shows a digital image 1700 that depicts a scene as captured at a first time instance. For example, image 1700 may correspond to a video stream to be displayed on a screen of a mobile device. The mobile device may be configured to capture the stream (e.g., with a camera of the mobile device) or to receive it from another device. The scene depicted in frame 1700 includes a first object 1702, a second object 1704, a third object 1706, and a star. In the illustrated embodiment, first object 1702 may correspond to a first person, second object 1704 may correspond to a tree, and third object 1706 may correspond to a second person. In another embodiment, at least one of first object 1702 and third object 1706 may correspond to a robot that is controlled via the mobile device.

FIG. 20 also shows a display 1710 of image 1700 on a screen of the mobile device. The screen of the mobile device (e.g., a touchscreen) may correspond to a viewfinder. Display 1710 may include a user selection mechanism 1711 that enables a user to select objects for tracking (e.g., by task T200). For example, the user may perform task T100 by touching the user selection mechanism 1711 on the screen and dragging a first focus ring 1712 around first object 1702 to select and enable tracking of first object 1702. In response to such placement of first focus ring 1712, the mobile device may select first object 1702 in frame 1700 for tracking. In a similar manner, the user may also touch user selection mechanism 1711 on the screen and drag a second focus ring 1714 and a third focus ring 1716 around second object 1704 and third object 1706 to select and enable tracking of second object 1704 and third object 1706, respectively. In response to such placement of second focus ring 1714 and third focus ring 1716, the mobile device may select second object 1704 and third object 1706, respectively, for tracking.

FIG. 20 also shows an image 1720 that depicts the scene as captured at a second time instance (e.g., subsequent to the first time instance). In image 1720, the position of each object 1702-1706 has changed with respect to the corresponding positions in image 1700 depicting the scene at the first time instance. For example, in image 1720 first object 1702 and third object 1706 have moved. Although second object 1704 (e.g., the tree) is a stationary object, second object 1704 may appear to have moved. For example, the position of the mobile device (or other capturing device) may move, which in turn, may create the illusion that second object 1704 has moved.

The mobile device may monitor one or more spatial relations (also called "geometry") among the selected objects 1702-1706. For example, the mobile device may track and measure a first distance between first object 1702 and second object 1704, a second distance between second object 1704 and third object 1706, and a third distance between third object 1706 and first object 1702. In a particular embodiment, tracking the geometry between each selected object 1702-1706 (e.g., by task T200) may initiate upon a trigger event. As a non-limiting example, tracking the geometry between each selected object 1702-1706 may initiate upon first object 1702 crossing second object 1704. In other embodiments, tracking the geometry between each selected object 1702-1706 may initiate upon a user input. As a non-limiting example, tracking the geometry between each selected object 1702-1706 may initiate upon user selection of two or more of the objects 1702-1706. As another example, tracking the geometry between each selected object 1702-1706 may initiate upon the user selecting to initiate a tracking mode.

FIG. 20 also shows a display 1730 of image 1720 on the screen of the mobile device (e.g., by display task T50). The mobile device may include an indication of the geometry on display 1730. For example, a first indication ($L_{12}$) of the first distance between first object 1702 and second object 1704 may be included in display 1730. The first distance may be determined based on a location of first object 1702 in image 1720 and a location of second object 1704 in image 1720. For example, the mobile device may track the location of first object 1702 and the location of second object 1704 to generate the first indication ($L_{12}$). A second indication ($L_{23}$) of the second distance between second object 1704 and third object 1706 may be also included in display 1730. The second distance may be determined based on a location of second object 1704 in image 1720 and a location of third object 1706 in image 1720. For example, the mobile device may track the location of second object 1704 and the location of third object 1706 to generate the second indication ($L_{23}$). A third indication ($L_{13}$) of the third distance between first object 1702 and third object 1706 may also be included in display 1730. The third distance may be determined based on a location of first object 1702 in frame 1720 and a location of third object 1706 in frame 1720. For example, the mobile device may track the location of first object 1702 and the location of second object 1704 to generate the third indication ($L_{13}$).

The mobile device may also track the composite geometry of the objects 1702-1706 (e.g., a geometrical arrangement of the selected objects). For example, in the illustrated embodiment, the geometrical arrangement of the objects 1702-1706 may be characterized as a triangle formed by each indication ($L_{12}$, $L_{23}$, $L_{13}$). At least one parameter of the geometry between each object, or at least one parameter of the composite geometry may be used to cluster images (e.g., frames of one or more video streams). As a non-limiting example, particular images may be clustered based on a distance (e.g., the first distance, the second distance, and/or the third distance) between two particular objects 1702-1706. As another non-limiting example, particular images may be clustered based on a center of mass ($C_{M2}$) of multiple objects 1702-1706. For example, the mobile device may determine the center of mass ($C_{M2}$) of the triangle formed by each indication ($L_{12}$, $L_{23}$, $L_{13}$) for each image. In a particular embodiment, the center of mass ($C_{M2}$) may be calculated, indexed, and displayed on the screen 1730. In another embodiment, the center of mass ($C_{M2}$) may only be calculated and indexed. Frames that have a substantially similar center of mass may be clustered together and indexed into a memory. During such tracking, it may be desirable to control a display translation operation such that the center of the display coincides with the center of mass. Additionally or alternatively, it may be desirable to control an optical and/or digital zoom operation of the camera such that all of the selected objects remain visible within the display.

In a particular embodiment, the mobile device may track the geometry between each object 1702-1706 and/or the composite geometry for each frame (e.g., track the geometries on a frame-by-frame basis). In other embodiments, the mobile device may track the geometry between each object 1702-1706 and/or the composite geometry at non-consecutive intervals (e.g., track the geometries at non-consecutive frames). Tracking the geometries at non-consecutive frames may reduce an amount of power consumed at the mobile device (e.g., prolong battery life) and reduce an amount of memory used for indexing information associated with the geometries and/or clustering information.

For example, in a particular embodiment, the mobile device may track each object 1702-1706 (e.g., three objects) at every frame. During tracking, each object 1702-1706 may be represented by at least three values associated with the position of the object 1702-1706 and the size of the object 1702-1706. For example, one value may correspond to an x-coordinate of the object 1702-1706, one value may correspond to a y-coordinate of the object 1702-1706, and another value may correspond to a size (e.g., a bounding box) of the object 1702-1706. Each value may correspond to a 32-bit (e.g., 4 byte) number. Thus, at least 288 bits of data (3 objects*3 values/object*32-bits/value) may be collected and logged into memory for each frame during tracking. Assuming that the mobile device captures 30 frames per second, to track and index three objects 1702-1706 on a frame-by-frame basis for an hour (e.g., 3600 seconds), at least 3,888,000 bytes of data is collected and logged into memory.

However, tracking the geometries at non-consecutive frames may relax memory requirements. As a non-limiting example, tracking and indexing each object 1702-1706 at every interval of 15 frames for an hour may yield a 93.33% savings in memory space. Tracking the geometries at non-consecutive frames may be particularly beneficial in scenarios where there is a relatively small amount of movement associated with the objects 1702-1706. The mobile device may determine the frequency at which to track and index the frames based on user input (e.g., user preference) and/or may vary the frequency based on, for example, a user indication and/or a degree of change over time in a position of each of one or more of the selected objects.

Each object 1702-1706 may also have an individual center of mass corresponding to the object's 1702-1706 location on the screen 1730. For example, the first object 1702 may have a center of mass ($C_{O1}$) at the location of the first object 1702, the second object 1704 may have a center of mass ($C_{O2}$) at the location of the second object 1704, etc. The center of mass for each object 1702-1706 may also be a geometric parameter that the mobile device tracks.

FIG. 20 also shows an image 1740 that depicts the scene as captured at a third time instance (e.g., subsequent to the second time instance). In image 1740, the position of each object 1702-1706 has changed with respect to the corresponding positions depicted in image 1720 at the second time instance.

FIG. 20 also shows a display 1750 of image 1740 on the screen of the mobile device (e.g., by display task T50). The mobile device may display an indication of the geometry in display 1750. For example, the first indication ($L_{12}$) of the first distance between first object 1702 and second object 1704 may be included in display 1750, the second indication ($L_{23}$) of the second distance between second object 1704 and third object 1706 may be included in display 1750, and the third indication ($L_{13}$) of the third distance between first object 1702 and third object 1706 may be included in display 1750. Additionally, the mobile device may also track the composite geometry of the objects 1702-1706. For example, in the illustrated embodiment, the composite geometry of the objects 1702-1706 may correspond to the triangle formed by each indication ($L_{12}$, $L_{23}$, $L_{13}$).

In another embodiment, the mobile device may track the movement of each object 1702-1706 and generate a sequence of plots that display the movement of each object 1702-1706 over time. The mobile device may generate a plot for each object 1702-1706 at every frame, or may generate a plot for each object 1702-1706 at non-consecutive frames to relax memory requirements and improve power savings, as described above.

It is also possible to configure the device (e.g., to implement task T200) to track a spatial relation of one or more selected objects to objects that are not currently visible on the display (e.g., are not currently within the scene captured by the video stream). For example, spatial relations of moving objects to fixed (reference) objects that are currently off-screen may be tracked. In a particular example, the device may be configured to indicate whenever a selected player is within twenty feet of the goal or basket, and/or is moving toward the goal/basket, even if the goal/basket is not currently on-screen. In such case, the device may be configured to create a map that is larger than the scene currently displayed. For a case in which the location of the camera is known (e.g., as indicated by a location sensor, such as a GPS sensor), one or more orientation sensors of the camera may be used to determine how the current view relates to the larger scene map. Such one or more orientation sensors may include one or more inertial sensors (e.g., gyroscopes and/or accelerometers), and/or one or more magnetic field sensors (e.g., magnetometers), to indicate an orientation of the camera relative to a gravitational axis (e.g., an axis through the device and the center of the earth). Additionally or alternatively, visible features of fixed reference objects, such as markings on a sports field or court, or scene fixtures of a performance stage, may be used as fiducials. Such mapping may also be done for a camera that is moving, although the appearance of a reference object may change as the angle from which it is viewed changes.

The embodiment depicted in FIG. 20 may enable the mobile device to track geometries of the objects 1702-1706 in images 1700, 1720, 1740 and cluster frames for retrieval that have substantially similar geometries, as explained below with respect to FIG. 21. The mobile device may perform the techniques described with respect to FIG. 20 using a single camera or using multiple cameras.

Uses and applications for generating metadata as described herein may include any of the following: sporting events (e.g., soccer, basketball, football, hockey), social events (e.g., wedding, party, dancing), art performances (e.g., play, school play, concert, duet), and security or surveillance monitoring. The mobile device may also be a head-mounted display, with user selection being performed by use of, e.g., a joystick, a gesture-recognition camera system, or a glove equipped with touch and/or orientation sensors (e.g., one or more orientation sensors as described above) to detect user commands. The video stream may be live (e.g., captured by the device or streamed from another capturing device, e.g., via a short-range connection, such as Bluetooth, or via a network, such as a Wi-Fi connection to the internet) or recorded (again, by the device or by another device).

It may be desirable to classify frames of a video stream according to relative locations of and/or spatial relations among selected objects within the stream. Referring to FIG. 21, a particular embodiment of a display 1800 of a mobile device that is used to retrieve frames based on clustering is shown. The display 1800 may include a graph having a horizontal axis and a vertical axis. The horizontal axis may correspond to different video files captured by the mobile device. For example, in the illustrative embodiment, the mobile device captured a first video file and a second video file. The vertical axis may correspond to time indexes of the video files.

Each video file may include clusters that are based on at least one parameter associated with the geometry of selected objects in the video file. For example, each cluster in the video files may include a group of frames having a substantially similar geometry between selected objects. The clusters depicted in FIG. 21 may be based on a center of mass between the objects; however, in other embodiments, the clusters may be based on one or more different parameters (e.g., shape, distance, spatial characteristics, color schemes, etc). The parameters may be selected by a user.

Frames at the beginning of the first video until approximately the 10:00 mark of the first video may be grouped into a first cluster (e.g., Cluster 1). The first cluster may correspond to frames whereby the center of mass on the screen 1800 between the selected objects has an x-coordinate at approximately 150 and a y-coordinate at approximately 250. Referring to the second frame in FIG. 20, the center of mass ($C_{M2}$) of the selected objects 1702-1706 (e.g., the center of mass ($C_{M2}$) of the triangle) may have an x-coordinate at approximately 150 on the screen 1730 and a y-coordinate at approximately 250 on the screen 1730. Thus, the second frame (and other frames having a substantially similar center of mass between the objects 1702-1706) may be placed in the first cluster of FIG. 21. Thus, if the user selects the first cluster, the mobile device may display corresponding video streams (e.g., portions of the video) where the selected objects 1702-1706 have a substantially similar configuration as the second frame in FIG. 20.

Frames from approximately the 10:00 mark of the first video until approximately the 20:00 mark of the first video may be grouped into a second cluster (e.g., Cluster 2). The second cluster may correspond to frames whereby the center of mass on the screen 1800 between the selected objects has an x-coordinate at approximately 100 and a y-coordinate at approximately 250. Referring to the third frame in FIG. 20, the center of mass ($C_{M3}$) of the selected objects 1702-1706 may have an x-coordinate at approximately 100 on the screen 1750 and a y-coordinate at approximately 250 on the screen 1750. Thus, the third frame (and other frames having a substantially similar center of mass between the objects 1702-1706) may be placed in the second cluster of FIG. 21. Thus, if the user selects the second cluster, the mobile device may display corresponding video streams (e.g., portions of the video) where the selected objects 1702-1706 have a substantially similar configuration as the third frame in FIG. 21.

Additional clusters (e.g., a third cluster) may correspond to frames having different centers of mass (e.g., an x-coordinate at 175 and a y-coordinate at 325). The user may retrieve (e.g., locate) particular portions of the video by selecting clusters having a configuration (e.g., a center of mass) associated with the particular portions of the video. Thus, by indexing frames into clusters that are based on geometric parameters of the selected objects 1702-1706 (e.g., distance, center of mass of each and/or all selected objects), the user of the mobile device may readily locate desired portions of a video without having to navigate (e.g., play, fast-forward, rewind, etc.) through the video. Indexing the frames into clusters may also permit the user to view which configuration (e.g., geometry) occurred most frequently, least frequently, etc. Such indexing and/or values of such geometric parameters may be included among metadata produced by task T300 as described above.

FIG. 21 also includes a display 1802 of regions associated with clusters of frames of a video stream. For example the display 1802 of clusters may correspond to the video stream of the scene in FIG. 20. The display 1802 includes ten regions (C1-C10). In the illustrated embodiment, the regions (C1-C10) are based on a center of mass of the objects 1702-1706 at particular frames. In other embodiments, the regions (C1-C10) may be based on other geometric parameters (e.g., the center of mass for each object 1702-1702, shapes, distances, spatial characteristics, color schemes, etc). In a particular embodiment, each region (C1-C10) may have an equal size (e.g., each region (C1-C10) may be a "Voronoi Cell").

Each region (C1-C10) may include an x-coordinate and a y-coordinate that corresponds to a center of mass associated with a particular cluster. As a non-limiting example, the center of mass corresponding to the first region (C1) may have an x-coordinate of 75 and a y-coordinate of 580. Additionally, the center of mass corresponding to the second region (C2) may have an x-coordinate of 215 and a y-coordinate of 580. Frames in the video stream of the scene in FIG. 20 may be indexed by the center of mass of the objects 1702-1706. Each frame may be placed in a cluster corresponding to one of the regions (C1-C10) based on the center of mass. For example, a frame having a center of mass that is closest to the center of mass of the first region (C1) may be placed within a corresponding first cluster. Such clustering information may be produced by task T300 and associated with the corresponding frames as metadata (e.g., in a metadata stream synchronized to the video stream as described herein). In such case, the frames indexed within a particular cluster may be easily identified for retrieval by searching the metadata, thus avoiding a need to review the entire video stream.

The mobile device may display video frames having a particular geometry (e.g., center of mass) in response to a user selection of a particular cluster. For example, if the user selects (e.g., touches) the first region (C1), the mobile device may display a cluster of video frames in which the center of mass of the objects 1702-1706 is within the first (C1) region. In a particular embodiment, the user may touch the screen at the first region (C1) and hold the first region (C1) for a period of time that exceeds a threshold (e.g., three seconds). After holding the first region for three seconds, the first region (C1) may be enlarged on the display 1802. For example, display 1802 may depict the first region (C1) as shown in 1804. In this mode, the first region 1804 may illustrate particular frames (e.g., frame 1023 to frame 1026) based on the center of mass ($C_{M1023-1026}$) of the particular frames. In a particular embodiment, the user may select a particular frame (e.g., frame 1024) and the mobile device may initiate playback of the video stream at frame 1024.

Referring to FIG. 22, a flowchart that illustrates a particular embodiment of a video processing method 1900 using object tracking is shown. In an illustrative embodiment, the method 1900 may be performed using the electronic device 102 of FIG. 1, the object tracking and detection module 204 implemented by the processor 264 of FIG. 2B, the object tracking and detection module 804 of FIG. 8 implemented by a processor, the smoothing module 961 of FIG. 9 implemented by a processor, or any combination thereof.

The method 1900 includes receiving, at a mobile device, a selection of multiple objects in a scene, at 1902. For example, referring to FIG. 20, the user may touch the user selection mechanism 1711 on the screen 1710 and drag the first focus ring 1712 around the first object 1702, the second focus ring 1714 around the second object 1704, and the third focus ring 1716 around the third object 1706 to enable tracking of the first, second, and third objects 1702-1706, respectively. The displayed scene 1700 may correspond to a video stream captured and displayed on the screen of the mobile device. The mobile device may be configured to capture the stream (e.g., with a camera of the mobile device) or to receive it from another device.

A geometry between each object may be tracked, at 1904. For example, referring to FIG. 20, the mobile device may track the geometry between each selected object 1702-1706. For example, the mobile device may track and measure the first distance between first object 1702 and second object 1704, the second distance between second object 1704 and third object 1706, and the third distance between third object 1706 and first object 1702.

An indication of the geometry may be displayed on the screen, at 1906. For example, referring to FIG. 20, the first indication ($L_{12}$) of the first distance between first object 1702 and second object 1704 may be included in display 1730. The first distance may be determined based on a location of first object 1702 in image 1720 and a location of second object 1704 in image 1720. For example, the mobile device may track the location of first object 1702 and the location of second object 1704 to generate the first indication ($L_{12}$). The second indication ($L_{23}$) of the second distance between second object 1704 and third object 1706 may be also included in display 1730. The second distance may be determined based on a location of second object 1704 in image 1720 and a location of third object 1706 in image 1720. For example, the mobile device may track the location of second object 1704 and the location of third object 1706 to generate the second indication ($L_{23}$). The third indication ($L_{13}$) of the third distance between first object 1702 and third object 1706 may also be included in display 1730. The third distance may be determined based on a location of first object 1702 in image 1720 and a location of third object 1706 in image 1720. For example, the mobile device may track the location of first object 1702 and the location of second object 1704 to generate the third indication ($L_{13}$).

The method 1900 of FIG. 22 may enable the mobile device to track geometries of the objects 1702-1706 in images 1700, 1720, 1740 and cluster frames for retrieval that have substantially similar geometries. The mobile device may perform the method 1900 using a single camera or using multiple cameras. In a further example, the method may include indicating an alarm condition when a specified spatial relation among one or more objects is detected (e.g., by task T200), such as when a distance between a first selected object and a second selected object becomes less than (alternatively, greater than) a specified threshold distance.

Referring to FIG. 23, a flowchart that illustrates particular embodiments of video processing methods 2000, 2010 using object tracking is shown. In an illustrative embodiment, the methods 2000, 2010 may be performed using the electronic device 102 of FIG. 1, the object tracking and detection module 204 implemented by the processor 264 of FIG. 2B, the object tracking and detection module 804 of FIG. 8 implemented by a processor, the smoothing module 961 of FIG. 9 implemented by a processor, or any combination thereof.

The method 2000 includes receiving, at a mobile device, a selection of multiple objects in a scene, at 2002. For example, referring to FIG. 20, the user may touch user selection mechanism 1711 on the screen 1710 and drag the first focus ring 1712 around first object 1702, the second focus ring 1714 around second object 1704, and the third focus ring 1716 around third object 1706 to enable tracking of the first, second, and third objects 1702-1706, respectively. The displayed scene 1700 may correspond to a video stream captured and displayed on the screen of the mobile device. The mobile device may be configured to capture the stream (e.g., with a camera of the mobile device) or to receive it from another device.

A geometry between each object may be tracked, at 2004. For example, referring to FIG. 20, the mobile device may track the geometry between each selected object 1702-1706. For example, the mobile device may track and measure the first distance between first object 1702 and second object 1704, the second distance between second object 1704 and third object 1706, and the third distance between third object 1706 and first object 1702. Additionally, the mobile device may also track the composite geometry of the objects 1702-1706. For example, in the illustrated embodiment, the composite geometry of the objects 1702-1706 may correspond to a triangle may be formed by the three indications ($L_{12}$, $L_{23}$, $L_{13}$).

Frames of the video stream may be clustered based on at least one parameter associated with the geometry, at 2006. For example, referring to FIG. 21, each cluster in the video files may include a group of frames having a substantially similar geometry between selected objects 1706-1708. The clusters depicted in FIG. 21 may be based on a center of mass ($C_{M2}$, $C_{M3}$) between the objects 1706-1708 (e.g., a center of mass of the triangle).

In a particular embodiment, the method 2000 may include retrieving frames when the objects are in a particular geometry. For example, referring to FIG. 21, the mobile device may index frames based on a center of mass ($C_{M2}$, $C_{M3}$) of the objects 1702-1706 in the frames. Frames having a particular center of mass (e.g., a particular geometry) may be readily achieved by selecting a cluster associated with the particular center of mass. For example, the mobile device may retrieve frames where the objects 1702-1706 have a substantially similar geometry as the objects 1702-1706 in the second frame of FIG. 20 by selecting the first cluster (e.g., Cluster 1) on the screen 1800 of FIG. 21. For example, in response to the user selecting the first cluster, the mobile device may retrieve frames whereby the center of mass of the objects 1702-1706 has an x-coordinate at approximately 150 and a y-coordinate at approximately 250.

The method 2010 may include receiving, at a mobile device, an indication of a particular geometry of selected objects in a video stream, at 2012. As a non-limiting example, referring to FIG. 21, the mobile device may receive an indication (e.g., a user touching the screen at the first region (C1) shown in display 1802) to display video streams where the center of mass of the objects 1702-1706 are closest to the center of the mass of the first region (C1).

Frames of the video stream may be retrieved based on the particular geometry, at 2014. For example, referring to FIG. 21, the mobile device may retrieve frames of the video stream in the scene in FIG. 20 where the center of mass of the objects 1702-1706 are in an area corresponding to the first region (C1).

The retrieved frames may be displayed on a screen of the mobile device, at 2016. For example, referring to FIG. 21, the mobile device may display (e.g., play) the frames of the video stream where the center of mass of the objects 1702-1706 are in the area corresponding to the first region (C1). In a particular embodiment, the mobile device may play the video streams in a sequential order.

The methods 2000, 2010 of FIG. 23 may enable the user to retrieve (e.g., locate) particular portions of the video by selecting clusters having a configuration (e.g., a center of mass) associated with the particular portions of the video. Thus, by indexing frames into clusters that are based on geometric parameters of the selected objects 1702-1706 (e.g., producing metadata by task T300 as described herein), the user of the mobile device may readily locate desired portions of a video without having to navigate (e.g., play, fast-forward, rewind, etc.) through the video.

Task T300 may also be implemented to produce metadata, based on the determined reference position, that identifies one among a plurality of separate regions that divide the location space, wherein the plurality of separate regions includes regions of unequal size. As described above, the location space may be a pixel coordinate space of the at least one digital image (e.g., a pixel coordinate space of at least one frame of a video stream) or the physical space (e.g., a ground plane of the scene space), in two or three dimensions, and may extend beyond the space represented in an individual frame. Such metadata may be implemented, for example, as one or more indexes (e.g., into one or more quantization codebooks) that indicate a region of the location space which includes the reference position.

A division scheme may be configured to divide the location space nonuniformly (e.g., to include regions of unequal size and/or shape). For example, a set of observed data points (e.g., object positions) may be used to produce a division scheme that divides the location space such that each separate region contains m observed data points (e.g., division according to frequency of occurrence). Alternatively or additionally, a division scheme may be configured to divide the location space such that areas of the space which are of high interest are divided into more separate regions than areas of low interest.

The various regions indicated by the division scheme may be concentrated according to differing degrees of interest associated with respective areas of the location space. FIG. 19B-D show several examples of a non-uniform division of the location space as applied to a basketball court (e.g., as depicted in FIG. 19A). Such a division scheme may encode a division of the court space into smaller regions close to a particular basket (e.g., as in FIGS. 19B and 19D) or into smaller regions close to either basket (e.g., as in FIG. 19C). It may be possible to indicate an interest-based non-uniform division of the location space a priori (e.g., before the stream is captured), such that method M100 may be performed during capture of the digital image or video stream.

In a similar manner, the various regions indicated by the division scheme may be concentrated according to differences in a frequency of occurrence of the mapped data point (e.g., the position of an object or center of mass of multiple objects) within respective areas of the location space. In such case, the non-uniform division of the location space may be obtained a posteriori (e.g., as a result of training on the captured stream). The division may be implemented such that an equal number of observations are found in each separate region.

In one example, the division scheme is obtained by performing k-means clustering of object positions (e.g., observed object positions) in the location space into k clusters. For example, the division scheme may be obtained by performing k-means clustering of object positions (e.g., positions of one or more of the selected objects) as observed in a plurality of frames of the video stream into k clusters. Such a clustering partitions the location space into Voronoi cells, where the resulting k means are the generators (e.g., centroids) of the cells, and a division scheme obtained in such manner (e.g., using clustering) may also be called a quantization codebook. A cluster may have a different number of observed object positions than another cluster. In order to obtain the initial conditions (i.e., the initial k means), such a division-scheme-generating task may be implemented to perform a hierarchical clustering method (e.g., divisive or agglomerative clustering) on the observed positions. One example of a measure of similarity that may be used to obtain the non-uniform division is the Euclidean distance between the observed object positions in the location space.

One alternative to k-means clustering that may be used by the division-scheme-generating task (e.g., in the presence of outliers) is k-medoids clustering. Another alternative is mean-shift clustering, which may be used to separate modes of the distribution into different regions. Task T300 may include selecting from among multiple division schemes (e.g., multiple codebooks), which may be of different lengths and/or may correspond to regions of different size. For example, task T300 may use a hierarchy of division schemes such that the division scheme of the first level indicates one of the plurality of separate regions and also indicates a division scheme of the second level, among a plurality of such second-level schemes, which corresponds to the indicated region. Such a hierarchy may be used to subdivide one of the plurality of separate regions differently from another. In one such example, the first codebook indexes different quantization regions that correspond to different modes in the distribution of observed positions, and second codebooks are used to divide each of one or more of these modal regions into sub-regions, such that task T300 may produce metadata including more than one codeword for a determined position.

Task T300 may be implemented to map the determined reference position to a corresponding region of the location space by, for example, selecting the region whose centroid is closest to the determined reference position. The measure of similarity used for index selection (e.g., Euclidean distance in the location space) may be the same or different from the measure of similarity used for partitioning. For a case in which the division scheme is described by a quantization codebook, such mapping may include selecting an index into the codebook (e.g., a codeword that indicates the selected region).

Referring to FIG. 24, a particular application of method M100 for generating metadata for an object position using rectangular coordinates is shown. The embodiment in FIG. 24 illustrates a codebook 2102 that may be used to encode determined positions of multiple objects on a frame-by-frame basis. The determined positions may indicate the positions of each object in a location space 2106. Codebook 2102 maps positions in location space 2106 (e.g., 2132, 2134, 2136) to corresponding regions (e.g., 2142, 2144, 2146) in a division 2108 of the location space into separate regions, including regions of unequal size.

The codebook 2102 may be used to produce metadata for multiple frames or other images 2104. Such metadata may be incorporated into the video stream and/or may be streamed separately and/or stored in a separate file. The determined positions may include rectangular coordinate data (e.g., an x-coordinate and a y-coordinate) for objects in a frame. In a particular embodiment, the determined positions may also include three-dimensional coordinate data (e.g., a z-coordinate of a three-dimensional Cartesian coordinate system) for objects in a frame. In the illustrated embodiment, the codebook 2102 may be generated by clustering determined positions for three objects over 10,000 frames (or other images). These determined positions may also have been associated with the corresponding frames as metadata. In a particular embodiment, the first frame may correspond to the first image (e.g., display 1710) of FIG. 20, the second frame may correspond to the second image (e.g., display 1730) of FIG. 20, and the third frame may correspond to the third image (e.g., display 1750) of FIG. 20. Although in this example determined positions for 10,000 frames are used to obtain the codebook 2102, in other embodiments, the codebook 2102 may be based on determined positions for fewer (or additional) frames. Alternatively or additionally, the codebook may be based on an interest-based division scheme as described above (e.g., as shown in FIGS. 19B-D), or another division scheme that is not obtained by clustering a set of observed determined positions. Additionally, the determined positions may include position information for fewer (or additional) objects. The following description of FIG. 24 is based on determined positions corresponding to the third image. However, similar techniques may be applicable to other determined positions.

The determined positions in the third image may include first rectangular coordinate data 2132, second rectangular coordinate data 2134, and third rectangular coordinate data 2136. The first rectangular coordinate data 2132 may include the x-coordinate position of first object 1702 in the third image of FIG. 20 and the y-coordinate position of first object 1702 in the third image. The second rectangular coordinate data 2134 may include the x-coordinate position of second object 1704 in the third image and the y-coordinate position of second object 1704 in the third image. The third rectangular coordinate data 2136 may include the x-coordinate position of third object 1706 in the third image and the y-coordinate position of third object 1706 in the third image.

In another particular embodiment, the x-coordinates and the y-coordinates of each object 1702-1706 in the rectangular coordinate data 2132-2136 may be relative to the center of mass ($C_{M3}$) of the objects 1702-1706 in the third image. For example, the center of mass ($C_{M3}$) may be designated as the origin, and the location (e.g., the x-coordinates and the y-coordinates) of each object 1702-1706 may be relative to the origin. In such case, such in the example of a basketball court as shown in FIG. 19A or other sports field, it may be desirable to quantize the location of such a center of mass of selected objects (e.g., players) according to a nonuniform division scheme, such as those shown in FIGS. 19B-D.

In another particular embodiment, a particular object may be designated as the origin, and the locations (e.g., the x-coordinates and the y-coordinates) of the other objects may be relative to the origin. The particular object (also called "the object of primary interest") may include any of the following examples: the ball (e.g., in a video of a sports event), a selected opponent (e.g., in a sports event), a crime victim (e.g., in a surveillance video), a bride (e.g., in a video of a wedding). The object of primary interest may move over time (e.g., a person), or may be an object having a fixed location in space (e.g., the net, basket, or other goal in a sports video). As a non-limiting example, first object 1702 may be designated as the origin, and the locations of second object 1704 and third object 1706 may be relative to the origin.

A processor may use the codebook 2102 to encode the rectangular coordinate data 2132-2136 to produce metadata according to a division 2108 of the location space into separate regions, including regions of unequal size. To illustrate, the processor may encode (e.g., quantize) the first rectangular coordinate data 2132 into first encoded location data 2142. For example, the processor may map the first rectangular coordinate data 2132 to a corresponding value (e.g., a codeword of the codebook 2102) and encode the first rectangular coordinate data 2132 as the value (e.g., the first encoded location data 2142). Additionally, the processor may encode the second rectangular coordinate data 2134 into second encoded location data 2144. For example, the processor may map the second rectangular coordinate data 2134 to a corresponding value using the codebook 2102 and encode the second rectangular coordinate data 2134 as the value (e.g., the second encoded location data 2144). In a similar manner, the processor may encode the third rectangular coordinate data 2136 into third encoded location data 2146. For example, the processor may map the third rectangular coordinate data 2136 to a corresponding value using the codebook 2102 and encode the third rectangular coordinate data 2136 as the value (e.g., the third encoded location data 2146).

Based on the first encoded location data 2142, the position of the first object 1702 (e.g., Object 1) in the third image of FIG. 20 may be represented in the produced metadata as a corresponding location in the grid 2108 (e.g., the centroid of the indicated region). Based on the second encoded location data 2144, the location of the second object 1704 (e.g., Object 2) in the third image may be represented in the produced metadata as a corresponding location in the grid 2108. Based on the third encoded location data 2146, the location of the third object 1706 (e.g., Object 3) in the third image may be represented in the produced metadata as a corresponding location in the grid 2108.

As noted above, the determined position may be a reference position of a geometrical arrangement or "formation" of multiple selected objects. In addition or in the alternative to using one or more location (or "reference") codebooks, task T300 may be implemented to use one or more formation (or "relative") codebooks, which encode a formation of the selected objects (e.g., their geometrical arrangement, or a shape that describes this arrangement) in space relative to the reference position (e.g., the location of the center of mass of the objects). In a non-limiting example of three selected objects, it may be desirable to store, as a reference position, a location of a center of mass of the selected objects in a 2-D space and to produce metadata indicating, relative to the reference position, a location of each selected object in the 2-D space, for a total of eight degrees of freedom. These values may be quantized as a single codeword (e.g., in 8-D space). Alternatively, these values may be separately quantized as a reference position (e.g., in 2-D space), using one or more location codebooks as described above, and an object formation (e.g., in 6-D space), using one or more formation codebooks (i.e., indexed sets of candidate geometrical arrangements).

Alternatively, an index into a formation or relative codebook may identify one of a set of templates (i.e., candidate geometrical arrangements). In such case, modifications to the indicated template (e.g., scaling, rotation or other orientation, aspect ratio, etc.) may be separately quantized. FIG. 33A shows an example of three templates, and FIG. 33B shows three examples of modifications to the leftmost template in FIG. 33A.

A formation codebook may be configured to divide the formation space (i.e., some portion of the space of all possible formations) nonuniformly according to, for example, differences in frequency of occurrence among the possible formations; differences of interest level among the possible formations (e.g., similarity to a predetermined formation); different degrees of association of the possible formation to a particular predetermined event (e.g., a scoring event) or pattern (e.g., a particular starting formation of a football team); distance of the farthest selected object from the spatial reference; distance of a selected subset of the selected objects from each other; and/or maximum distance between any two of the selected objects.

The codewords (e.g., the encoded location data 2142-2146) may be fixed-width codewords or variable-width codewords. In a particular embodiment, the processor may use variable-width codewords based on a location of an object (e.g., based on whether the object is in a "high density area" or a "low density area"). High density areas may correspond to areas of the images in FIG. 20 that are frequently occupied by at least one of the objects 1702-1706. To reduce a number of bits in the metadata, codewords corresponding to high density areas in the location space 2106 may have fewer bits (i.e., a shorter codeword) than codewords corresponding to low density areas (i.e., less frequently occupied grid locations have longer codewords). Alternatively, or in addition, the non-uniform division scheme 2108 may be a hierarchical scheme that has more sub-regions (i.e., more distinct codewords to provide higher resolution) in high-density regions and fewer sub-regions (i.e., fewer distinct codewords, providing lower resolution) in low-density regions.

If an object is in a high density area, the codeword for the object may represent a relatively small region to generate a more "precise" location of the object. For example, an increased number of codewords may be used to track the location of the objects 1702-1706 in high density areas to obtain a more accurate tracking on a frame-by-frame basis. If an object is in a low density area, the codeword for the object may represent a relatively large region. In a particular embodiment, high density areas and low density areas may be determined based on an analysis of historical data (e.g., analyzing which areas of the screen have a history of being frequently occupied by objects). In another particular embodiment, high density areas and low density areas may be predetermined.

A codeword into a formation codebook may distinguish between unique mappings of the n selected objects to n positions (e.g., may include a unique codeword for each such mapping). For example, FIG. 34A shows examples of four different formations of three selected objects which may each be encoded as a unique codeword (i.e., may be represented by different respective candidate geometrical arrangements). In these examples, each position of a selected object is indicated by an icon (e.g., a circle, square, or triangle) that uniquely identifies that object. Alternatively, a codeword into a formation codebook may encode several different unique mappings. For example, FIG. 34B shows examples of non-unique mappings corresponding to the formations of FIG. 34A, wherein the location of any selected object is indicated by an x. In this case, FIG. 34C shows the six unique formations of the selected objects that may be indicated by the single non-unique mapping (i.e., candidate geometrical arrangement) that is shown leftmost in FIG. 34B.

The codebook 2102 may be a fixed codebook or an adaptive codebook. An adaptive codebook may adjust the length of codewords based on historical data representative of object locations (e.g., may generate variable-width codewords). For example, an adaptive codebook may generate shorter codewords for objects in a frequently occupied area of the screen and may generate longer codewords for objects in a less frequently occupied area of the screen based on the historical data. In contrast, a fixed codebook may not change based on historical data, and may used fixed-width codewords or variable-width codewords.

It may be desirable to encode the formation data using multiple formation codebooks that exploit differences in frequencies of occurrence or interest levels among the possible formations relative to respective reference positions. For example, one among a set of formation codebooks of varying size may be selected depending on a codeword of the reference position (e.g., a smaller codebook when the reference position is at center court vs. a larger codebook when the reference position is near a goal).

The embodiment of FIG. 24 may enable the user to retrieve (e.g., locate) particular images, such as particular portions of video, based on metadata produced by task T300 using the codebook 2102. For example, the location space 2106 may be displayed on a screen as a user-interactive grid that enables the user to select different locations (e.g., parameters) for different objects. Based on the selection, the user of the mobile device may readily locate desired portions (e.g., frames) of a video having similar object location configurations without having to navigate (e.g., play, fast-forward, rewind, etc.) through the video. For example, method M100 may be implemented to include a task that retrieves one or more images (e.g., from storage) based on a result of comparing the produced metadata to a search request that specifies one of the regions in the division scheme. In a particular embodiment, such a display of the location space 2106 may be used in a substantially similar manner as the screen 1802 of clusters in FIG. 21. Additionally, the produced metadata 2142-2146 may be compressed and transmitted from an encoder to a decoder. Compressing and transmitting the metadata 2142-2146 to the decoder may enable the decoder to determine the position of the tracked objects using a relatively low amount of data (e.g., the quantized values). For example, the decoder may perform rendering operations to decode the video associated with the objects 1702-1706 based on the quantized values in the codebook 2102.

In one example, the retrieved frames include a selected formation among selected players that occurs only during a particular play or set of plays, or a particular starting formation, in a football game or other sporting event. In another example, the retrieved frames include a selected formation among particular racing cars in proximity on a lap track. Video analysis driven by such selective retrieval may also be used to detect correlation of an event (which may be previously unidentified) with the occurrence of a particular formation. For example, potential applications include tracking people within an assembly (e.g., a legislative session, a street demonstration, a social gathering) and correlating proximities of selected people with specified events (e.g., to identify decisionmakers, troublemakers, catalysts).

Implementations of method M100 as described herein may also be applied to analysis of social interaction among animals in captivity (e.g., in a laboratory or zoo) or in the wild.

Referring to FIG. 25, another particular application of method M100 for generating metadata for an object position using polar coordinates is shown. The embodiment in FIG. 25 illustrates a codebook 2202 that may be used to encode determined positions of multiple objects on a frame-by-frame basis. The determined positions may indicate the positions of each object in a polar location space 2206. Codebook 2202 maps positions in location space 2206 (e.g., 2232, 2234, 2236) to corresponding regions (e.g., 2242, 2244, 2246) in a division 2208 of the location space 2206 into separate regions, including regions of unequal size.

The codebook 2202 may be used to produce metadata for multiple frames or other images 2204. Such metadata may be incorporated into the video stream and/or may be streamed separately and/or stored in a separate file. The determined positions may include polar coordinate data for objects in a frame. In a particular embodiment, the determined positions may also include spherical or cylindrical coordinate data (e.g., 3D coordinate data) for objects in a frame. In the illustrated embodiment, the codebook 2102 may be generated by clustering determined positions for three objects over 10,000 frames (or other images). These determined positions may also have been associated with the corresponding frames as metadata. In a particular embodiment, the first frame may correspond to the first image (e.g., display 1710) of FIG. 20, the second frame may correspond to the second image (e.g., display 1730) of FIG. 20, and the third frame may correspond to the third image (e.g., display 1750) of FIG. 20. Although in this example determined positions for 10,000 frames are used to obtain the codebook 2202, in other embodiments, the codebook 2202 may be based on determined positions for fewer (or additional) frames. Alternatively or additionally, the codebook may be based on an interest-based division scheme as described above (e.g., as shown in FIGS. 19B-D), or another division scheme that is not obtained by clustering a set of observed determined positions. Additionally, the determined positions may include position information for fewer (or additional) objects. The following description of FIG. 25 is based on determined positions corresponding to the third image. However, similar techniques may be applicable to other determined positions.

The determined positions in the third image may include polar orientation data 2230, first polar coordinate data 2232, second polar coordinate data 2234, and third polar coordinate data 2236. The polar orientation data 2230 may indicate position of the center of mass ($C_{M3}$) (e.g., the x-coordinate (Cx) of the center of mass ($C_{M3}$) in the third image of FIG. 20 and the y-coordinate (Cy) of the center of mass ($C_{M3}$) in the third image). The polar orientation data 2230 may also indicate a radius (R) of a circle having the center of mass ($C_{M3}$) as the center. The radius (R), which may be implemented as a scale factor, may be large enough to encompass each tracked object. An illustrative example is depicted with respect to the polar location space 2206. In one example, task T300 is implemented to encode the orientation position (e.g., the position of the center of mass) as metadata indicating one of a plurality of regions, including regions of unequal size, that divide the corresponding location space within which the orientation position is indicated, which may differ from location space 2206 (e.g., a rectangular coordinate space as shown in FIG. 24).

The first polar coordinate data 2232 may indicate first polar coordinates of first object 1702 (Object 1). The first polar coordinates may include a first distance (a) of first object 1702 from the center of mass ($C_{M3}$) and a first angle ($\theta a$) of the first object 1702 measured from a zero-degree reference (e.g., an angular displacement from the horizontal). The second polar coordinate data 2234 may indicate second polar coordinates of second object 1704 (Object 2). The second polar coordinates may include a second distance (b) of second object 1704 from the center of mass ($C_{M3}$) and a second angle ($\theta b$) of second object 1704 measured from the horizontal. The third polar coordinate data 2236 may indicate third polar coordinates of third object 1706 (Object 3). The third polar coordinates may include a third distance (c) of third object 1706 from the center of mass ($C_{M3}$) and a third angle ($\theta c$) of third object 1706 measured from the horizontal.

In a particular embodiment, the radius (R) of the polar orientation data 2230 may be normalized based on the distance of the object that is farthest away from the center of mass ($C_{M3}$). For example, radius (R) may be equal to the first distance (a) if the first distance (a) is greater than the second distance (b) and the third distance (c).

A processor may use the codebook 2202 to encode the polar coordinate data 2232-2236 to produce metadata according to a division 2208 of the location space into regions, including regions of unequal size. To illustrate, the processor may encode (e.g., quantize) the first polar coordinate data 2232 into first encoded location data 2242. For example, the processor may map the first polar coordinate data 2232 (that is based on the polar orientation data 2230) to a corresponding value (e.g., a codeword of the codebook 2202) and encode the first polar coordinate data 2232 as the value (e.g., the first encoded location data 2242). Additionally, the processor may encode the second polar coordinate data 2234 into second encoded location data 2244. For example, the processor may map the second polar coordinate data 2234 (that is based on the polar orientation data 2230) to a corresponding value using the codebook 2202 and encode the second polar coordinate data 2234 as the value (e.g., the second encoded location data 2244). In a similar manner, the processor may encode the third polar coordinate data 2236 into third encoded location data 2246. For example, the processor may map the third polar coordinate data 2236 to a corresponding value using the codebook 2202 and encode the third polar coordinate data 2236 as the value (e.g., the third encoded location data 2246).

Based on the first encoded location data 2242, the position of the first object 1702 (e.g., Object 1) in the third image of FIG. 20 may be represented in the produced metadata as a corresponding location in the polar grid 2208 (e.g., the centroid of the indicated region). Based on the second encoded location data 2244, the location of the second object 1704 (e.g., Object 2) in the third image may be represented in the produced metadata as a corresponding location in the polar grid 2208. Based on the third encoded location data 2246, the location of the third object 1706 (e.g., Object 3) in the third image may be represented in the produced metadata as a corresponding location in the polar grid 2208. For example, the polar grid 2208 may be divided into regions, including regions of unequal size, based on ranges of radial distance from the grid origin (e.g., based on ranges of radial distance from the center of mass ($C_{M3}$)) and ranges of angular displacement from the zero-degree reference.

The embodiment of FIG. 25 may enable the user to retrieve (e.g., locate) particular images (e.g., frames of video) based on metadata produced by task T300 using the codebook 2202. For example, the polar location space 2206 may be displayed on a screen as a user-interactive grid that enables the user to select different locations (e.g., parameters) for different objects. Based on the selection, the user of the mobile device may readily locate desired portions (e.g., frames) of a video having similar objection location configurations without having to navigate (e.g., play, fast-forward, rewind, etc.) through the video. For example, method M100 may be implemented to include a task that retrieves one or more images (e.g., from storage) based on a result of comparing the produced metadata to a search request that specifies one of the regions in the division scheme. In a particular embodiment, such a display of the polar location space 2206 may be used in a substantially similar manner as the screen 1802 of clusters in FIG. 21. Additionally, the produced metadata 2242-2246 may be compressed and transmitted from an encoder to a decoder. Compressing and transmitting the produced metadata 2242-2246 to the decoder may enable the decoder to determine the position of the tracked objects using a relatively low amount of data (e.g., the quantized values). For example, the decoder may perform rendering operations to decode the video associated with the objects 1702-1706 based on the quantized values in the codebook 2202.

The codewords (e.g., the encoded location data 2242-2246) may be fixed-width codewords or variable-width codewords. In a particular embodiment, the processor may use variable-width codewords based on a location of an object (e.g., based on whether the object is in a "high density area" or a "low density area"). High density areas may correspond to areas of the images in FIG. 20 that are frequently occupied by at least one of the objects 1702-1706. To reduce a number of bits in the metadata, codewords corresponding to high density areas in the polar location space 2206 may have fewer bits (i.e., a shorter codeword) than codewords corresponding to low density areas (i.e., less frequently occupied grid locations have longer codewords). Alternatively, or in addition, the non-uniform division scheme 2208 may be a hierarchical scheme that has more sub-regions (i.e., more distinct codewords to provide higher resolution) in high-density regions and fewer sub-regions (i.e., fewer distinct codewords, providing lower resolution) in low-density regions.

If an object is in a high density area, the codeword for the object may represent a relatively small region to generate a more "precise" location of the object. For example, an increased number of codewords may be used to track the location of the objects 1702-1706 in high density areas to obtain a more accurate tracking on a frame-by-frame basis. If an object is in a low density area, the codeword for the object may represent a relatively large region. In a particular embodiment, high density areas and low density areas may be determined based on an analysis of historical data (e.g., analyzing which areas of the screen have a history of being frequently occupied by objects). In another particular embodiment, high density areas and low density areas may be predetermined.

The codebook 2202 may be a fixed codebook or an adaptive codebook. An adaptive codebook may adjust the length of codewords based on historical data representative of object locations (e.g., may generate variable-width codewords). For example, an adaptive codebook may generate shorter codewords for objects in a frequently occupied area of the screen and may generate longer codewords for objects in a less frequently occupied area of the screen based on the historical data. In contrast, a fixed codebook may not change based on historical data, and may used fixed-width codewords or variable-width codewords.

Referring to FIG. 26, a flowchart that illustrates a particular embodiment of a video processing method 2300 using object tracking is shown. In an illustrative embodiment, the method 2300 may be performed using the electronic device 102 of FIG. 1, the object tracking and detection module 204 implemented by the processor 264 of FIG. 2B, the object tracking and detection module 804 of FIG. 8 implemented by a processor, the smoothing module 961 of FIG. 9 implemented by a processor, or any combination thereof.

The method 2300 may include tracking, at a mobile device, a first location of a first object in a particular frame and a second location of a second object in the particular frame, at 2302. For example, referring to FIG. 20, the first location of first object 1702 may be tracked in the third frame and the second location of second object 1704 may be tracked in the third frame. Additionally, the third location of third object 1706 may be tracked in the third frame.

First coordinate data associated with the first location may be generated and second coordinate data associated with the second location may be generated, at 2304. For example, referring to FIG. 24, the processor may generate the first rectangular coordinate data 2132 associated with the position of the first object 1702 in the third frame and the second rectangular coordinate data 2134 associated with the position of the second object 1704 in the third frame. Additionally, the processor may generate the third rectangular coordinate data 2136 associated with the position of the third object 1706 in the third frame.

As another example, referring to FIG. 25, the processor may generate the first polar coordinate data 2232 associated with the position of the first object 1702 in the third frame and the second polar coordinate data 2234 associated with the position of the second object 1704 in the third frame. Additionally, the processor may generate the third polar coordinate data 2236 associated with the position of the third object 1706 in the third frame.

The first coordinate data and the second coordinate data may be encoded using a codebook to produce metadata as first encoded location data and second encoded location data, at 2306. For example, referring to FIG. 24, the processor may use the codebook 2102 to encode the first rectangular coordinate data 2132 to generate the first encoded location data 2142 (e.g., a codeword of the codebook 2102), and the processor may use the codebook 2102 to encode the second rectangular coordinate data 2134 to generate the second encoded location data 2144. Additionally, the processor may use the codebook 2102 to encode the third rectangular coordinate data 2136 to generate the third encoded location data 2146.

As another example, referring to FIG. 25, the processor may use the codebook 2202 to encode the first polar coordinate data 2232 to produce metadata as the first encoded location data 2242 (e.g., a codeword of the codebook 2202), and the processor may use the codebook 2202 to encode the second polar coordinate data 2234 to produce metadata as the second encoded location data 2244. Additionally, the processor may use the codebook 2202 to encode the third polar coordinate data 2236 to produce metadata as the third encoded location data 2246.

The metadata (e.g., first encoded location data and the second encoded location data) may be stored to enable retrieval of the particular frame based on input parameters, at 2308. For example, referring to FIG. 24, the processor may store the first encoded location data 2142 and the second encoded location data 2144 in memory. A user of the mobile device may input parameters (e.g., a desired location of the first object 1702 and the second object 1704). Based on the input parameters, the mobile device may retrieve the third frame for playback in response to the input parameters corresponding to the first location and the second location.

As another example, referring to FIG. 25, the processor may store the first encoded location data 2242 and the second encoded location data 2244 in memory. A user of the mobile device may input parameters (e.g., a desired location of the first object 1702 and the second object 1704). Based on the input parameters, the mobile device may retrieve the third frame for playback in response to the input parameters corresponding to the first location and the second location.

In a particular embodiment, the method 2300 may also include tracking a first density of a first area of a scene over a plurality of frames. The first density may be based on a number of times first object 1702 or second object 1704 is in the first area. The method 2300 may also include tracking a second density of a second area of the scene over the plurality of frames. The second density may be based on a number of times first object 1702 or second object 1704 is in the second area. The method 2300 may further include comparing the first density to the second density and allocating a first amount of metadata in the codebook 2102 to the first area and a second amount of metadata in the codebook 2102 to the second area if the first density is greater than the second density. The first amount of metadata may be greater than the second amount of metadata. For example, a larger number of codewords in the codebook 2102 may correspond to the first area (e.g., a higher resolution area) and a smaller number of codewords may correspond to the second area (e.g., a lower resolution area) to reduce number of codewords for less dense areas.

The method 2300 of FIG. 26 may enable the user to retrieve (e.g., locate) particular portions (frames) of video encoded using the codebook 2102. For example, the grid 2108 may be a user-interactive grid displayed on a screen that enables the user to select different locations (e.g., parameters) for different objects. Based on the selection, the user of the mobile device may readily locate desired portions of a video having similar objection location configurations without having to navigate (e.g., play, fast-forward, rewind, etc.) through the video.

Referring to FIG. 27, a flowchart that illustrates a particular embodiment of a video processing method 2600 using object tracking is shown. In an illustrative embodiment, the method 2600 may be performed using a robot.

The method 2600 may include, tracking, at a robot, the geometry between multiple objects, at 2602. For example, a user may communicate to the robot particular objects to be tracked. In a particular embodiment, the robot may include a display interface and the user may communicate to the robot via interactions with the display interface. As another example, the robot may independently determine what objects are to be tracked based on environmental factors. For example, the robot may include a sensor to detect motion. Based on the detected motion, the robot may select to track objects associated with the motion.

A processing function may be performed based on the geometry, at 2604. For example, the robot may determine relationships between the objects based on the geometry. As another example, the robot may determine a setting (e.g., a scene) based on the geometry of the objects.

Referring to FIG. 28, a particular embodiment depicting video processing using object tracking is shown. The video processing techniques described with respect to the embodiment depicted in FIG. 28 may be performed by the electronic device 102 of FIG. 1, the object tracking and detection module 204 implemented by the processor 264 of FIG. 2B, the object tracking and detection module 804 of FIG. 8 implemented by a processor, the smoothing module 961 of FIG. 9 implemented by a processor, or any combination thereof.

FIG. 28 shows an image 2700 that depicts a scene as captured at a first time instance. For example, image 2700 may correspond to a frame of a video stream to be displayed on a screen of a mobile device. The mobile device may be configured to capture the stream (e.g., with a camera of the mobile device) or to receive it from another device. The scene depicted in frame 2700 includes a first object 2702, a second object 2704, a third object 2706, a star, and a tree. In the illustrated embodiment, first object 2702 may correspond to a first person, second object 2704 may correspond to a second person, and third object 2706 may correspond to a third person. In another embodiment, at least one of the objects 2702-2706 may correspond to a robot that is controlled via the mobile device.

FIG. 28 also shows a display 2710 of frame 2700 on a screen of the mobile device. The screen of the mobile device (e.g., a touchscreen) may correspond to a viewfinder. Display 2710 may include a user selection mechanism 2711 that enables a user to select objects for tracking (e.g., by task T200). For example, the user may touch user selection mechanism 2711 on the screen 2710 and drag a first focus ring 2712 around first object 2702 to enable tracking of the first object 2702. In response to such placement of first focus ring 2712, the mobile device may select first object 2712 for tracking. In a similar manner, the user may also touch user selection mechanism 2711 on the screen and drag a second focus ring 2714 and a third focus ring 2716 around second object 2704 and third object 2706 to enable tracking of second object 2704 and third object 2706, respectively. In response to such placement of second focus ring 2714 and third focus ring 2716, the mobile device may select second object 2704 and third object 2706, respectively, for tracking.

FIG. 28 also shows an image (e.g., frame) 2720 that depicts the scene as captured at a second time instance. In image 2720, the position of each object 2702-2706 has changed with respect to the corresponding positions depicted in image 2700 depicting the scene at the first time instance. For example, first object 2702 has moved closer to the star, second object 2704 has moved closer to the tree, and third object 2706 has moved closer to the bottom of the image.

FIG. 28 also shows a display 2730 of image 2720 on a screen of the mobile device. Display 2730 may be partitioned (e.g., by display task T50) into a first window 2732, a second window 2734, a third window 2736, and a fourth window 2738. In response to selecting the three objects 2702-2706 with user selection mechanism 2711, for example, the mobile device may partition the screen 2730 into three corresponding windows 2732-2736 and the fourth window 2738.

The first window 2732 may display a first portion of image 2720 that includes first object 2702. The first portion of image 2720 may be determined based on a location of first object 2702 in image 2720. For example, the mobile device may track the location of first object 2702 and a video stream focused on the location of first object 2702 may be displayed in the first window 2732. The second window 2734 may display a second portion of image 2720 that includes second object 2704. The second portion of image 2720 may be determined based on a location of second object 2704 in image 2720. For example, the mobile device may track the location of second object 2704 and a video stream focused on the location of second object 2704 may be displayed in the second window 2734. The third window 2736 may display a third portion of image 2720 that includes third object 2706. The third portion of image 2720 may be determined based on a location of third object 2706 in image 2720. For example, the mobile device may track the location of third object 2704 and a video stream focused on the location of third object 2706 may be displayed in the third window 2736.

The fourth window 2738 may display an indication of a geometry (e.g., a center of mass ($C_{M2}$)) between each object 2702-2706. For example, the fourth window 2738 may include a grid that includes multiple sections (represented as grayscale lines) that correspond to areas in image 2720. For example, the bottom left section of the grid may correspond to the bottom left section of image 2720. In a similar manner as described with respect to FIGS. 21 and 22, the mobile device may determine the center of mass ($C_{M2}$) of the objects in image 2720. The center of mass ($C_{M2}$) may be displayed at a corresponding section of the grid.

FIG. 28 also shows an image 2740 that depicts the scene as captured at a third time instance (e.g., subsequent to the second time instance). In image 2740, the position of each object 2702-2706 has changed with respect to the corresponding positions in image 2720 depicting the scene at the second time instance. For example, first object 2702 has moved closer to the tree, second object 2704 has moved closer to the bottom of the scene 2740, and third object 2706 has moved closer to the star.

FIG. 28 also shows a display 2750 of image 2740 on the screen of the mobile device using the windows 2732-2736 generated by the mobile device. For example, the first window 2732 displays the first portion of image 2740 that includes first object 2702, the second window 2734 displays the second portion of image 2740 that includes second object 2704, and the third window 2736 displays the third portion of image 2740 that includes third object 2706.

The fourth widow 2738 may update the indication (e.g., the center of mass ($C_{M2}$)) to reflect image 2740 at the third time instance. The mobile device may track the geometry on a frame-by-frame basis, or at non-consecutive time intervals, and display an indication of the updated geometry in the fourth window 2738. For example, at the third frame, the fourth window 2738 may display the center of mass ($C_{M3}$) of the objects 2702-2706 in image 2740 at the third time instance. The fourth window 2738 may also display a path (e.g., the dotted lines) that tracks the center of mass of the objects (e.g., as indicated by task T200) between the second frame and the third frame.

The embodiment depicted in FIG. 28 may enable the mobile device to track objects 2702-2706 in frames 2700, 2720, 2740 and may display individualized (e.g., focused) video streams corresponding to the objects 2702-2706 in separate windows 2732-2736. The embodiment also enables the user to view the geometry of the objects 2702-2706 in the fourth window 2738. The mobile device may perform the techniques described with respect to FIG. 28 using a single camera or using multiple cameras.

Referring to FIG. 29, a flowchart that illustrates a particular embodiment of a video processing method 2800 using object tracking is shown. In an illustrative embodiment, the method 2800 may be performed using the electronic device 102 of FIG. 1, the object tracking and detection module 204 implemented by the processor 264 of FIG. 2B, the object tracking and detection module 804 of FIG. 8 implemented by a processor, the smoothing module 961 of FIG. 9 implemented by a processor, or any combination thereof.

The method 2800 includes receiving, at a mobile device, a selection of a first object in a scene, a second object in the scene, and a third object in the scene, at 2802. For example, referring to FIG. 28, the user may touch the user selection mechanism 2711 on the screen 2710 and drag the first focus ring 2712 around first object 2702, the second focus ring 2714 around second object 2704, and the third focus ring 2716 around third object 2706 to enable tracking of the first, second, and third objects 2702-2706, respectively. The displayed scene may correspond to a video stream captured and displayed on the screen of the mobile device.

The display may be partitioned into at a first window, a second window, a third window, and a fourth window, at 2804. For example, referring to FIG. 28, display 2730 may be partitioned into the first window 2732, the second window 2734, the third window 2736, and the fourth window.

A first portion of the displayed scene that includes the first object may be displayed in the first window, at 2806. For example, referring to FIG. 28, the first window 2732 may display the first portion of image 2720 that includes first object 2702. The first portion of image 2720 may be determined based on a location of first object 2702 in image 2720. For example, the mobile device may track the location of first object 2702 and a video stream focused on the location of first object 2702 may be displayed in the first window 2732.

A second portion of the displayed scene that includes the second object may be displayed in the second window, at 2808. For example, referring to FIG. 28, the second window 2734 may display the second portion of image 2720 that includes second object 2704. The second portion of image 2720 may be determined based on a location of second object 2704 in image 2720. For example, the mobile device may track the location of second object 2704 and a video stream focused on the location of second object 2704 may be displayed in the second window 2734.

A third portion of the displayed scene that includes the third object may be displayed in the third window, at 2810. For example, referring to FIG. 28, the third window 2736 may display the third portion of image 2720 that includes third object 2706. The third portion of image 2720 may be determined based on a location of third object 2706 in image 2720. For example, the mobile device may track the location of third object 2706 and a video stream focused on the location of third object 2706 may be displayed in the third window 2736.

An indication of a geometry between each object may be displayed in the fourth window, at 2812. For example, referring to FIG. 28, the fourth window 2738 may display the center of mass ($C_{M2}$) between each object 2702-2706. The fourth widow 2738 may update the center of mass ($C_{M2}$) to reflect the scene at the third time instance. For example, at the third frame, the fourth window 2738 may display the center of mass ($C_{M3}$) of the objects 2702-2706 in image 2740 at the third time instance. The fourth window 2738 may also display a path (e.g., the dotted lines) that tracks the center of mass of the objects between the second frame and the third frame.

The method 2800 of FIG. 29 may enable the mobile device to track objects 2702-2706 in the scene 2700, 2720, 2740 and to display individualized (e.g., focused) video streams corresponding to the objects 2702-2706 in separate windows 2732-2736. The method 2800 also enables the user to view the geometry of the objects 2702-2706 in the fourth window 2738. The mobile device may perform the method 2800 using a single camera or using multiple cameras.

Referring to FIG. 42, a particular embodiment depicting video processing using object tracking is shown. The video processing techniques described with respect to the embodiment depicted in FIG. 42 may be performed by the electronic device 102 of FIG. 1, the object tracking and detection module 204 implemented by the processor 264 of FIG. 2B, the object tracking and detection module 804 of FIG. 8 implemented by a processor, the smoothing module 961 of FIG. 9 implemented by a processor, or any combination thereof.

FIG. 42 shows a digital image 1100 that depicts a scene at a first time instance. For example, image 1100 may correspond to a video stream captured and displayed on a screen of a mobile device. The mobile device may be configured to capture the stream (e.g., with a camera of the mobile device) or to receive it from another device. The scene depicted in image 1100 may include a first region of interest (ROI) 1102, a second ROI 1104, and a third ROI 1106. Each ROI 1102-1106 may correspond to regions within the scene that include one or more objects that are tracked according to the techniques described herein (e.g., with reference to FIGS. 1-10, object tracking and detection modules 204 and 804, and/or task T200).

To illustrate, the first ROI 1102 may include a first group of tracked objects (e.g., a first tracked object 1110 and a third tracked object 1114). Additionally, the second ROI 1104 may include a second group of tracked objects (e.g., a fourth tracked object 1120, a fifth tracked object 1122, and a sixth tracked object 1124), and the third ROI 1106 may include a third group of tracked objects (e.g., a seventh tracked object 1130, an eighth tracked object 1132, and a ninth tracked object 1134). A second tracked object 1112 may be located outside the ROIs 1102-1104.

Metadata may be generated (e.g., by task T300) to identify a location of each tracked object 1110-1114, 1120-1124, 1130-1134 in the scene 1100. In a particular embodiment, the metadata corresponds to rectangular coordinate data. For example, the first metadata may be generated to identify a location (e.g., an x-coordinate location and a y-coordinate location) of the first tracked object 1110, second metadata may be generated to identify a location of the second tracked object 1112, etc. In other embodiments, the metadata may correspond to polar coordinate data, spherical coordinate data, cylindrical coordinate data, or three-dimensional Cartesian coordinate data.

Each ROI 1102-1106 may be defined by a center of mass of the tracked objects in the ROI 1102-1106. For example, the first ROI 1102 may be defined by a first center of mass ($C_{M1}$) between the first tracked object 1110 and the third tracked object 1114. The second ROI 1104 may be defined by a second center of mass ($C_{M2}$) between the fourth tracked object 1120, the fifth tracked object 1122, and the sixth tracked object 1124. The third ROI 1106 may be defined by a third center of mass ($C_{M3}$) between the seventh tracked object 1130, the eighth tracked object 1132, and the ninth tracked object 1134.

As described in greater detail with respect to FIG. 43, a codebook may be used to encode the metadata for the location of each tracked object 1110-1114, 1120-1124, 1130-1134 in the scene 1100. Metadata for tracked objects located inside one of the ROIs 1102-1106 may be encoded at a higher bit rate than metadata for tracked objects located outside of the ROIs 1102-1106 (e.g., the second tracked object 1112). Encoding metadata for tracked objects located inside one of the ROIs 1102-1106 at a higher bit rate may enable locations of the tracked objects in the ROIs 1102-1106 to be encoded at a higher level of accuracy than the location of the other tracked objects.

Referring to FIG. 43, a particular embodiment of encoding metadata for an object location is shown. The embodiment in FIG. 43 illustrates a codebook 1202 that may be used to encode metadata for the location of multiple objects on a frame-by-frame basis. The metadata may be used to indicate the locations of each object in a grid.

The codebook 1202 may be used to encode metadata for multiple frames 1204. The metadata may include rectangular coordinate data (e.g., an x-coordinate and a y-coordinate) for objects in a frame, polar coordinates for object in a frame, spherical coordinates for objects in a frame, cylindrical coordinates for objects in a frame, or three-dimensional Cartesian coordinates for objects in a frame. In the illustrated embodiment, the codebook 1202 may encode metadata for three objects over 10,000 frames. In a particular embodiment, the third frame may correspond to the first frame (e.g., scene 1100) of FIG. 43. Although metadata for 10,000 frames is depicted in the codebook 1202, in other embodiments, the codebook 1202 may encode metadata for fewer (or additional) frames. Additionally, the metadata may include location information for fewer (or additional) objects. The following description of FIG. 43 is based on metadata corresponding to the third frame. However, similar techniques may be applicable to other metadata.

The metadata in the third frame may include first coordinate data 1232, second coordinate data 1234, third coordinate data 1236, fourth coordinate data 1237, . . . , and ninth coordinate data 1238. The first coordinate data 1232 may include the coordinate position of the first tracked object 1110 in image 1100 of FIG. 42, the second coordinate data 1234 may include the coordinate position of the second tracked object 1112 in image 1100, the third coordinate data 1236 may include the coordinate position of the third tracked object 1114 in image 1100, the fourth coordinate data 1237 may include the coordinate position of the fourth tracked object 1120 in image 1100, etc.

A processor may use the codebook 1202 to encode the coordinate data 1232-1236. To illustrate, the processor may encode (e.g., quantize) the first coordinate data 1232 into first encoded location data 1242 using a first bit rate (e.g., a relatively high bit rate). For example, the processor may map the first coordinate data 1232 to a corresponding value (e.g., a codeword of the codebook 1202) and may encode the first coordinate data 1232 as the value (e.g., the first encoded location data 1242). The processor may use the first bit rate because the first tracked object 1110 is inside an ROI (e.g., the first ROI 1102 of FIG. 42).

Additionally, the processor may encode the second coordinate data 1234 into second encoded location data 1244 using a second bit rate that is lower than the first bit rate. For example, the processor may map the second coordinate data 1234 to a corresponding value using the codebook 1202 and may encode the second coordinate data 1234 as the value (e.g., the second encoded location data 1244). The processor may use the second bit rate because the second tracked object 1112 is outside each of the ROIs 1102-1106 of FIG. 42.

The processor may encode the third coordinate data 1236 into third encoded location data 1246 using a third bit rate that is greater than the second bit rate. For example, the processor may map the third coordinate data 1236 to a corresponding value using the codebook 1202 and encode the third rectangular coordinate data 1236 as the value (e.g., the third encoded location data 1246). The processor may use the third bit rate because the third tracked object 1114 is inside an ROI (e.g., the first ROI 1102 of FIG. 42). In a particular embodiment, the third bit rate may be equal to, or substantially equal to, the first bit rate.

The processor may encode the fourth coordinate data 1237 into fourth encoded location data 1247 using a fourth bit rate that is greater than the second bit rate. For example, the processor may map the fourth coordinate data 1237 to a corresponding value using the codebook 1202 and may encode the fourth coordinate data 1237 as the value (e.g., the fourth encoded location data 1247). The processor may use the fourth bit rate because the fourth tracked object 1120 is inside an ROI (e.g., the second ROI 1104 of FIG. 42). In a particular embodiment, the fourth bit rate may be substantially equal to the first bit rate.

The processor may encode the ninth coordinate data 1238 into ninth encoded location data 1248 using a ninth bit rate that is greater than the second bit rate. For example, the processor may map the ninth coordinate data 1238 to a corresponding value using the codebook 1202 and may encode the ninth coordinate data 1238 as the value (e.g., the ninth encoded location data 1248). The processor may use the ninth bit rate because the ninth tracked object 1134 is inside an ROI (e.g., the third ROI 1106 of FIG. 42). In a particular embodiment, the ninth bit rate may be substantially equal to the first bit rate.

Similar encoding techniques may be performed for coordinate data of the other tracked objects in FIG. 42. The metadata (e.g., the coordinate data) for tracked objects located inside one of the ROIs 1102-1106 may be encoded at a higher bit rate than metadata for tracked objects located outside of the ROIs 1102-1106 (e.g., the second tracked object 1112). Encoding metadata for tracked objects located inside one of the ROIs 1102-1106 at a higher bit rate may enable the locations of the tracked objects to be encoded at a relatively high level of precision.

The embodiment of FIG. 43 may enable the user to retrieve (e.g., locate) particular portions of video based on data encoded using the codebook 1202. For example, the location space may be displayed on a screen as a user-interactive grid that enables the user to select different locations (e.g., parameters) for different objects. Based on the selection, the user of the mobile device may readily locate desired portions (e.g., frames) of a video having similar object location configurations without having to navigate (e.g., play, fast-forward, rewind, etc.) through the video. Additionally, the encoded location data 1242-1248 may be compressed and transmitted from an encoder to a decoder. Compressing and transmitting the encoded location data 1242-1248 to the decoder may enable the decoder to determine the position of the tracked objects using a relatively low amount of data (e.g., the quantized values).

Referring to FIG. 44, a flowchart that illustrates a particular embodiment of a video processing method 1300 using object tracking is shown. In an illustrative embodiment, the method 1300 may be performed using the electronic device 102 of FIG. 1, the object tracking and detection module 204 implemented by the processor 264 of FIG. 2B, the object tracking and detection module 804 of FIG. 8 implemented by a processor, the smoothing module 961 of FIG. 9 implemented by a processor, the codebook 1202 of FIG. 43, or any combination thereof.

The method 1300 may include tracking (e.g., by task T200), at a mobile device, a first location of a first object located in a region of interest of a particular frame, at 1302. For example, referring to FIG. 42, the first location of the first tracked object 1110 may be tracked. A second location of a second object that is not located in the region of interest of the particular frame may be tracked, at 1304. For example, referring to FIG. 42, the second location of the second tracked object 1112 may be tracked.

First coordinate data associated with the first location and second coordinate data associated with the second location may be generated, at 1306. For example, referring to FIG. 43, the processor may generate the first coordinate data 1232 associated with the position of the first tracked object 1110 in the scene 1100 and the second coordinate data 1234 associated with the position of the second tracked object 1112 in the scene 1100.

The first coordinate data and the second coordinate data may be encoded (e.g., by task T300) using a codebook to generate first encoded location data and second encoded location data, at 1308. For example, referring to FIG. 43, the processor may use the codebook 1202 to encode the first coordinate data 1232 to generate the first encoded location data 1242 (e.g., a codeword of the codebook 1202), and the processor may use the codebook 1202 to encode the second coordinate data 1234 to generate the second encoded location data 1244. The first coordinate data 1232 may be encoded at the first bit rate (e.g., a high bit rate) and the second coordinate data 1234 may be encoded at the second bit rate (e.g., a low bit rate). The processor may use the first bit rate to encode the first coordinate data 1232 because the first tracked object 1110 is inside an ROI (e.g., the first ROI 1102 of FIG. 42). The processor may use the second bit rate to encode the second coordinate data 1234 because the second tracked object 1112 is outside each of the ROIs 1102-1106 of FIG. 42.

The first encoded location data and the second encoded location data may be stored to enable retrieval of the particular frame based on input parameters, at 1310. For example, referring to FIG. 43, the processor may store the first encoded location data 1242 and the second encoded location data 1244 in memory. A user of the mobile device may input parameters (e.g., a desired location of the first tracked object 1110 and the second tracked object 1112). Based on the input parameters, the mobile device may retrieve the third frame for playback in response to the input parameters corresponding to the first location and the second location.

In a particular embodiment, the method 1300 may include tracking a third location of a third object located in the region of interest of the particular frame. For example, the third location of the third tracked object 1114 may be tracked. Third coordinate data associated with the third location may be generated. The third coordinate data may be encoded using a codebook to generate third encoded location data. The third coordinate data may be encoded using a third bit rate that is greater than the second bit rate. The third encoded location data may be stored to enable retrieval of the particular frame based on input parameters.

In a particular embodiment, the method 1300 may include tracking a fourth location of a fourth object located in a second region of interest of the particular frame. For example, the fourth location of the fourth tracked object 1120 may be tracked. Fourth coordinate data associated with the fourth location may be generated. The fourth coordinate data may be encoded using a codebook to generate fourth encoded location data. The fourth coordinate data may be encoded using a fourth bit rate that is greater than the second bit rate. The fourth encoded location data may be stored to enable retrieval of the particular frame based on input parameters.

The method 1300 of FIG. 44 may enable the user to retrieve (e.g., locate) particular portions (frames) of video encoded using the codebook 1202. Additionally, the method 1300 may enable metadata for tracked objects inside an ROI to be encoded at a higher bit rate than objects outside of an ROI. Encoding metadata for tracked objects located inside an ROI at a higher bit rate may enable locations of the tracked objects in the ROIs to be encoded at a higher level of accuracy than the location of the other tracked objects.

FIG. 38A shows a block diagram of an apparatus A100 for generating metadata according to a general configuration. Apparatus A100 includes a discriminator 100 configured to use at least one digital image to select a plurality of objects, wherein the at least one digital image depicts the objects in relation to a physical space (e.g., as described herein with reference to task T100). Apparatus A100 also includes a selector 300 configured to produce metadata, based on information indicating positions of the selected objects in a location space, that identifies one among a plurality of candidate geometrical arrangements of the selected objects (e.g., as described herein with reference to task T300).

FIG. 38B shows a block diagram of an implementation A110 of apparatus A100. Apparatus A110 includes a display module 50 configured to display the at least one digital image (e.g., as described herein with reference to display task T50).

FIG. 38C shows a block diagram of an implementation A120 of apparatus A100. Apparatus A120 includes an interface 30 configured to parse a video stream to produce the at least one digital image (e.g., as described herein with reference to parsing task T30). FIG. 38D shows a block diagram of an implementation A130 of apparatus A110 and A120.

FIG. 38E shows a block diagram of an implementation A200 of apparatus A100. Apparatus A200 includes an object tracker 200 configured to determine a reference position for the plurality of objects in the location space (e.g., as described herein with reference to task T200). Object tracker 200 may also be configured to track, within a video stream, said plurality of objects (e.g., as described herein with reference to task T200). FIGS. 38F, 38G, and 39A show block diagrams of implementations A210, A220, and A230 of apparatus A110, A120, and A130, respectively, that include instances of object tracker 200.

FIG. 39B shows a block diagram of an implementation A300 of apparatus A100. Apparatus A300 includes a video stream editor 400 configured to associate the metadata produced by selector 300 with corresponding frames of a video stream (e.g., as described herein with reference to task T300). FIGS. 39C and 39D show block diagrams of implementations A310 and A330 of apparatus A200 and A230, respectively, that include instances of video stream editor 400.

Any of the implementations of apparatus A100 as disclosed herein may be implemented within a mobile device, such as a device in any of the following form factors: holdables (e.g., smartphones), drivables (e.g., vehicles or robots), wearables (e.g., clothing or accessories), and flyables (e.g., drones). A mobile device may include one or more screens (e.g., a touchscreen) configured to display the at least one digital image and/or one or more imaging units (e.g., a camera or other image-capturing device) configured to capture the at least one digital image (e.g., a video stream).

Referring to FIG. 31, a block diagram of a wireless device 2900 including components operable to perform the video processing techniques described above is shown. The device

2900 includes a processor 2910, such as a digital signal processor (DSP), coupled to a memory 2932. Device 2900 is one example of a mobile device that may be implemented to include the elements of any of the implementations of apparatus A100 as described herein.

FIG. 31 also shows a display controller 2926 that is coupled to the processor 2910 and to a display 2928. In a particular embodiment, the display may correspond to the viewfinder or the screens described above. The memory 2932 may be a tangible non-transitory processor-readable storage medium that includes executable instructions 2956. The instructions 2956 may be executed by a processor, such as the processor 2910. A processor, such as the processor 2910 or the display controller 2926, may execute the instructions 2956 to perform at least a portion of the method 300 of FIG. 3, the method 400 of FIG. 4, the method 500 of FIG. 5, the method 600 of FIG. 6, the method 1000 of FIG. 10, the method 1200 of FIG. 12, the method 1400 of FIG. 14, the method 1600 of FIG. 16, the method 1900 of FIG. 22, the method 2000, 2010 of FIG. 23, the method 2300 of FIG. 26, the method 2600 of FIG. 27, the method 2800 of FIG. 29, the method 1300 of FIG. 44, method M100, method M110, method M120, method M130, or any combination thereof.

A coder/decoder (CODEC) 2934 can also be coupled to the processor 2910. A speaker 2936 and a microphone 2938 can be coupled to the CODEC 2934. FIG. 31 also indicates that a wireless controller 2940 can be coupled to the processor 2910 and to an antenna 2942. In a particular embodiment, a radio frequency (RF) interface 2980 is disposed between the wireless controller 2940 and the antenna 2942.

In a particular embodiment, the processor 2910, the display controller 2926, the memory 2932, the CODEC 2934, and the wireless controller 2940 are included in a system-in-package or system-on-chip device 2922. In a particular embodiment, an input device 2930 (e.g., a camera used to capture the scenes as described above) and a power supply 2944 are coupled to the system-on-chip device 2922. Moreover, in a particular embodiment, as illustrated in FIG. 31, the display 2928, the input device 2930, the speaker 2936, the microphone 2938, the antenna 2942, the power supply 2944, and the RF interface 2980 are external to the system-on-chip device 2922. For example, the RF interface 2980 may be a separate chip. However, each of the display 2928, the input device 2930, the speaker 2936, the microphone 2938, the antenna 2942, the power supply 2944, and the RF interface 2980 can be coupled to a component of the system-on-chip device 2922, such as an interface or a controller.

In some contexts, the positions of one or more objects depicted within an image may have a higher informational value than other content in the image. For example, the actual appearances of the objects themselves may be sufficiently known a priori or may even be unimportant. In the presence of bandwidth constraints on transmission and/or storage, however, it may be inconvenient, impractical, or even impossible to provide an entire image or video stream with sufficient resolution to indicate position information to a desired degree of accuracy.

Various methods are disclosed herein for encoding relative positions of objects within a digital image. Potential applications of such methods may include support for efficient retrieval of desired content. Additionally or alternatively, it may be desirable to use such encoded positions to support generation of a representation of the arrangement of depicted objects without the need to transmit or store the entire image.

FIG. 45A shows a flowchart of a method M500 according to a general configuration that includes tasks X100, X200, and X300. Task X100 receives information that identifies a reference position in a location space. Task X200 receives data that identifies one among a plurality of candidate geometrical arrangements. Task T300 produces a representation that depicts a plurality of objects which are arranged, relative to the reference position in the location space, according to the identified candidate geometrical arrangement. The plurality of objects may be, for example, physically separate objects, such as different people, animals, and/or vehicles. Tasks X100, X200, and X300 may be performed, for example, by the electronic device 102 of FIG. 1, processor 2910, wireless device 2900, or any combination thereof.

Task X100 receives information that identifies a reference position in a location space. As noted above, a location space may be a pixel coordinate space or a physical space (e.g., a scene space). In one example, the location space is a three-dimensional space. In another example, the location space is a ground plane.

In one example, the received information indicates the reference position as a position in rectangular, polar, spherical, and/or cylindrical coordinates. In one example, the received information indicates the reference position by indicating the region which includes the reference position among a plurality of separate regions (e.g., including regions of unequal size) that divide the location space. In such case, the received information may include one or more indices (e.g., codewords) into one or more indexed sets of such regions (e.g., into one or more corresponding quantization codebooks).

Task X100 may be implemented to receive the information via an interface. For example, task X100 may receive the information in a network transmission via a network interface. Examples of such a network via which the information may be received include a wired network (e.g., Ethernet) and/or a wireless network (e.g., WiFi, WiMax, wireless telephony, LTE, 2G, 4G, packet data). Alternatively, task X100 may be implemented to receive the information by retrieving it via a storage interface. Examples of such storage include a hard drive (e.g., a magnetic medium), flash or other non-volatile RAM or ROM (e.g., a USB drive or other solid-state disk), and an optical disk (e.g., a CD or DVD). In a further example, task X100 may receive the information from a user, e.g., via a touchscreen.

Task X200 receives data that identifies one among a plurality of candidate geometrical arrangements. Task X200 may be implemented to receive such data via a network interface and/or a storage interface as described above with reference to task X100 (typically, but not necessarily, within the same network transmission or storage retrieval operation). In a further example, task X200 may receive the information from a user, e.g., via a touchscreen.

The received data may have a content and format as described herein with reference to metadata produced by task T300. In one such example (e.g., as described herein with reference to FIG. 35), the identified candidate geometrical arrangement indicates a shape that is described by positions of the plurality of objects (e.g., as vertices of a polygon). The received data may also include additional information, such as any among the following: a scale factor and/or aspect factor to be applied to the candidate, an orientation direction for the candidate, and a mirror flag indicating whether the candidate is to be flipped around an axis.

In another example, the identified candidate geometrical arrangement indicates a distribution of the plurality of objects relative to the reference position. In such case, the received data may also indicate a total number of the plurality of objects, and the identified candidate geometrical arrangement may indicate how the total number of regions is to be distributed, relative to the reference position, among specified sub-regions of the location space (e.g., as described herein with reference to FIG. 36). In one example, the total number of the selected objects is obtained by multiplying a received indication of the total number by a specified quantization factor.

The reference position may be specified as, for example, the center of a circular location space. However, the encoding scheme within which method M500 is implemented may specify (e.g., implicitly or within the received data) any other location in the space as the reference and may specify the location space to be of any shape and size. It is also possible for the data received by task X200 to identify more than one candidate geometrical arrangement (e.g., from the same plurality or from different pluralities of candidate geometrical arrangements), each describing a different shape and/or distribution of objects within the location space (e.g., to be overlapped and/or overlaid).

Task X300 produces a representation that depicts a plurality of objects which are arranged, relative to the reference position in the location space, according to the identified candidate geometrical arrangement. The produced representation may be a digital image. In this case, task X300 may be implemented to render the objects synthetically. Such rendering may be performed using any computer graphics and/or computer-generated imagery (CGI) technique, such as constructing the objects from polygons, applying texture maps and lighting, etc. In one example, task X300 is configured to perform task X300 using a video game engine.

Method M500 (e.g., task X200) may be implemented to include receiving a description of at least one among the plurality of objects. The data received by task X200 may include information indicating a description of at least one of the objects. For example, such information may include a name of a person or a similar object label. Task X300 may be implemented to use such information to retrieve a description of a structure and/or appearance of the labeled object.

The plurality of objects may include at least one avatar. For example, task X300 may use the name of a person, as received by task X200, to retrieve a description of a structure and/or appearance of an avatar associated with that person and to generate the avatar at a position indicated by the identified candidate geometrical arrangement. Alternatively, the data received by task X200 may include the description from which task X300 generates the avatar.

The data received by task X200 may include information indicating a description of one or more other features of the location space. In one such example, the received data indicates a physical position of the location space (e.g., as GPS coordinates), and task X300 is implemented to produce the representation using terrain information corresponding to this position (e.g., surface maps).

Alternatively or additionally, task X300 may be implemented to produce the representation to include multiple instances of the same object (e.g., in a distribution as described above). For example, the identified candidate geometrical arrangement of the selected objects may be a distribution of numerous selected objects in the location space (e.g., a crowd of people in a public space, a large group of animals, a large group of airborne or waterborne vehicles or other objects). One potential application for such an implementation of task X300 is to reproduce a event involving a large number of people (e.g., a public demonstration, a rock concert, or a holiday celebration) at another location (e.g., in real time) and/or at another time.

As noted above, the data received by task X200 may include an indication of the total number of objects to be distributed in the location space. Other characteristics that may be included in the received data include an indication of a degree of variability of boundaries between sub-regions of the location space, which may be used to randomize the distribution. Such randomization may be useful, for example, in a case where the same distribution is to be used to different positions within the produced representation.

Another characteristic that may be included in the received data is an indication of activity within the distribution over time (e.g., an indication of a degree of movement of each individual object over time), which may be used to add a dynamic appearance to the representation by modeling Brownian motion of the individual objects. As mentioned above, the received data may identify more than one candidate (e.g., more than one candidate for each distribution, possibly selected from a different set of candidates), and these candidates may be overlapped and/or overlaid within the produced representation. Such a feature may be used to indicate additional aspects of the scene being modeled (e.g., to encode an indication of different degrees of activity at different locations within a group of objects).

As described above, the location space may be a physical space, such as a three-dimensional space or a ground plane. In such case, task X300 may be implemented to map at least one position in the location space to a corresponding position in a pixel coordinate space (e.g., as described herein with reference to task T200).

Additionally or alternatively, task X300 may be implemented to produce representations that are not digital images. For example, task X300 may be implemented to produce an acoustic representation. Such a representation may be based on received and/or stored characteristics of a voice of each of one or more persons (e.g., pitch and vocal tract resonances, or a voice font) and/or a description of acoustic properties of the location space. Such acoustic information of the objects and/or location space may be received by task X200 and/or retrieved according to data received by task X200.

Method M500 may be implemented to include receiving a description of at least one among the plurality of objects. FIG. 45B shows a flowchart of an implementation M510 of method M500 in which the data received by an implementation X210 of task X200 includes information indicating the description of at least one of the objects. The received description may be a specific identifier, such as the name of a person or a similar object label. Method M510 also includes a task X250 that retrieves a representation of said at least one object, based on the received description. For example, task X250 may be implemented to use such information to retrieve a description of a structure and/or appearance of the labeled object. In method M510, the representation produced by task X300 is based on the retrieved representation.

As described above, the produced representation may include some variability over time (e.g., by including an activity parameter). However, it may be desirable to implement method M500 to produce a series of representations that change in response to changes in the data received by task X200. For example, it may be desirable to implement task X300 to render a video stream that depicts movement of the plurality of objects within the location space, as indicated by different identified candidate geometrical arrangements received over time by task X200.

FIG. 46A shows a flowchart of an implementation M520 of method M500 that includes an implementation X310 of task X300, which also produces a second representation that depicts the plurality of objects arranged relative to a different reference position in the location space. FIG. 46B shows a flowchart of an implementation M530 of methods M510 and M520.

FIG. 46C shows a flowchart of an implementation M540 of method M500. Method M540 includes an implementation X320 of task X300 that produces the representation as a digital image (e.g., a frame of a video stream). Method M540 also includes a task X400 that displays the digital image (e.g., on a screen of a mobile device as described herein).

FIG. 47A shows a block diagram of an apparatus A500 according to a general configuration. Apparatus A500 includes an interface Z100 configured to receive (A) information that identifies a reference position in a location space and (B) data that identifies one among a plurality of candidate geometrical arrangements (e.g., as described herein with reference to tasks X100 and X200). Apparatus A500 also includes a renderer Z300 configured to produce a representation that depicts a plurality of objects which are arranged, relative to the reference position in the location space, according to the identified candidate geometrical arrangement (e.g., as described herein with reference to task X300). Renderer Z300 may also be configured to map at least one position in the location space to a corresponding position in a pixel coordinate space and/or to produce a second representation that depicts the plurality of objects arranged relative to a different reference position in the location space.

Interface Z100 may also be configured to receive a description of at least one among the plurality of objects. In such case, renderer Z300 may be configured to retrieve, based on said received description, a representation of said at least one object, and the representation produced by renderer Z300 may be based on said retrieved representation.

FIG. 47B shows a block diagram of an implementation A540 of apparatus A500 that includes an implementation Z320 of renderer Z300 and a display module Z400. Renderer Z320 is configured to produce the representation as a digital image (e.g., a frame of a video stream). Display module Z400 is configured to display the digital image (e.g., on a screen of a mobile device as described herein).

Any of the implementations of apparatus A500 as disclosed herein may be implemented within a mobile device, such as a device in any of the following form factors: holdables (e.g., smartphones), drivables (e.g., vehicles or robots), wearables(e.g., clothing or accessories), and flyables (e.g., drones). A mobile device may include one or more screens (e.g., a touchscreen) configured to display the at least one digital image and/or one or more imaging units (e.g., a camera or other image-capturing device) configured to capture the at least one digital image (e.g., a video stream).

FIG. 48C shows a block diagram of an apparatus MF500 according to a general configuration. Apparatus MF500 includes means Y100 for receiving information that identifies a reference position in a location space (e.g., as described herein with reference to task X100). Apparatus MF500 includes means Y200 for receiving data that identifies one among a plurality of candidate geometrical arrangements (e.g., as described herein with reference to task X200). Apparatus MF500 also includes means Y300 for producing a representation that depicts a plurality of objects which are arranged, relative to the reference position in the location space, according to the identified candidate geometrical arrangement (e.g., as described herein with reference to task X300).

Apparatus MF500 may also be implemented to include means Y210 for receiving a description of at least one among the plurality of objects (e.g., as described herein with reference to task X210); to include means Y210 and also means Y250 for retrieving, based on said received description, a representation of said at least one object (e.g., as described herein with reference to task X250), wherein said produced representation is based on said retrieved representation; and/or to include means Y310 for producing a second representation that depicts the plurality of objects arranged relative to a different reference position in the location space (e.g., as described herein with reference to task X310).

FIG. 40A shows a block diagram of an apparatus MF100 for generating metadata according to a general configuration. Apparatus MF100 includes means F100 for using at least one digital image to select a plurality of objects, wherein the at least one digital image depicts the objects in relation to a physical space (e.g., as described herein with reference to task T100). Apparatus MF100 also includes means F300 for producing metadata, based on information indicating positions of the selected objects in a location space, that identifies one among a plurality of candidate geometrical arrangements of the selected objects (e.g., as described herein with reference to task T300).

FIG. 40B shows a block diagram of an implementation MF110 of apparatus MF100. Apparatus MF110 includes means F50 for displaying the at least one digital image (e.g., as described herein with reference to display task T50).

FIG. 40C shows a block diagram of an implementation MF120 of apparatus MF100. Apparatus MF120 includes means F30 for parsing a video stream to produce the at least one digital image (e.g., as described herein with reference to parsing task T30). FIG. 40D shows a block diagram of an implementation MF130 of apparatus MF110 and MF120.

FIG. 40E shows a block diagram of an implementation MF200 of apparatus MF100. Apparatus MF200 includes means F200 for determining a reference position for the plurality of objects in the location space (e.g., as described herein with reference to task T200). FIG. 41B shows a block diagram of an implementation MF400 of apparatus MF100 that includes means F210 for tracking, within a video stream, said plurality of objects (e.g., as described herein with reference to task T200). FIGS. 40F, 40G, and 41A show block diagrams of implementations MF210, MF220, and MF230 of apparatus MF110, MF120, and MF130, respectively, that include instances of means F200. Such apparatus may also be implemented to include means F210 in addition or in the alternative to means F200.

FIG. 41C shows a block diagram of an implementation MF300 of apparatus MF100. Apparatus MF200 includes means F400 for associating the metadata produced by means F300 with corresponding frames of a video stream (e.g., as described herein with reference to task T300). FIGS. 41D and 41E show block diagrams of implementations MF310 and MF330 of apparatus MF200 and MF230, respectively, that include instances of means F400.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. For example, one or more elements of the various implementations of the apparatus disclosed herein (e.g., any among apparatus MF100, MF110, MF120, MF130, MF200, MF210, MF220, MF230, MF300, MF310, MF330, MF400, MF500, A100, A110, A120, A130, A200, A210, A220, A230, A300, A310, A330, A500, and A540) may be implemented in whole or in part as one or more sets of instructions arranged to execute on one or more fixed or programmable arrays of logic elements (e.g., processor 2610), such as microprocessors, embedded processors, IP cores, digital signal processors, FPGAs (field-programmable gate arrays), ASSPs (application-specific standard products), and ASICs (application-specific integrated circuits). Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of producing a representation of an image, the method comprising:
   receiving, at a processor, information that identifies a reference position in a location space, the location space corresponding to a pixel coordinate space, wherein the reference position indicates a position of a formation of multiple selected particular objects or a center of mass of the multiple selected particular objects;
   receiving, at the processor, data that identifies a first candidate shape from a plurality of candidate shapes, the first candidate shape corresponding to a metric for a particular distribution of the multiple selected particular objects relative to the reference position in the location space, wherein each shape of the plurality of candidate shapes defines a corresponding area in which the multiple selected particular objects are renderable; and
   based on the information and the data, producing the representation of the image, at the processor, by rendering at least one object of the multiple selected particular objects in the image, the at least one object rendered in one or more positions relative to the reference position and corresponding to the first candidate shape.

2. The method of claim 1, wherein the location space corresponds to a site of a public demonstration, and further comprising producing a representation of a second image, at the processor, by rendering a second set of objects in the second image, wherein the second set of objects comprise people at the public demonstration, and wherein the representation of the image corresponds to a graphical reproduction of the people at the public demonstration.

3. The method of claim 1, wherein rendering the at least one object in the image corresponds to performing operations to decode one or more images associated with the multiple selected particular objects based on one or more index values in a codebook, the codebook used to:
   quantize the particular distribution of the multiple selected particular objects in each candidate shape of the plurality of candidate shapes; and
   map determined positions of the multiple selected particular objects in the location space to a corresponding position in the pixel coordinate space.

4. The method of claim 1, wherein each of the multiple selected particular objects is selected from an image frame based on a user input, wherein producing the representation of the image corresponds to reproducing a particular image of an event associated with the at least one object, and wherein the first candidate shape comprises a polygon having a vertex that corresponds to the reference position.

5. The method of claim 1, further comprising:
   receiving the image;
   receiving, at the processor, second data that identifies a second candidate shape of the plurality of candidate shapes; and
   rendering, by the processor, a second image, the second image rendered based on the information and based on the second data, the image and the second image associated with a movement of multiple instances of the at least one object within the location space.

6. The method of claim 1, wherein the first candidate shape corresponds to a region of the image in which multiple instances of the at least one object are rendered, wherein the location space comprises a three-dimensional space, and further comprising:
   mapping, by the processor, the information to a corresponding position in the pixel coordinate space; and
   receiving, at the processor, a data value indicating a number of instances of the at least one object.

7. The method of claim 1, wherein the data that identifies the first candidate shape indicates a total number of objects and indicates a distribution of multiple instances of the total number of objects among one or more regions of the location space, wherein each rendered instance of the multiple instances indicates a location of the at least one object relative to the reference position, and wherein each indicated location is associated with the first candidate shape.

8. The method of claim 1, wherein each shape of the plurality of candidate shapes is defined by the positions of the multiple selected particular objects.

9. The method of claim 1, wherein the metric indicates a value of a ratio based on a first number of the multiple selected particular objects in a first region of the location space and a second number of the multiple selected particular objects in a second region of the location space.

10. The method of claim 1, wherein the first candidate shape comprises a polygon having vertices, each vertex including a position of a different instance of the at least one object, wherein the information comprises an indication of Cartesian coordinates, polar coordinates, spherical coordinates, or cylindrical coordinates corresponding to a location in the pixel coordinate space, and further comprising mapping the information to the location in the pixel coordinate space.

11. A non-transitory computer-readable medium storing instructions that, when executed by a processor, cause the processor to perform operations comprising:
receiving information that identifies a reference position in a location space, the location space corresponding to a pixel coordinate space, wherein the reference position indicates a position of a formation of multiple selected particular objects or a center of mass of the multiple selected particular objects;
receiving data that identifies a first candidate shape from a plurality of candidate shapes, the first candidate shape corresponding to a metric for a particular distribution of the multiple selected particular objects relative to the reference position in the location space, wherein each shape of the plurality of candidate shapes defines a corresponding area in which the multiple selected particular objects are renderable; and
based on the information and the data, producing a representation of an image by rendering at least one object of the multiple selected particular objects in the image, the at least one object rendered in one or more positions relative to the reference position and corresponding to the first candidate shape.

12. The non-transitory computer-readable medium of claim 11, wherein the data that identifies the first candidate shape includes a description of the at least one object.

13. The non-transitory computer-readable medium of claim 11, wherein the at least one object comprises an avatar, wherein the data includes avatar position information associated with the location space, wherein the image comprises a digital image, and wherein the operations further comprise displaying the digital image.

14. The non-transitory computer-readable medium of claim 11, wherein the operations further comprise rendering a second object, and wherein the first candidate shape corresponds to a distribution of the second object and multiple instances of the at least one object in the location space.

15. The non-transitory computer-readable medium of claim 14, wherein the operations further comprise receiving a name label of a person associated with the second object.

16. The non-transitory computer-readable medium of claim 11, wherein the operations further comprise producing a second representation by rendering a plurality of objects based on the information and based on the data, and wherein the data that identifies the first candidate shape includes an indication of a degree of movement of multiple instances of the at least one object over a time interval.

17. An apparatus comprising:
means for receiving information that identifies a reference position in a location space, the location space corresponding to a pixel coordinate space, wherein the reference position indicates a position of a formation of multiple selected particular objects or a center of mass of the multiple selected particular objects;
means for receiving data that identifies a first candidate shape from a plurality of candidate shapes, the first candidate shape corresponding to a metric for a particular distribution of the multiple selected particular objects relative to the reference position in the location space, wherein each shape of the plurality of candidate shapes defines a corresponding area in which the multiple selected particular objects are renderable; and
means for rendering, based on the information and the data, at least one object of the multiple selected particular objects in an image to produce a representation of the image, the at least one object rendered in one or more positions relative to the reference position and corresponding to the first candidate shape.

18. The apparatus of claim 17, wherein the image comprises a digital image, wherein the location space corresponds to the image and the reference position comprises a particular point of the image, and wherein the means for receiving the information, the means for receiving the data, and the means for rendering are incorporated in a mobile communication device.

19. The apparatus of claim 17, wherein the means for rendering the at least one object in the image is further configured to render a plurality of objects in the image, the plurality of objects including the at least one object, and wherein the plurality of objects includes people, animals, or vehicles.

20. The apparatus of claim 17, wherein the data that identifies the first candidate shape includes a scale factor associated with the first candidate shape, an aspect factor associated with the first candidate shape, and an orientation direction of the first candidate shape.

21. The apparatus of claim 17, wherein the location space corresponds to a site of a rock concert.

22. The apparatus of claim 17, further comprising:
means for capturing the image;
means for storing the image;
means for receiving a description of the at least one object; and
means for retrieving, based on the description, a representation of the at least one object.

23. The apparatus according to claim 17, further comprising means for producing a second representation that depicts multiple instances of the at least one object arranged relative to a second reference position distinct from the reference position in the location space.

24. An apparatus comprising:
an interface configured to receive information that identifies a reference position in a location space and to receive data that identifies a first candidate shape from a plurality of candidate shapes, the location space corresponding to a pixel coordinate space, wherein the reference position indicates a position of a formation of multiple selected particular objects or a center of mass of the multiple selected particular objects, wherein the first candidate shape corresponds to a metric for a particular distribution of multiple selected particular objects relative to the reference position in the location space, and wherein each shape of the plurality of candidate shapes includes a corresponding area in which the multiple selected particular objects are renderable; and a renderer configured to produce, based on the information and the data, a representation of an image by rendering at least one object of the multiple selected particular objects in the image, the at least one object rendered in one or more positions relative to the reference position and corresponding to the first candidate shape.

25. The apparatus of claim 24, wherein the image comprises a digital image, and further comprising:
  a camera configured to capture the image;
  a memory coupled the renderer and configured to store the image; and
  a display coupled to the renderer and configured to display the representation of the image.

26. The apparatus of claim 24, wherein the renderer is further configured to render a plurality of objects, the plurality of objects including the at least one object, and wherein the at least one object corresponds to an avatar.

27. The apparatus of claim 24, wherein the first candidate shape indicates a position of the at least one object relative to the reference position, and wherein the renderer is further configured to render multiple instances of the at least one object based on terrain information corresponding to the position.

28. The apparatus of claim 24, wherein the interface is further configured to receive a description of the at least one object, and wherein the description is associated with a structure or an appearance of the at least one object.

29. The apparatus of claim 24, wherein the image corresponds to a graphical reproduction of an event, wherein the location space comprises a three-dimensional space or a ground plane, and wherein the interface and the renderer are incorporated into a mobile communication device.

30. The apparatus of claim 24, wherein the location space corresponds to a site of a holiday celebration, wherein the at least one object comprises a person, and wherein the image corresponds to a graphical reproduction of the holiday celebration.

* * * * *